(12) United States Patent
Kim et al.

(10) Patent No.: US 12,517,325 B2
(45) Date of Patent: Jan. 6, 2026

(54) OPTICAL IMAGING SYSTEM

(71) Applicant: SAMSUNG ELECTRO-MECHANICS CO., LTD., Suwon-si (KR)

(72) Inventors: Byung Hyun Kim, Suwon-si (KR); Joon Ha Kim, Suwon-si (KR); Sang Hyun Jang, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 297 days.

(21) Appl. No.: 18/450,790

(22) Filed: Aug. 16, 2023

(65) Prior Publication Data

US 2024/0192471 A1    Jun. 13, 2024

(30) Foreign Application Priority Data

Dec. 9, 2022   (KR) .................. 10-2022-0171733
May 31, 2023   (KR) .................. 10-2023-0070460

(51) Int. Cl.
*G02B 9/64*    (2006.01)
*G02B 13/00*   (2006.01)

(52) U.S. Cl.
CPC ........... *G02B 9/64* (2013.01); *G02B 13/0045* (2013.01)

(58) Field of Classification Search
None
See application file for complete search history.

(56) References Cited

U.S. PATENT DOCUMENTS

| 8,958,162 B2 | 2/2015 | Kubota et al. | |
| 2013/0242175 A1* | 9/2013 | Kuzuhara | G02B 27/646 348/360 |
| 2015/0185452 A1* | 7/2015 | Hsu | G02B 13/06 359/728 |

(Continued)

FOREIGN PATENT DOCUMENTS

| CN | 211149040 U | 7/2020 |
| CN | 213069314 U | 4/2021 |

(Continued)

OTHER PUBLICATIONS

Taiwanese Office Action Issued on Mar. 12, 2024, in Counterpart Taiwanese Patent Application No. 112132385 (4 Pages in English, 4 Pages in Chinese).

(Continued)

*Primary Examiner* — Darryl J Collins
(74) *Attorney, Agent, or Firm* — NSIP Law

(57) ABSTRACT

An optical imaging system includes a first lens, a second lens, a third lens, a fourth lens, a fifth lens, a sixth lens, a seventh lens, an eighth lens, a ninth lens, a tenth lens, and an eleventh lens arranged in order from an object side, wherein the first lens has positive refractive power, and the second lens has positive refractive power, wherein the eleventh lens has at least one inflection point on at least one of an object-side surface and an image-side surface, and wherein 0.6<TTL/(2×IMG HT)<0.8, and Nv26≥4 are satisfied, where TTL is a distance from an object-side surface of the first lens to an imaging surface on an optical axis, IMG HT is half a diagonal length of the imaging surface, and Nv26 is the number of lenses with an Abbe number of less than 26.

20 Claims, 22 Drawing Sheets

(56) References Cited

U.S. PATENT DOCUMENTS

| | | | | |
|---|---|---|---|---|
| 2016/0070116 A1* | 3/2016 | Yoneyama | ............ | G02B 13/02 |
| | | | | 359/557 |
| 2016/0299415 A1* | 10/2016 | Minefuji | ............ | G03B 21/006 |
| 2018/0067333 A1 | 3/2018 | Ishibashi | | |
| 2022/0196971 A1 | 6/2022 | Chen et al. | | |
| 2022/0390711 A1* | 12/2022 | Kim | ............ | G02B 13/0045 |

FOREIGN PATENT DOCUMENTS

| | | |
|---|---|---|
| CN | 113341543 A | 9/2021 |
| CN | 110737069 B | 12/2021 |
| CN | 114089501 A | 2/2022 |
| EP | 4 012 468 A1 | 6/2022 |
| JP | 6849350 B2 | 3/2021 |
| JP | 2021-67826 A | 4/2021 |
| JP | 2022-171857 A | 11/2022 |
| TW | 1756013 B | 2/2022 |
| TW | 202229961 A | 8/2022 |

OTHER PUBLICATIONS

Taiwanese Office Action Issued on Mar. 10, 2025, in Counterpart Taiwanese Patent Application No. 113151822 (8 Pages in English, 5 Pages in Chinese).

\* cited by examiner

OPTICAL IMAGING SYSTEM

CROSS-REFERENCE TO RELATED APPLICATIONS

This application claims the benefit under 35 USC 119(a) of Korean Patent Application Nos. 10-2022-0171733 filed on Dec. 9, 2022, and 10-2023-0070460 filed on May 31, 2023, in the Korean Intellectual Property Office, the entire disclosures of which are incorporated herein by reference for all purposes.

BACKGROUND

1. Field

The present disclosure relates to an optical imaging system.

2. Description of the Background

Portable terminals may have a camera including an optical imaging system comprising a plurality of lenses to enable video calls and image capturing operations.

Additionally, with a gradual increase in operations of cameras in portable terminals, cameras for portable terminals having high resolution may be desired.

Additionally, as the form factor of portable terminals has decreased, miniaturized cameras for portable terminals may also be desired. Accordingly, the development of an optical imaging system that achieves high resolution while being slim may be desired.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an optical imaging system includes a first lens, a second lens, a third lens, a fourth lens, a fifth lens, a sixth lens, a seventh lens, an eighth lens, a ninth lens, a tenth lens, and an eleventh lens arranged in order from an object side, wherein the first lens has positive refractive power, and the second lens has positive refractive power, and the eleventh lens has at least one inflection point on at least one of an object-side surface and an image-side surface, and $0.6<TTL/(2\times IMG\ HT)<0.8$, and $Nv26\geq 4$ are satisfied, where TTL is a distance from an object-side surface of the first lens to an imaging surface on an optical axis, IMG HT is half a diagonal length of the imaging surface, and Nv26 is the number of lenses with an Abbe number of less than 26.

The conditional equation $10<f1/f2<150$ may be satisfied, where f1 is a focal length of the first lens, and f2 is a focal length of the second lens.

The conditional equation $1.15<TTL/f<1.3$ may be satisfied, where f is a total focal length of the optical imaging system.

The conditional equation $30<v2-v3<40$ may be satisfied, where v2 is an Abbe number of the second lens, and v3 is an Abbe number of the third lens.

At least two lenses continuously arranged among the first to seventh lenses may have an Abbe number of less than 26.

At least one of the third to fifth lenses may have a refractive index of greater than 1.63 and an Abbe number of less than 24.

At least two of the sixth to eighth lenses may have a refractive index of greater than 1.61 and an Abbe number of less than 26.

The conditional equation $29<|v1-v3|<40$ may be satisfied, where v1 is an Abbe number of the first lens, and v3 is an Abbe number of the third lens.

The conditional equation $30<v2-v6<40$ may be satisfied, where v2 is an Abbe number of the second lens, and v6 is an Abbe number of the sixth lens.

An optical axis thickness of the second lens may be thicker than an optical axis thickness of the first lens.

The conditional equation $1.5<T2/T1<3$ may be satisfied, where T1 is the optical axis thickness of the first lens, and T2 is the optical axis thickness of the second lens.

The conditional equation $0.25<D15/TTL<0.45$ may be satisfied, where D15 is a distance on an optical axis from the object-side surface of the first lens to an image-side surface of the fifth lens.

The conditional equation $1.4<Fno<1.7$ may be satisfied, where Fno is an F number of the optical imaging system.

The conditional equation $|f345|+|f678|<0.3$ mm may be satisfied, where f345 is a composite focal length of the third lens, the fourth lens, and the fifth lens, and f678 is a composite focal length of the sixth lens, the seventh lens, and the eighth lens.

The conditional equation $0.5<|f345/f678|<3$ may be satisfied, where f345 is a composite focal length of the third lens, the fourth lens, and the fifth lens, and f678 is a composite focal length of the sixth lens, the seventh lens, and the eighth lens.

Each of the second lens to the fourth lens may have a convex object-side surface and a concave image-side surface.

In another general aspect, an optical imaging system includes a first lens, a second lens, a third lens, a fourth lens, a fifth lens, a sixth lens, a seventh lens, an eighth lens, a ninth lens, a tenth lens, and an eleventh lens arranged in order from an object side, wherein the first lens and the second lens each have positive refractive power, wherein the seventh lens and the eighth lens each have negative refractive power, wherein $0.6<TTL/(2\times IMG\ HT)<0.8$, and $1.4<Fno<1.7$ are satisfied, where TTL is a distance from an object-side surface of the first lens to an imaging surface on an optical axis, IMG HT is half a diagonal length of the imaging surface, and Fno is an F number of the optical imaging system.

Adjacent lenses of the first to eleventh lenses may be spaced apart from each other.

The conditional equation $Nv26\geq 4$ may be satisfied, where Nv26 is the number of lenses with an Abbe number of less than 26.

The seventh lens may have a concave image-side surface.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
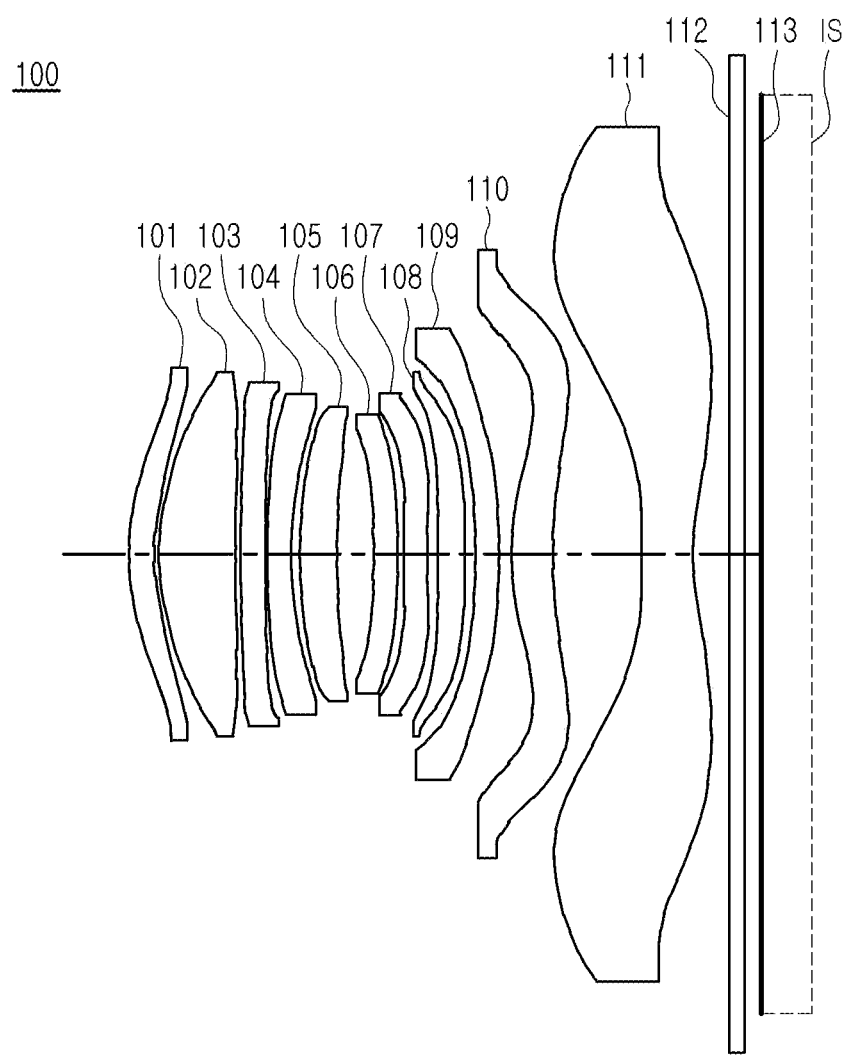
FIG. 1 illustrates a structural view of an example optical imaging system according to a first embodiment of the present disclosure.

Hereinafter, while examples of the present disclosure will be described in detail with reference to the accompanying drawings, it is noted that examples are not limited to the same.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of this disclosure. For example, the sequences of operations described herein are merely examples, and are not limited to those set forth herein, but may be changed as will be apparent after an understanding of this disclosure, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of this disclosure.

Throughout the specification, when an element, such as a layer, region, or substrate is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items; likewise, "at least one of" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms, such as "above," "upper," "below," "lower," and the like, may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above," or "upper" relative to another element would then be "below," or "lower" relative to the other element. Thus, the term "above" encompasses both the above and below orientations depending on the spatial orientation of the device. The device may also be oriented in other ways (rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

Herein, it is noted that use of the term "may" with respect to an example, for example, as to what an example may include or implement, means that at least one example exists in which such a feature is included or implemented while all examples are not limited thereto.

The features of the examples described herein may be combined in various ways as will be apparent after an understanding of this disclosure. Further, although the examples described herein have a variety of configurations, other configurations are possible as will be apparent after an understanding of this disclosure.

An aspect of the present disclosure may provide an optical imaging system configured to achieve high resolution while being slim.

In the following structural views of lenses, the thicknesses, sizes, and shapes of the lenses are somewhat exaggerated for description, and specifically, the shapes of spherical or non-spherical surfaces presented in the structural views of the lenses are only presented as examples, but the one or more examples are not limited thereto.

An optical imaging system according to an example embodiment of the present disclosure includes eleven lenses.

A first lens refers to the lens closest to an object side, and an eleventh lens refers to the lens closest to an imaging surface (or an image sensor).

Additionally, in each lens, a first surface denotes a side closest to the object side (or an object-side surface), and a second surface denotes a side closest to an image side (or an image-side surface). Additionally, in the one or more examples of this disclosure, the values for the radius of curvature, thickness, distance, and focal length of the lens are all in mm units, and the unit of a field of view (FOV) is degrees.

Additionally, in the description of the shape of each lens, the disclosure of a shape convex on one surface denotes that a paraxial region portion of the corresponding surface is convex, and the disclosure of a shape concave on one surface denotes that the paraxial region portion of the corresponding surface is concave.

Accordingly, even if one surface of the lens is described as a convex shape, an edge portion of the lens may have a concave shape. Similarly, even if one surface of the lens is described as a concave shape, an edge portion of the lens may have a convex shape.

The paraxial region refers to a very narrow region near and including an optical axis.

The imaging surface may refer to a virtual surface on which a focus is formed by the optical imaging system. Alternatively, the imaging surface may refer to one surface of an image sensor on which light is received.

The optical imaging system according to an example embodiment of the present disclosure includes at least eleven lenses.

For example, the optical imaging system according to an example embodiment of the present disclosure includes a first lens, a second lens, a third lens, a fourth lens, a fifth lens, a sixth lens, a seventh lens, an eighth lens, a ninth lens, a tenth lens, and an eleventh lens arranged in order from an object side. The first to eleventh lenses are respectively spaced apart from each other by a predetermined distance along an optical axis.

However, the optical imaging system according to an example embodiment of the present disclosure may further include an image sensor for converting an image of an incident subject into an electrical signal.

Additionally, the optical imaging system may further include an infrared filter (hereinafter referred to as a "filter") for blocking infrared rays. The filter may be disposed between the eleventh lens and the image sensor.

Additionally, the optical imaging system may further include an aperture for adjusting an amount of light.

The first to eleventh lenses constituting the optical imaging system according to an example embodiment of the present disclosure may be formed of a plastic material.

Additionally, at least one of the first to eleventh lenses may have an aspherical surface. For example, each of the first to eleventh lenses may have at least one aspherical surface.

That is, at least one of the first and second surfaces of the first to eleventh lenses may be an aspherical surface. Here, the aspherical surfaces of the first to eleventh lenses are represented by Equation 1 below.

$$Z = \frac{cY^2}{1+\sqrt{1-(1+K)c^2Y^2}} + AY^4 + BY^6 + CY^8 + DY^{10} + EY^{12} + FY^{14} + GY^{16} + HY^{18} + JY^{20} + LY^{22} + MY^{24} + NY^{26} + OY^{28} + PY^{30}...$$

Equation 1

In Equation 1, c is a curvature of the lens (i.e., an inverse number of the curvature radius), K is a conic constant, and Y is a distance from any point on the aspherical surface of the lens to the optical axis in a direction perpendicular to the optical axis of the lens surface. Additionally, constants A to H, J, and L to P refer to an aspherical coefficients. Furthermore, Z (SAG) represents a distance in a direction parallel to the optical axis of the lens surface from the point on the lens surface at the distance Y from the optical axis of the lens surface to a tangential plane perpendicular to the optical axis and intersecting a vertex of the lens surface.

The optical imaging system may further include other elements in addition to the first to eleventh lenses.

The example optical imaging system according to an example embodiment of the present disclosure may satisfy at least one of the following conditional equations.

| | |
|---|---|
| $10 < f1/f2 < 150$ | (Conditional Equation 1) |
| $1.15 < TTL/f < 1.3$ | (Conditional Equation 2) |
| $30 < v2 - v3 < 40$ | (Conditional Equation 3) |
| $0.6 < TTL/(2 \times IMG\ HT) < 0.8$ | (Conditional Equation 4) |
| $Nv26 \geq 4$ | (Conditional Equation 5) |
| $29 < |v1 - v3| < 40$ | (Conditional Equation 6) |
| $30 < v2 - v6 < 40$ | (Conditional Equation 7) |
| $|f345| + |f678| < 0.3$ mm | (Conditional Equation 8) |
| $0.5 < |f345/f678| < 3$ | (Conditional Equation 9) |
| $1.5 < T2/T1 < 3$ | (Conditional Equation 10) |

$$1.4 < Fno < 1.7 \quad \text{(Conditional Equation 11)}$$

$$0.25 < D15/TTL < 0.45 \quad \text{(Conditional Equation 12)}$$

In the conditional equations, f is a total focal length of the optical imaging system, f1 is a focal length of the first lens, f2 is a focal length of the second lens, f345 is a composite focal length of the third lens, the fourth lens, and the fifth lens, and f678 is a composite focal length of the sixth lens, the seventh lens, and the eighth lens.

v1 is an Abbe number of the first lens, v2 is an Abbe number of the second lens, v3 is an Abbe number of the third lens, and v6 is an Abbe number of the sixth lens.

Nv26 is the number of lenses with an Abbe number of less than 26.

TTL is a distance on the optical axis from an object-side surface of the first lens to the imaging surface, and IMG HT is a maximum effective image height of the optical imaging system and is equal to one half a diagonal length of the effective imaging area of the imaging surface.

T1 is an optical axis thickness of the first lens, T2 is an optical axis thickness of the second lens, and D15 is a distance on an optical axis from the object-side surface of the first lens to an image-side surface of the fifth lens.

Fno is an F number of the optical imaging system.

The first lens may have positive refractive power. Additionally, the first lens may have a meniscus shape convex toward the object side. Additionally, a first surface of the first lens may have a shape convex in the paraxial region, and a second surface of the first lens may have a shape concave in the paraxial region.

Alternatively, the first lens may have a meniscus shape convex toward the image side. Additionally, the first surface of the first lens may have a shape concave in the paraxial region, and the second surface of the first lens may have a shape convex in the paraxial region.

The second lens may have positive refractive power. Additionally, the second lens may have a meniscus shape convex toward the object side. Additionally, a first surface of the second lens may have a shape convex in the paraxial region, and a second surface of the second lens may have a shape concave in the paraxial region.

The third lens may have negative or positive refractive power. Additionally, the third lens may have a meniscus shape convex toward the object side. Additionally, a first surface of the third lens may have a shape convex in the paraxial region, and a second surface of the third lens may have a shape concave in the paraxial region.

The fourth lens may have negative or positive refractive power. Additionally, the fourth lens may have a meniscus shape convex toward the object side. Additionally, a first surface of the fourth lens may have a shape convex in the paraxial region, and a second surface of the fourth lens may have a shape concave in the paraxial region.

The fifth lens has negative or positive refractive power. Additionally, the fifth lens may have a meniscus shape convex toward the object side. Additionally, a first surface of the fifth lens may have a shape convex in the paraxial region, and a second surface of the fifth lens may have a shape concave in the paraxial region.

Alternatively, the fifth lens may have a meniscus shape convex toward the image side. Additionally, the first surface of the fifth lens may have a shape concave in the paraxial region, and the second surface of the fifth lens may have a shape convex in the paraxial region.

The sixth lens may have negative or positive refractive power. The sixth lens may have a meniscus shape convex toward the image side. Additionally, the first surface of the sixth lens may have a shape concave in the paraxial region, and the second surface of the sixth lens may have a shape convex in the paraxial region.

Alternatively, the sixth lens may have a meniscus shape convex toward the object side. Additionally, the first surface of the sixth lens may have a shape convex in the paraxial region, and the second surface of the sixth lens may have a shape concave in the paraxial region.

The seventh lens may have negative refractive power. Additionally, the seventh lens may have a meniscus shape convex toward the object side. Additionally, a first surface of the seventh lens may have a shape convex in the paraxial region, and a second surface of the seventh lens may have a shape concave in the paraxial region.

The eighth lens may have negative refractive power. Additionally, the eighth lens may have a meniscus shape convex toward the object side. Additionally, a first surface of the eighth lens may have a shape convex in the paraxial region, and a second surface of the eighth lens may have a shape concave in the paraxial region.

Alternatively, the eighth lens may have a meniscus shape convex toward the image side. Additionally, the first surface of the eighth lens may have a shape concave in the paraxial region, and the second surface of the eighth lens may have a shape convex in the paraxial region.

Alternatively, the eighth lens may have a shape in which both surfaces thereof are concave. Additionally, the first surface and the second surface of the eighth lens may have a shape concave in the paraxial region.

The ninth lens has negative or positive refractive power. Alternatively, the ninth lens may have a meniscus shape convex toward the image side. Additionally, a first surface of the ninth lens may have a shape concave in the paraxial region, and a second surface of the ninth lens may have a shape convex in the paraxial region.

Additionally, the ninth lens may have a meniscus shape convex toward the object side. Additionally, the first surface of the ninth lens may have a shape convex in the paraxial region, and the second surface of the ninth lens may have a shape concave in the paraxial region.

The tenth lens has negative or positive refractive power. Additionally, the tenth lens may have a meniscus shape convex toward the object side. Additionally, a first surface of the tenth lens may have a shape convex in the paraxial region, and the second surface of the tenth lens may have a shape concave in the paraxial region.

Alternatively, the tenth lens may have a meniscus shape convex toward the image side. Additionally, the first surface of the tenth lens may have a shape concave in the paraxial region, and the second surface of the tenth lens may have a shape convex in the paraxial region.

Additionally, the tenth lens may have at least one inflection point formed on at least one of a first surface and a second surface. For example, the first surface of the tenth lens may have a shape convex in the paraxial region and may have a shape concave in a portion other than the paraxial region. The second surface of the tenth lens may have a shape concave in the paraxial region and may have a shape convex in a portion other than the paraxial region.

The eleventh lens has negative or positive refractive power. Additionally, the eleventh lens may have a meniscus shape convex toward the object side. Additionally, a first surface of the eleventh lens may have a shape convex in the paraxial region, and a second surface of the eleventh lens may have a shape concave in the paraxial region.

Alternatively, the eleventh lens may have a meniscus shape convex toward the image side. Additionally, the first surface of the eleventh lens may have a shape concave in the paraxial region, and the second surface of the eleventh lens may have a shape convex in the paraxial region.

Additionally, the eleventh lens may have at least one inflection point formed on at least one of the first surface and the second surface. For example, the first surface of the eleventh lens may have a shape convex in the paraxial region and may have a shape concave in a portion other than the paraxial region. The second surface of the eleventh lens may have a shape concave in the paraxial region and may have a shape convex in a portion other than the paraxial region.

In one or more examples, each of the at least two lenses disposed continuously may have an Abbe number of less than 26. For example, at least two lenses continuously arranged among the first to seventh lenses may have an Abbe number of less than 26.

Additionally, among the third to seventh lenses, there may be three or more lenses with an Abbe number of less than 26.

lens 101, a second lens 102, a third lens 103, a fourth lens 104, a fifth lens 105, a sixth lens 106, a seventh lens 107, an eighth lens 108, a ninth lens 109, a tenth lens 110, and an eleventh lens 111, and may further include a filter 112, and an image sensor IS.

The imaging optical system 100 according to the first embodiment of the present disclosure may form a focus on an imaging surface 113. The imaging surface 113 may refer to a surface on which a focus is formed by the optical imaging system. For example, the imaging surface 113 may refer to one surface of the image sensor IS on which light is received.

The lens characteristics of each lens (a radius of curvature, a thickness of the lens or a distance between the lenses, an index of refraction, an Abbe number, and a focal length) are illustrated in Table 1.

TABLE 1

| Surface Number | Division | Radius | Thickness or Distance | Index | Abbe Number | Focal Length |
| --- | --- | --- | --- | --- | --- | --- |
| S1 | First lens | 3.278 | 0.350 | 1.5349 | 55.74 | 442.1640 |
| S2 | | 3.200 | 0.062 | | | |
| S3 | Second lens | 3.137 | 1.029 | 1.5440 | 55.99 | 6.4940 |
| S4 | | 24.752 | 0.075 | | | |
| S5 | Third lens | 32.502 | 0.328 | 1.6707 | 19.24 | 4725.0200 |
| S6 | | 32.706 | 0.030 | | | |
| S7 | Fourth lens | 12.144 | 0.320 | 1.6707 | 19.24 | −13.7570 |
| S8 | | 5.188 | 0.115 | | | |
| S9 | Fifth lens | 6.001 | 0.508 | 1.5440 | 55.99 | 19.6215 |
| S10 | | 13.297 | 0.491 | | | |
| S11 | Sixth lens | −9.908 | 0.320 | 1.6707 | 19.24 | 1071.5600 |
| S12 | | −9.900 | 0.086 | | | |
| S13 | Seventh lens | 73.517 | 0.320 | 1.6608 | 20.38 | −48.3937 |
| S14 | | 22.245 | 0.139 | | | |
| S15 | Eighth lens | 21.886 | 0.353 | 1.5349 | 55.74 | −82.6041 |
| S16 | | 14.554 | 0.156 | | | |
| S17 | Ninth lens | −6.860 | 0.320 | 1.6144 | 25.94 | −89.2632 |
| S18 | | −7.979 | 0.155 | | | |
| S19 | Tenth lens | 3.031 | 0.566 | 1.5440 | 55.99 | 8.3438 |
| S20 | | 8.525 | 1.193 | | | |
| S21 | Eleventh lens | 30.790 | 0.686 | 1.5349 | 55.74 | −4.9024 |
| S22 | | 2.398 | 0.499 | | | |
| S23 | Filter | infinity | 0.210 | 1.5168 | 64.20 | |
| S24 | | infinity | 0.211 | | | |
| S25 | Imaging Surface | infinity | | | | |

At least one of the third to fifth lenses may have a refractive index of greater than 1.63 and an Abbe number of less than 24.

At least two of the sixth to eighth lenses may have a refractive index of greater than 1.61 and an Abbe number of less than 26.

An optical axis thickness of the second lens may be thicker than an optical axis thickness of the first lens.

An absolute value of a composite focal length of the third lens, the fourth lens, and the fifth lens may be less than 0.2 mm.

A composite focal length of the sixth lens, the seventh lens, and the eighth lens may have a negative value. Additionally, an absolute value of a composite focal length of the sixth lens, the seventh lens, and the eighth lens may be less than 0.1 mm.

An imaging optical system 100 according to a first embodiment of the present disclosure will be described with reference to FIGS. 1 and 2.

The imaging optical system 100 according to the first embodiment of the present disclosure may include a first In an example, a total focal length f of the imaging optical system 100 according to the first embodiment of the present disclosure is 6.85 mm, Fno is 1.497, and IMG HT is 6.15 mm.

In the first embodiment of the present disclosure, the first lens 101 has positive refractive power, a first surface of the first lens 101 has a shape convex in the paraxial region, and a second surface of the first lens 101 has a shape concave in the paraxial region.

The second lens 102 has positive refractive power, a first surface of the second lens 102 has a shape convex in the paraxial region, and a second surface of the second lens 102 has a shape concave in the paraxial region.

The third lens 103 has positive refractive power, a first surface of the third lens 103 has a shape convex in the paraxial region, and a second surface of the third lens 103 has a shape concave in the paraxial region.

The fourth lens 104 has negative refractive power, a first surface of the fourth lens 104 has a shape convex in the paraxial region, and a second surface of the fourth lens 104 has a shape concave in the paraxial region.

The fifth lens 105 has positive refractive power, a first surface of the fifth lens 105 has a shape convex in the paraxial region, and a second surface of the fifth lens 105 has a shape concave in the paraxial region.

The sixth lens 106 has positive refractive power, a first surface of the sixth lens 106 has a shape concave in the paraxial region, and a second surface of the sixth lens 106 has a shape convex in the paraxial region.

The seventh lens 107 has negative refractive power, a first surface of the seventh lens 107 has a shape convex in the paraxial region, and a second surface of the seventh lens 107 has a shape concave in the paraxial region.

The eighth lens 108 has negative refractive power, a first surface of the eighth lens 108 has a shape convex in the paraxial region, and a second surface of the eighth lens 108 has a shape concave in the paraxial region.

The ninth lens 109 has negative refractive power, a first surface of the ninth lens 109 has a shape concave in the paraxial region, and a second surface of the ninth lens 109 has a shape convex in the paraxial region.

The tenth lens 110 has positive refractive power, a first surface of the tenth lens 110 has a shape convex in the paraxial region, and a second surface of the tenth lens 110 has a shape concave in the paraxial region.

The eleventh lens 111 has negative refractive power, a first surface of the eleventh lens 111 has a shape convex in the paraxial region, and a second surface of the eleventh lens 111 has a shape concave in the paraxial region.

Additionally, at least one of the tenth lens 110 and the eleventh lens 111 has at least one inflection point formed on at least one of the first and second surfaces.

In an example, each surface of the first lens 101 to the eleventh lens 111 has an aspherical coefficient as illustrated in Table 2. For example, both the object-side surface and the image-side surface of the first lens 101 to eleventh lens 111 are aspherical surfaces.

TABLE 2

| | S1 | S2 | S3 | S4 | S5 | S6 | S7 | S8 |
|---|---|---|---|---|---|---|---|---|
| Conic Constant(K) | −4.96634 | −10.3439 | −5.7231 | 68.1141 | −16.8481 | 79.0045 | 19.0196 | 4.27825 |
| Fourth Coefficient(A) | 3.785E−02 | −1.507E−02 | 1.106E−01 | −8.695E−02 | −9.172E−03 | −3.011E−03 | −5.408E−03 | −8.847E−02 |
| Sixth Coefficient(B) | −4.090E−02 | −7.764E−03 | 2.962E−02 | −3.614E−03 | −2.640E−03 | 3.364E−03 | 2.069E−02 | −6.868E−04 |
| Eighth Coefficient(C) | 1.686E−03 | 5.129E−04 | −5.997E−03 | 3.535E−03 | 3.842E−03 | 4.552E−03 | 4.919E−03 | −3.800E−05 |
| Tenth Coefficient(D) | 2.098E−04 | −3.903E−03 | −2.781E−03 | −1.131E−03 | −1.433E−03 | −1.155E−03 | −1.334E−03 | −3.730E−04 |
| Twelfth Coefficient(E) | −3.541E−04 | 4.608E−04 | 6.600E−05 | 6.600E−05 | 4.323E−04 | 5.093E−04 | −1.900E−05 | −2.460E−04 |
| Fourteenth Coefficient(F) | −3.000E−05 | −7.700E−05 | −9.500E−05 | 1.500E−05 | 9.000E−05 | −2.429E−04 | −3.409E−04 | −1.233E−04 |
| Sixteenth Coefficient(G) | 4.000E−05 | 1.496E−04 | −4.600E−05 | 4.300E−05 | 5.900E−05 | 1.825E−04 | 2.106E−04 | 8.800E−05 |
| Eighteenth Coefficient(H) | 1.500E−05 | −5.300E−05 | −3.700E−05 | −3.300E−05 | −3.100E−05 | −3.300E−05 | −2.088E−04 | 1.300E−05 |
| Twentieth Coefficient(J) | −1.100E−05 | 1.500E−05 | −5.000E−06 | 6.000E−06 | 3.000E−06 | −2.000E−06 | −3.300E−05 | −1.400E−05 |
| Twenty-second Coefficient(L) | 3.358E−07 | −1.300E−05 | 0.000E+00 | 0.000E+00 | −2.000E−06 | 3.764E−07 | 0.000E+00 | 0.000E+00 |
| Twenty-fourth Coefficient(M) | −6.000E−06 | 1.100E−05 | 0.000E+00 | 0.000E+00 | 2.000E−06 | −2.497E−07 | 0.000E+00 | 0.000E+00 |
| Twenty-sixth Coefficient(N) | 1.100E−05 | −2.000E−06 | 0.000E+00 | 0.000E+00 | −2.000E−06 | 1.000E−06 | 0.000E+00 | 0.000E+00 |
| Twenty-eighth Coefficient(O) | −5.000E−06 | −2.000E−06 | 0.000E+00 | 0.000E+00 | 1.000E−06 | −1.000E−06 | 0.000E+00 | 0.000E+00 |
| Thirtieth Coefficient(P) | 1.000E−06 | 1.000E−06 | 0.000E+00 | 0.000E+00 | −5.804E−08 | 2.383E−07 | 0.000E+00 | 0.000E+00 |

| | S9 | S10 | S11 | S12 | S13 | S14 | S15 | S16 |
|---|---|---|---|---|---|---|---|---|
| Conic Constant(K) | −6.74563 | −25.5157 | 25.4415 | 20.1007 | 37.6587 | −5.93856 | 93.9507 | 24.2156 |
| Fourth Coefficient(A) | 7.851E−03 | 8.305E−03 | −3.804E−02 | −3.231E−02 | −3.282E−01 | −4.705E−01 | −6.482E−01 | −1.057E+00 |
| Sixth Coefficient(B) | 9.544E−03 | 1.039E−02 | −1.546E−02 | −1.412E−02 | −1.306E−02 | −1.225E−02 | 6.798E−03 | 1.217E−01 |
| Eighth Coefficient(C) | 4.983E−03 | 9.662E−03 | 2.474E−03 | 6.151E−03 | −6.676E−04 | 3.690E−03 | −9.899E−03 | 1.292E−02 |
| Tenth Coefficient(D) | 7.176E−04 | 3.423E−03 | 2.845E−04 | −4.401E−03 | −4.070E−03 | −1.460E−03 | 1.952E−02 | 4.364E−02 |
| Twelfth Coefficient(E) | 2.266E−04 | 1.000E−03 | 7.800E−05 | −1.567E−03 | 5.521E−04 | 5.272E−03 | 6.412E−03 | 4.756E−03 |
| Fourteenth Coefficient(F) | 6.000E−05 | 7.600E−05 | −4.700E−05 | −3.954E−04 | 3.399E−04 | 3.297E−03 | 3.026E−04 | −3.432E−03 |
| Sixteenth Coefficient(G) | 9.100E−05 | −8.800E−05 | 7.000E−06 | 4.794E−04 | 1.098E−03 | 2.629E−03 | −1.578E−03 | −8.713E−03 |
| Eighteenth Coefficient(H) | 2.400E−05 | −3.300E−05 | −5.300E−05 | 1.708E−04 | −8.000E−05 | 5.873E−04 | 8.126E−04 | −1.821E−03 |
| Twentieth Coefficient(J) | −1.000E−05 | −3.000E−06 | 1.600E−05 | 5.438E−04 | 2.153E−04 | 3.973E−04 | 2.757E−03 | −4.902E−04 |
| Twenty-second Coefficient(L) | 0.000E+00 | 0.000E+00 | −1.400E−05 | 1.201E−04 | 8.100E−05 | 3.614E−04 | 3.802E−03 | 1.020E−03 |

TABLE 2-continued

| | | | | | | | | |
|---|---|---|---|---|---|---|---|---|
| Twenty-fourth Coefficient(M) | 0.000E+00 | 0.000E+00 | 1.100E−05 | 1.301E−04 | 5.300E−05 | 5.700E−05 | 2.305E−03 | 1.046E−03 |
| Twenty-sixth Coefficient(N) | 0.000E+00 | 0.000E+00 | −2.000E−06 | 3.100E−05 | 2.400E−05 | 7.200E−05 | 1.507E−03 | 5.224E−04 |
| Twenty-eighth Coefficient(O) | 0.000E+00 | 0.000E+00 | 2.000E−06 | 3.500E−05 | −2.000E−06 | −3.000E−06 | 5.645E−04 | 7.100E−05 |
| Thirtieth Coefficient(P) | 0.000E+00 | 0.000E+00 | −2.000E−06 | 9.000E−06 | 6.000E−06 | 2.500E−05 | 1.973E−04 | 8.200E−05 |

| | S17 | S18 | S19 | S20 | S21 | S22 |
|---|---|---|---|---|---|---|
| Conic Constant(K) | 4.35313 | 1.69064 | −6.25954 | −10.3548 | 33.6925 | −11.2459 |
| Fourth Coefficient(A) | −7.600E−02 | −4.047E−02 | −1.725E+00 | −1.518E+00 | −2.460E+00 | −2.669E+00 |
| Sixth Coefficient(B) | −9.586E−02 | 1.748E−02 | 6.912E−02 | −1.250E−01 | 1.280E+00 | 8.046E−01 |
| Eighth Coefficient(C) | 1.034E−02 | −2.313E−02 | 1.332E−01 | 2.095E−01 | −5.401E−01 | −1.184E−01 |
| Tenth Coefficient(D) | −1.752E−02 | −2.077E−02 | 2.143E−02 | 3.110E−02 | 1.693E−01 | 6.083E−02 |
| Twelfth Coefficient(E) | 1.077E−02 | 1.052E−02 | −1.842E−02 | 1.763E−03 | −6.545E−02 | −6.962E−02 |
| Fourteenth Coefficient(F) | 1.138E−02 | 1.314E−03 | −8.297E−03 | −1.358E−02 | 4.577E−02 | 3.646E−02 |
| Sixteenth Coefficient(G) | 3.342E−03 | −5.217E−03 | −1.111E−03 | −1.731E−03 | −2.846E−02 | −6.038E−03 |
| Eighteenth Coefficient(H) | 1.660E−03 | −1.950E−03 | 3.620E−03 | 6.130E−03 | 8.010E−03 | 1.431E−02 |
| Twentieth Coefficient(J) | −2.129E−03 | −1.004E−03 | 2.965E−04 | 4.337E−03 | −7.061E−04 | −4.905E−03 |
| Twenty-second Coefficient(L) | −1.953E−03 | 1.402E−04 | 6.141E−04 | 3.903E−03 | 2.743E−03 | 4.270E−03 |
| Twenty-fourth Coefficient(M) | 1.550E−04 | 4.864E−04 | −1.878E−04 | 5.139E−04 | −4.840E−03 | −2.621E−03 |
| Twenty-sixth Coefficient(N) | −3.373E−04 | −4.662E−04 | 1.546E−04 | 6.397E−04 | 3.592E−03 | 4.919E−03 |
| Twenty-eighth Coefficient(O) | −1.261E−04 | 2.848E−04 | 1.750E−04 | 8.000E−05 | −1.343E−03 | 2.150E−03 |
| Thirtieth Coefficient(P) | 4.600E−05 | 1.797E−04 | 8.400E−05 | 6.000E−05 | 2.051E−04 | 1.755E−03 |

Figure 2:
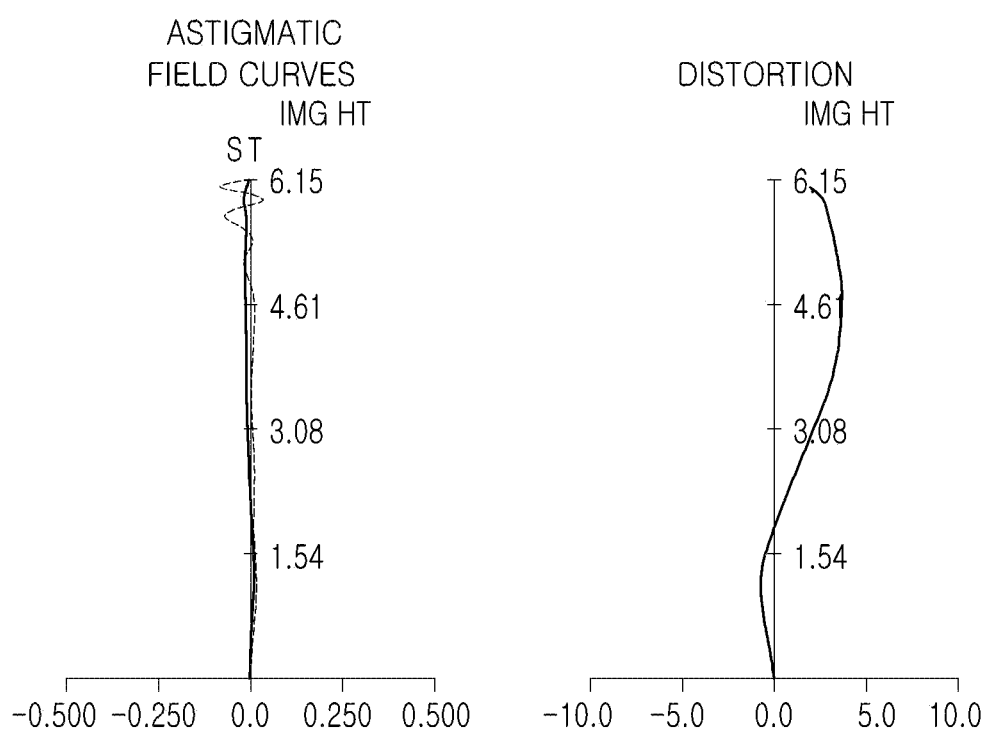
FIG. 2 is a view illustrating aberration characteristics of the example optical imaging system illustrated in FIG. 1.

Additionally, the example imaging optical system configured described above may have the aberration characteristics illustrated in FIG. 2.

Figure 3:
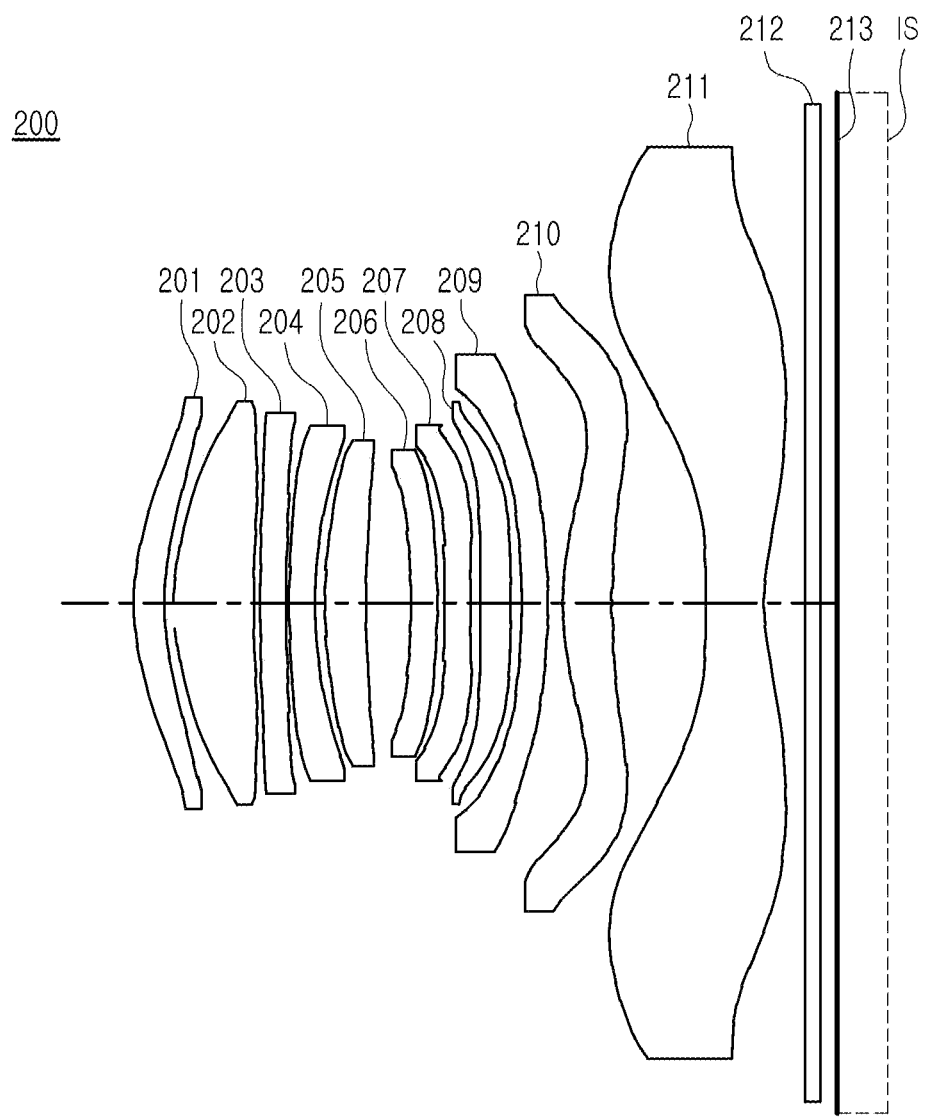
FIG. 3 illustrates a structural view of an example optical imaging system according to a second embodiment of the present disclosure.

An imaging optical system 200 according to a second embodiment of the present disclosure will be described with reference to FIGS. 3 and 4.

The imaging optical system 200 according to the second embodiment of the present disclosure may include a first lens 201, a second lens 202, a third lens 203, a fourth lens 204, a fifth lens 205, a sixth lens 206, a seventh lens 207, an eighth lens 208, a ninth lens 209, a tenth lens 210, and an eleven lens 211, and may further include a filter 212 and an image sensor IS.

The imaging optical system 200 according to the second embodiment of the present disclosure may form a focus on an imaging surface 213. The imaging surface 213 may refer to a surface on which a focus is formed by the imaging optical system. For example, the imaging surface 213 may mean one surface of the image sensor IS on which light is received.

The lens characteristics of each lens (a radius of curvature, a thickness of the lens or a distance between the lenses, an index of refraction, an Abbe number, and a focal length) are illustrated in Table 3.

TABLE 3

| Surface Number | Division | Radius | Thickness or Distance | Index | Abbe Number | Focal Length |
|---|---|---|---|---|---|---|
| S1 | First lens | 3.290 | 0.373 | 1.5349 | 55.74 | 497.2780 |
| S2 | | 3.200 | 0.115 | | | |
| S3 | Second lens | 3.144 | 0.987 | 1.5440 | 55.99 | 6.4754 |
| S4 | | 26.031 | 0.075 | | | |
| S5 | Third lens | 33.420 | 0.320 | 1.6707 | 19.24 | −674.1150 |
| S6 | | 31.000 | 0.032 | | | |
| S7 | Fourth lens | 12.361 | 0.320 | 1.6707 | 19.24 | −14.3714 |
| S8 | | 5.360 | 0.126 | | | |
| S9 | Fifth lens | 6.385 | 0.505 | 1.5440 | 55.99 | 20.1550 |
| S10 | | 14.862 | 0.545 | | | |
| S11 | Sixth lens | −9.707 | 0.320 | 1.6707 | 19.24 | 2521.1700 |
| S12 | | −9.779 | 0.088 | | | |
| S13 | Seventh lens | 129.183 | 0.320 | 1.6608 | 20.38 | −49.1978 |
| S14 | | 25.946 | 0.118 | | | |

TABLE 3-continued

| Surface Number | Division | Radius | Thickness or Distance | Index | Abbe Number | Focal Length |
|---|---|---|---|---|---|---|
| S15 | Eighth lens | 21.922 | 0.367 | 1.5349 | 55.74 | −90.7150 |
| S16 | | 15.012 | 0.143 | | | |
| S17 | Ninth lens | −6.769 | 0.320 | 1.6144 | 25.94 | −69.7371 |
| S18 | | −8.184 | 0.181 | | | |
| S19 | Tenth lens | 3.141 | 0.605 | 1.5440 | 55.99 | 7.9563 |
| S20 | | 10.671 | 1.147 | | | |
| S21 | Eleventh lens | 30.767 | 0.710 | 1.5349 | 55.74 | −4.7977 |
| S22 | | 2.349 | 0.499 | | | |
| S23 | Filter | infinity | 0.210 | 1.5168 | 64.20 | |
| S24 | | infinity | 0.211 | | | |
| S25 | Imaging Surface | infinity | | | | |

In an example, a total focal length f of the imaging optical system 200 according to the second embodiment of the present disclosure is 6.85 mm, Fno is 1.497, and IMG HT is 6.15 mm.

In the second embodiment of the present disclosure, the first lens 201 has positive refractive power, a first surface of the first lens 201 has a shape convex in the paraxial region, and a second surface of the first lens 201 has a shape concave in the paraxial region.

The second lens 202 has positive refractive power, a first surface of the second lens 202 has a shape convex in the paraxial region, and a second surface of the second lens 202 has a shape concave in the paraxial region.

The third lens 203 has negative refractive power, a first surface of the third lens 203 has a shape convex in the paraxial region, and a second surface of the third lens 203 has a shape concave in the paraxial region.

The fourth lens 204 has negative refractive power, a first surface of the fourth lens 204 has a shape convex in the paraxial region, and a second surface of the fourth lens 204 has a shape concave in the paraxial region.

The fifth lens 205 has positive refractive power, a first surface of the fifth lens 205 has a shape convex in the paraxial region, and a second surface of the fifth lens 205 has a shape concave in the paraxial region.

The sixth lens 206 has positive refractive power, a first surface of the sixth lens 206 has a shape concave in the paraxial region, and a second surface of the sixth lens 206 has a shape convex in the paraxial region.

The seventh lens 207 has negative refractive power, a first surface of the seventh lens 207 has a shape convex in the paraxial region, and a second surface of the seventh lens 207 has a shape concave in the paraxial region.

The eighth lens 208 has negative refractive power, a first surface of the eighth lens 208 has a shape convex in the paraxial region, and a second surface of the eighth lens 208 has a shape concave in the paraxial region.

The ninth lens 209 has negative refractive power, a first surface of the ninth lens 209 has a shape concave in the paraxial region, and a second surface of the ninth lens 209 has a shape convex in the paraxial region.

The tenth lens 210 has positive refractive power, a first surface of the tenth lens 210 has a shape convex in the paraxial region, and a second surface of the tenth lens 210 has a shape concave in the paraxial region.

The eleventh lens 211 has negative refractive power, a first surface of the eleventh lens 211 has a shape convex in the paraxial region, and a second surface of the eleventh lens 211 has a shape concave in the paraxial region.

Additionally, at least one of the tenth lens 210 and the eleventh lens 211 has at least one inflection point formed on at least one of the first and second surfaces.

In an example, each surface of the first lens 201 to the eleventh lens 211 has an aspherical coefficient as illustrated in Table 4. For example, both the object-side surface and the image-side surface of the first lens 201 to the eleventh lens 211 are aspherical surfaces.

TABLE 4

| | S1 | S2 | S3 | S4 | S5 | S6 | S7 | S8 |
|---|---|---|---|---|---|---|---|---|
| Conic Constant(K) | −4.9224 | −10.4996 | −5.37979 | 59.7152 | −28.0335 | 61.3777 | 19.295 | 4.08095 |
| Fourth Coefficient(A) | 3.624E−02 | −1.435E−02 | 1.156E−01 | −9.029E−02 | −1.015E−02 | −5.198E−03 | −3.413E−03 | −9.513E−02 |
| Sixth Coefficient(B) | −4.235E−02 | −6.643E−03 | 2.830E−02 | −3.790E−03 | −5.937E−03 | 5.762E−03 | 1.824E−02 | −6.379E−04 |
| Eighth Coefficient(C) | 1.071E−03 | 1.046E−03 | −5.648E−03 | 5.146E−03 | 4.638E−03 | 6.294E−03 | 6.386E−03 | 6.292E−04 |
| Tenth Coefficient(D) | −5.500E−05 | −3.953E−03 | −2.524E−03 | −1.931E−03 | −1.755E−03 | −1.817E−03 | −1.810E−03 | −1.084E−03 |
| Twelfth Coefficient(E) | −4.540E−04 | 4.397E−04 | −2.812E−04 | 2.521E−04 | 1.010E−03 | 3.738E−04 | −4.673E−04 | −3.483E−04 |
| Fourteenth Coefficient(F) | 4.000E−05 | −1.441E−04 | −3.838E−04 | −2.883E−04 | 1.478E−04 | −2.900E−05 | −2.955E−04 | −3.117E−04 |
| Sixteenth Coefficient(G) | −9.000E−06 | 2.200E−05 | −3.533E−04 | −2.997E−04 | −9.400E−05 | 1.502E−04 | 1.789E−04 | −1.000E−06 |
| Eighteenth Coefficient(H) | 1.400E−05 | −5.300E−05 | −1.495E−04 | −3.600E−05 | 4.400E−05 | −8.500E−05 | −1.534E−04 | −7.200E−05 |
| Twentieth Coefficient(J) | −3.000E−05 | 2.000E−06 | −4.500E−05 | 4.000E−06 | 5.400E−05 | 8.800E−05 | 6.700E−05 | −6.000E−06 |
| Twenty-second Coefficient(L) | 1.100E−05 | 7.000E−06 | 0.000E+00 | 0.000E+00 | 2.500E−05 | 1.700E−05 | 0.000E+00 | 0.000E+00 |

TABLE 4-continued

| | | | | | | | | |
|---|---|---|---|---|---|---|---|---|
| Twenty-fourth Coefficient(M) | −3.000E−06 | 5.000E−06 | 0.000E+00 | 0.000E+00 | 9.000E−06 | 8.000E−06 | 0.000E+00 | 0.000E+00 |
| Twenty-sixth Coefficient(N) | 8.000E−06 | −3.000E−06 | 0.000E+00 | 0.000E+00 | −2.000E−06 | 1.000E−06 | 0.000E+00 | 0.000E+00 |
| Twenty-eighth Coefficient(O) | −7.000E−06 | −2.000E−06 | 0.000E+00 | 0.000E+00 | −1.000E−06 | −2.000E−06 | 0.000E+00 | 0.000E+00 |
| Thirtieth Coefficient(P) | 1.000E−06 | 2.000E−06 | 0.000E+00 | 0.000E+00 | −3.000E−06 | −1.000E−06 | 0.000E+00 | 0.000E+00 |

| | S9 | S10 | S11 | S12 | S13 | S14 | S15 | S16 |
|---|---|---|---|---|---|---|---|---|
| Conic Constant(K) | −5.73404 | −53.5322 | 25.6492 | 20.5011 | 99 | 6.01195 | 93.9203 | 24.0732 |
| Fourth Coefficient(A) | 1.229E−02 | −3.385E−03 | −4.132E−02 | −3.364E−02 | −3.258E−01 | −4.687E−01 | −6.488E−01 | −1.058E+00 |
| Sixth Coefficient(B) | 1.192E−02 | 8.404E−03 | −1.444E−02 | −1.512E−02 | −1.300E−02 | −1.531E−02 | 3.688E−03 | 1.251E−01 |
| Eighth Coefficient(C) | 6.551E−03 | 1.118E−02 | 4.268E−03 | 6.355E−03 | −3.730E−04 | 5.129E−03 | −9.699E−03 | 1.169E−02 |
| Tenth Coefficient(D) | 1.257E−03 | 3.922E−03 | 6.211E−04 | −4.445E−03 | −4.262E−03 | −1.220E−03 | 2.051E−02 | 4.290E−02 |
| Twelfth Coefficient(E) | 6.848E−04 | 1.100E−03 | 1.684E−04 | −1.370E−03 | 3.329E−04 | 5.264E−03 | 6.783E−03 | 4.750E−03 |
| Fourteenth Coefficient(F) | −1.700E−05 | 4.800E−05 | −4.000E−06 | −3.192E−04 | 2.624E−04 | 2.978E−03 | −1.715E−04 | −3.424E−03 |
| Sixteenth Coefficient(G) | −1.800E−05 | 1.200E−05 | 1.000E−05 | 3.708E−04 | 1.174E−03 | 2.621E−03 | −1.633E−03 | −8.719E−03 |
| Eighteenth Coefficient(H) | −2.500E−05 | 7.100E−05 | −4.400E−05 | 4.800E−05 | −7.500E−05 | 6.869E−04 | 9.093E−04 | −1.389E−03 |
| Twentieth Coefficient(J) | −5.000E−06 | 3.400E−05 | 2.300E−05 | 5.529E−04 | 2.606E−04 | 3.602E−04 | 2.495E−03 | −3.902E−04 |
| Twenty-second Coefficient(L) | 0.000E+00 | 0.000E+00 | −1.300E−05 | 1.679E−04 | 5.100E−05 | 3.377E−04 | 3.788E−03 | 1.005E−03 |
| Twenty-fourth Coefficient(M) | 0.000E+00 | 0.000E+00 | 1.100E−05 | 2.080E−04 | 5.300E−05 | 3.300E−05 | 2.253E−03 | 9.012E−04 |
| Twenty-sixth Coefficient(N) | 0.000E+00 | 0.000E+00 | −4.000E−06 | 5.700E−05 | 1.700E−05 | 5.800E−05 | 1.576E−03 | 4.158E−04 |
| Twenty-eighth Coefficient(O) | 0.000E+00 | 0.000E+00 | −2.000E−06 | 4.500E−05 | −5.000E−06 | −2.000E−05 | 6.219E−04 | 6.000E−06 |
| Thirtieth Coefficient(P) | 0.000E+00 | 0.000E+00 | −3.000E−06 | 1.200E−05 | 6.000E−06 | 2.700E−05 | 2.448E−04 | 6.700E−05 |

| | S17 | S18 | S19 | S20 | S21 | S22 |
|---|---|---|---|---|---|---|
| Conic Constant(K) | 4.35313 | 1.69064 | −6.22805 | −7.43048 | 33.7128 | −11.388 |
| Fourth Coefficient(A) | −7.600E−02 | −4.047E−02 | −1.720E+00 | −1.485E+00 | −2.459E+00 | −2.589E+00 |
| Sixth Coefficient(B) | −9.586E−02 | 1.748E−02 | 7.059E−02 | −1.357E−01 | 1.278E+00 | 7.786E−01 |
| Eighth Coefficient(C) | 1.034E−02 | −2.313E−02 | 1.327E−01 | 2.144E−01 | −5.392E−01 | −1.104E−01 |
| Tenth Coefficient(D) | −1.752E−02 | −2.077E−02 | 2.375E−02 | 3.478E−02 | 1.696E−01 | 5.282E−02 |
| Twelfth Coefficient(E) | 1.077E−02 | 1.052E−02 | −1.985E−02 | −1.076E−03 | −6.566E−02 | −6.650E−02 |
| Fourteenth Coefficient(F) | 1.138E−02 | 1.314E−03 | −7.070E−03 | −1.185E−02 | 4.572E−02 | 3.564E−02 |
| Sixteenth Coefficient(G) | 3.342E−03 | −5.217E−03 | −2.569E−03 | −3.569E−03 | −2.842E−02 | −4.935E−03 |
| Eighteenth Coefficient(H) | 1.660E−03 | −1.950E−03 | 2.940E−03 | 6.287E−03 | 8.137E−03 | 1.380E−02 |
| Twentieth Coefficient(J) | −2.129E−03 | −1.004E−03 | 2.200E−05 | 4.571E−03 | −7.720E−04 | −4.231E−03 |
| Twenty-second Coefficient(L) | −1.953E−03 | 1.402E−04 | 9.653E−04 | 4.711E−03 | 2.732E−03 | 4.859E−03 |
| Twenty-fourth Coefficient(M) | 1.550E−04 | 4.864E−04 | −7.100E−05 | 6.619E−04 | −4.832E−03 | −1.153E−03 |
| Twenty-sixth Coefficient(N) | −3.373E−04 | −4.662E−04 | −7.800E−05 | 2.208E−04 | 3.602E−03 | 6.339E−03 |
| Twenty-eighth Coefficient(O) | −1.261E−04 | 2.848E−04 | −5.800E−05 | −3.333E−04 | −1.349E−03 | 2.687E−03 |
| Thirtieth Coefficient(P) | 4.600E−05 | 1.797E−04 | −1.500E−05 | −1.632E−04 | 2.042E−04 | 1.856E−03 |

Figure 4:
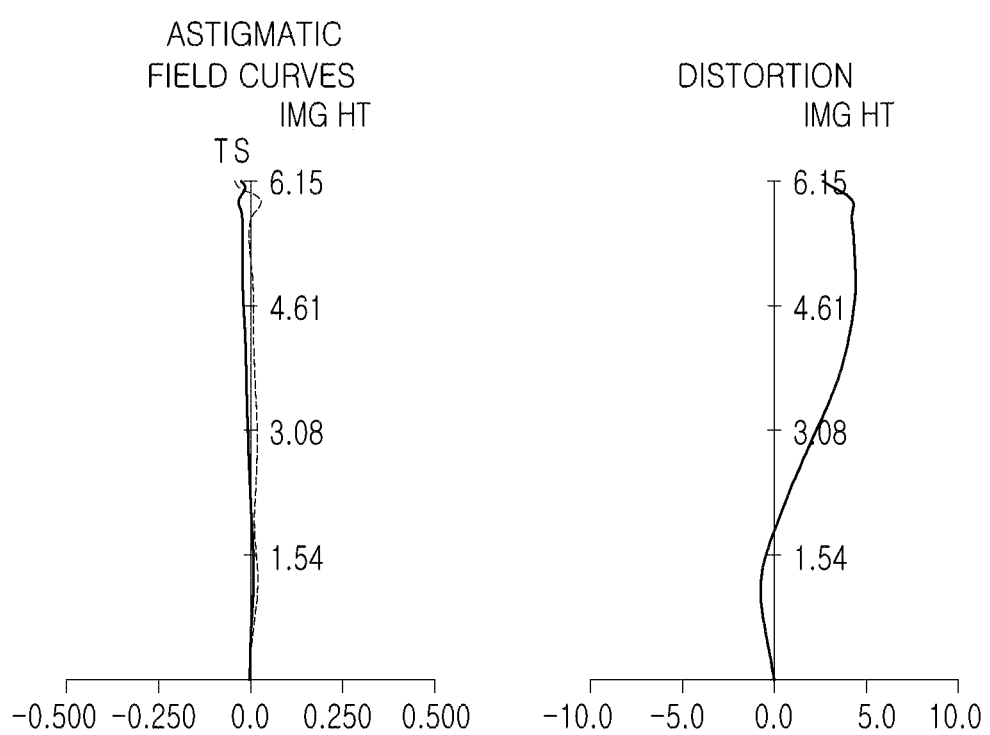
FIG. 4 is a view illustrating aberration characteristics of the example optical imaging system illustrated in FIG. 3.

Additionally, the example imaging optical system configured described above may have the aberration characteristics illustrated in FIG. 4.

Figure 5:
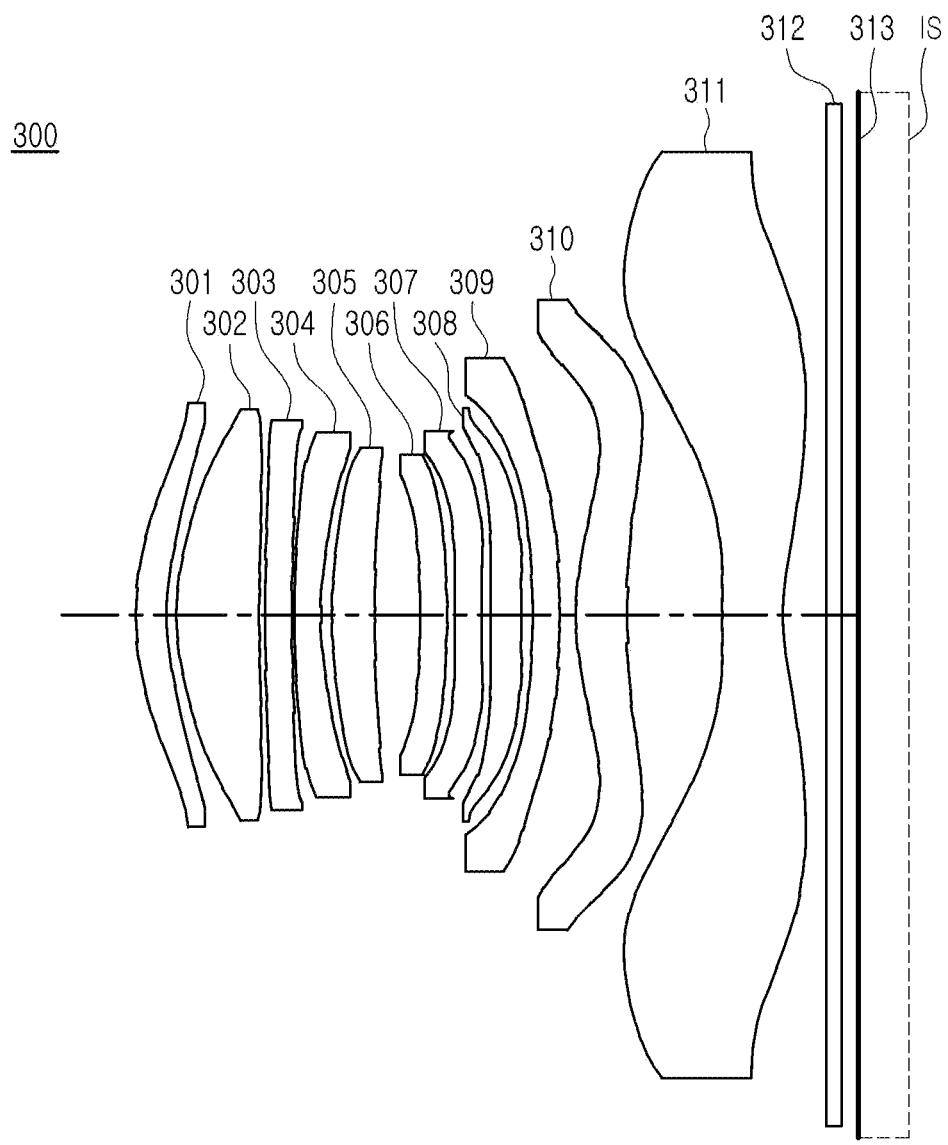
FIG. 5 illustrates a structural view of an example optical imaging system according to a third embodiment of the present disclosure.

An imaging optical system 300 according to a third embodiment of the present disclosure will be described with reference to FIGS. 5 and 6.

The imaging optical system 300 according to the third embodiment of the present disclosure may include a first lens 301, a second lens 302, a third lens 303, a fourth lens 304, a fifth lens 305, a sixth lens 306, a seventh lens 307, an eighth lens 308, a ninth lens 309, a tenth lens 310, and an eleventh lens 311, and may further include a filter 312 and an image sensor IS.

The imaging optical system 300 according to the third embodiment of the present disclosure may form a focus on an imaging surface 313. The imaging surface 313 may refer to a surface on which a focus is formed by the imaging optical system. For example, the imaging surface 313 may refer to one surface of the image sensor IS on which light is received.

The lens characteristics of each lens (a radius of curvature, a thickness of the lens or a distance between the lenses, an index of refraction, an Abbe number, and a focal length) are illustrated in Table 5.

The fourth lens 304 has negative refractive power, a first surface of the fourth lens 304 has a shape convex in the paraxial region, and a second surface of the fourth lens 304 has a shape concave in the paraxial region.

The fifth lens 305 has positive refractive power, a first surface of the fifth lens 305 has a shape convex in the paraxial region, and a second surface of the fifth lens 305 has a shape concave in the paraxial region.

The sixth lens 306 has positive refractive power, a first surface of the sixth lens 306 has a shape concave in the paraxial region, and a second surface of the sixth lens 306 has a shape convex in the paraxial region.

The seventh lens 307 has a negative refractive power, a first surface of the seventh lens 307 has a shape convex in the paraxial region, and a second surface of the seventh lens 307 has a shape concave in the paraxial region.

The eighth lens 308 has negative refractive power, a first surface of the eighth lens 308 has a shape convex in the paraxial region, and a second surface of the eighth lens 308 has a shape concave in the paraxial region.

The ninth lens 309 has negative refractive power, a first surface of the ninth lens 309 has a shape concave in the

TABLE 5

| Surface Number | Division | Radius | Thickness or Distance | Index | Abbe Number | Focal Length |
|---|---|---|---|---|---|---|
| S1 | First lens | 3.293 | 0.373 | 1.5349 | 55.74 | 537.2850 |
| S2 | | 3.200 | 0.116 | | | |
| S3 | Second lens | 3.146 | 0.986 | 1.5440 | 55.99 | 6.4782 |
| S4 | | 26.053 | 0.075 | | | |
| S5 | Third lens | 33.050 | 0.320 | 1.6608 | 20.38 | −806.4510 |
| S6 | | 31.000 | 0.030 | | | |
| S7 | Fourth lens | 12.421 | 0.320 | 1.6707 | 19.24 | −14.3508 |
| S8 | | 5.367 | 0.124 | | | |
| S9 | Fifth lens | 6.400 | 0.508 | 1.5440 | 55.99 | 20.1036 |
| S10 | | 14.995 | 0.552 | | | |
| S11 | Sixth lens | −9.649 | 0.320 | 1.6707 | 19.24 | 2196.8900 |
| S12 | | −9.714 | 0.090 | | | |
| S13 | Seventh lens | 258.161 | 0.320 | 1.6608 | 20.38 | −48.8973 |
| S14 | | 28.701 | 0.110 | | | |
| S15 | Eighth lens | 21.894 | 0.366 | 1.5349 | 55.74 | −91.2938 |
| S16 | | 15.028 | 0.141 | | | |
| S17 | Ninth lens | −6.742 | 0.320 | 1.6144 | 25.94 | −70.6238 |
| S18 | | −8.127 | 0.185 | | | |
| S19 | Tenth lens | 3.169 | 0.615 | 1.5440 | 55.99 | 7.9668 |
| S20 | | 10.984 | 1.142 | | | |
| S21 | Eleventh lens | 30.765 | 0.713 | 1.5349 | 55.74 | −4.8044 |
| S22 | | 2.352 | 0.499 | | | |
| S23 | Filter | infinity | 0.210 | 1.5168 | 64.20 | |
| S24 | | infinity | 0.211 | | | |
| S25 | Imaging Surface | infinity | | | | |

In an example, a total focal length f of the imaging optical system 300 according to the third embodiment of the present disclosure is 6.85 mm, Fno is 1.497, and IMG HT is 6.15 mm.

In the third embodiment of the present disclosure, the first lens 301 has positive refractive power, a first surface of the first lens 301 has a shape convex in the paraxial region, and the second surface of the first lens 301 has a shape concave in the paraxial region.

The second lens 302 has positive refractive power, a first surface of the second lens 302 has a shape convex in the paraxial region, and a second surface of the second lens 302 has a shape concave in the paraxial region.

The third lens 303 has negative refractive power, a first surface of the third lens 303 has a shape convex in the paraxial region, and a second surface of the third lens 303 has a shape concave in the paraxial region.

paraxial region, and a second surface of the ninth lens 309 has a shape convex in the paraxial region.

The tenth lens 310 has positive refractive power, a first surface of the tenth lens 310 has a shape convex in the paraxial region, and a second surface of the tenth lens 310 has a shape concave in the paraxial region.

The eleventh lens 311 has negative refractive power, a first surface of the eleventh lens 311 has a shape convex in the paraxial region, and a second surface of the eleventh lens 311 has a shape concave in the paraxial region.

In addition, at least one of the tenth lens 310 and the eleventh lens 311 has at least one inflection point formed on at least one of the first and second surfaces.

In an example, each surface of the first lens 301 to the eleventh lens 311 has an aspherical coefficient as illustrated in Table 6. For example, both the object-side surface and the image-side surface of the first lens 301 to the eleventh lens 311 are aspherical surfaces.

TABLE 6

| | S1 | S2 | S3 | S4 | S5 | S6 | S7 | S8 |
|---|---|---|---|---|---|---|---|---|
| Conic Constant(K) | −4.9299 | −10.4871 | −5.38304 | 59.9097 | −37.2951 | 62.139 | 19.1087 | 4.07121 |
| Fourth Coefficient(A) | 3.636E−02 | −1.462E−02 | 1.156E−01 | −9.027E−02 | −1.082E−02 | −5.220E−03 | −3.903E−03 | −9.556E−02 |
| Sixth Coefficient(B) | −4.222E−02 | −6.797E−03 | 2.843E−02 | −3.700E−03 | −6.195E−03 | 6.218E−03 | 1.827E−02 | −5.198E−04 |
| Eighth Coefficient(C) | 9.479E−04 | 1.080E−03 | −5.460E−03 | 5.379E−03 | 5.039E−03 | 6.868E−03 | 6.448E−03 | 8.313E−04 |
| Tenth Coefficient(D) | −8.500E−05 | −4.025E−03 | −2.714E−03 | −2.062E−03 | −1.921E−03 | −2.038E−03 | −2.058E−03 | −1.141E−03 |
| Twelfth Coefficient(E) | −4.690E−04 | 4.400E−04 | −3.855E−04 | 3.262E−04 | 1.090E−03 | 4.511E−04 | −4.997E−04 | −4.417E−04 |
| Fourteenth Coefficient(F) | 5.200E−05 | −1.440E−04 | −4.999E−04 | −3.591E−04 | 1.466E−04 | −4.000E−05 | −3.245E−04 | −3.366E−04 |
| Sixteenth Coefficient(G) | −2.600E−05 | −1.800E−05 | −4.418E−04 | −2.983E−04 | −8.300E−05 | 1.608E−04 | 1.778E−04 | 5.000E−06 |
| Eighteenth Coefficient(H) | 1.000E−05 | −5.400E−05 | −1.739E−04 | −2.100E−05 | 3.900E−05 | −1.013E−04 | −1.704E−04 | −8.200E−05 |
| Twentieth Coefficient(J) | −3.200E−05 | 4.000E−06 | −4.600E−05 | 1.100E−05 | 5.000E−05 | 1.043E−04 | 8.700E−05 | −8.000E−06 |
| Twenty-second Coefficient(L) | 1.500E−05 | 1.100E−05 | 0.000E+00 | 0.000E+00 | 2.300E−05 | 1.700E−05 | 0.000E+00 | 0.000E+00 |
| Twenty-fourth Coefficient(M) | −4.000E−06 | 4.000E−06 | 0.000E+00 | 0.000E+00 | 1.000E−05 | 1.100E−05 | 0.000E+00 | 0.000E+00 |
| Twenty-sixth Coefficient(N) | 8.000E−06 | −3.000E−06 | 0.000E+00 | 0.000E+00 | −3.285E−07 | 2.000E−06 | 0.000E+00 | 0.000E+00 |
| Twenty-eighth Coefficient(O) | −7.000E−06 | −2.000E−06 | 0.000E+00 | 0.000E+00 | 1.000E−06 | −1.000E−06 | 0.000E+00 | 0.000E+00 |
| Thirtieth Coefficient(P) | 2.000E−06 | 2.000E−06 | 0.000E+00 | 0.000E+00 | −2.000E−06 | −1.000E−06 | 0.000E+00 | 0.000E+00 |

| | S9 | S10 | S11 | S12 | S13 | S14 | S15 | S16 |
|---|---|---|---|---|---|---|---|---|
| Conic Constant(K) | −5.73665 | −56.1036 | 25.6818 | 20.5659 | 82.4366 | 13.8377 | 93.603 | 24.0136 |
| Fourth Coefficient(A) | 1.237E−02 | −4.234E−03 | −4.196E−02 | −3.474E−02 | −3.255E−01 | −4.676E−01 | −6.501E−01 | −1.058E+00 |
| Sixth Coefficient(B) | 1.240E−02 | 8.589E−03 | −1.421E−02 | −1.441E−02 | −1.287E−02 | −1.590E−02 | 3.896E−03 | 1.248E−01 |
| Eighth Coefficient(C) | 6.919E−03 | 1.127E−02 | 4.410E−03 | 6.393E−03 | −1.532E−04 | 5.270E−03 | −9.865E−03 | 1.153E−02 |
| Tenth Coefficient(D) | 1.178E−03 | 3.812E−03 | 5.989E−04 | −4.661E−03 | −4.522E−03 | −1.252E−03 | 2.079E−02 | 4.283E−02 |
| Twelfth Coefficient(E) | 5.962E−04 | 1.084E−03 | 1.699E−04 | −1.339E−03 | 2.382E−04 | 5.355E−03 | 6.798E−03 | 4.670E−03 |
| Fourteenth Coefficient(F) | −2.800E−05 | 9.400E−05 | −8.000E−06 | −2.434E−04 | 2.860E−04 | 2.994E−03 | −2.832E−04 | −3.434E−03 |
| Sixteenth Coefficient(G) | 3.000E−06 | 4.100E−05 | 1.700E−05 | 3.880E−04 | 1.196E−03 | 2.601E−03 | −1.602E−03 | −8.604E−03 |
| Eighteenth Coefficient(H) | −2.500E−05 | 7.400E−05 | −4.200E−05 | 1.600E−05 | −7.500E−05 | 6.916E−04 | 9.442E−04 | −1.293E−03 |
| Twentieth Coefficient(J) | −9.000E−06 | 3.000E−05 | 2.500E−05 | 5.242E−04 | 2.832E−04 | 3.506E−04 | 2.415E−03 | −4.233E−04 |
| Twenty-second Coefficient(L) | 0.000E+00 | 0.000E+00 | −1.300E−05 | 1.611E−04 | 4.600E−05 | 3.216E−04 | 3.767E−03 | 9.822E−04 |
| Twenty-fourth Coefficient(M) | 0.000E+00 | 0.000E+00 | 1.100E−05 | 2.203E−04 | 4.900E−05 | 1.400E−05 | 2.232E−03 | 8.853E−04 |
| Twenty-sixth Coefficient(N) | 0.000E+00 | 0.000E+00 | −3.000E−06 | 7.100E−05 | 1.100E−05 | 5.100E−05 | 1.597E−03 | 4.242E−04 |
| Twenty-eighth Coefficient(O) | 0.000E+00 | 0.000E+00 | −1.000E−06 | 5.200E−05 | −8.000E−06 | −2.400E−05 | 6.247E−04 | 1.500E−05 |
| Thirtieth Coefficient(P) | 0.000E+00 | 0.000E+00 | −3.000E−06 | 1.400E−05 | 4.000E−06 | 2.600E−05 | 2.479E−04 | 7.000E−05 |

| | S17 | S18 | S19 | S20 | S21 | S22 |
|---|---|---|---|---|---|---|
| Conic Constant(K) | 4.35313 | 1.69064 | −6.19674 | −7.0195 | 33.7086 | −11.5714 |
| Fourth Coefficient(A) | −7.600E−02 | −4.047E−02 | −1.719E+00 | −1.481E+00 | −2.460E+00 | −2.558E+00 |
| Sixth Coefficient(B) | −9.586E−02 | 1.748E−02 | 7.146E−02 | −1.367E−01 | 1.278E+00 | 7.738E−01 |
| Eighth Coefficient(C) | 1.034E−02 | −2.313E−02 | 1.326E−01 | 2.161E−01 | −5.390E−01 | −1.110E−01 |

TABLE 6-continued

| | | | | | | |
|---|---|---|---|---|---|---|
| Tenth Coefficient(D) | −1.752E−02 | −2.077E−02 | 2.423E−02 | 3.573E−02 | 1.696E−01 | 4.979E−02 |
| Twelfth Coefficient(E) | 1.077E−02 | 1.052E−02 | −1.992E−02 | −1.530E−03 | −6.571E−02 | −6.401E−02 |
| Fourteenth Coefficient(F) | 1.138E−02 | 1.314E−03 | −6.930E−03 | −1.171E−02 | 4.570E−02 | 3.464E−02 |
| Sixteenth Coefficient(G) | 3.342E−03 | −5.217E−03 | −2.714E−03 | −3.923E−03 | −2.842E−02 | −5.420E−03 |
| Eighteenth Coefficient(H) | 1.660E−03 | −1.950E−03 | 2.828E−03 | 6.039E−03 | 8.163E−03 | 1.327E−02 |
| Twentieth Coefficient(J) | −2.129E−03 | −1.004E−03 | 1.700E−05 | 4.474E−03 | −7.705E−04 | −4.022E−03 |
| Twenty-second Coefficient(L) | −1.953E−03 | 1.402E−04 | 1.025E−03 | 4.853E−03 | 2.734E−03 | 4.517E−03 |
| Twenty-fourth Coefficient(M) | 1.550E−04 | 4.864E−04 | −7.300E−05 | 8.549E−04 | −4.835E−03 | −1.185E−03 |
| Twenty-sixth Coefficient(N) | −3.373E−04 | −4.662E−04 | −1.131E−04 | 3.681E−04 | 3.601E−03 | 6.247E−03 |
| Twenty-eighth Coefficient(O) | −1.261E−04 | 2.848E−04 | −7.800E−05 | −2.582E−04 | −1.350E−03 | 2.615E−03 |
| Thirtieth Coefficient(P) | 4.600E−05 | 1.797E−04 | −1.900E−05 | −1.494E−04 | 2.048E−04 | 1.710E−03 |

Figure 6:
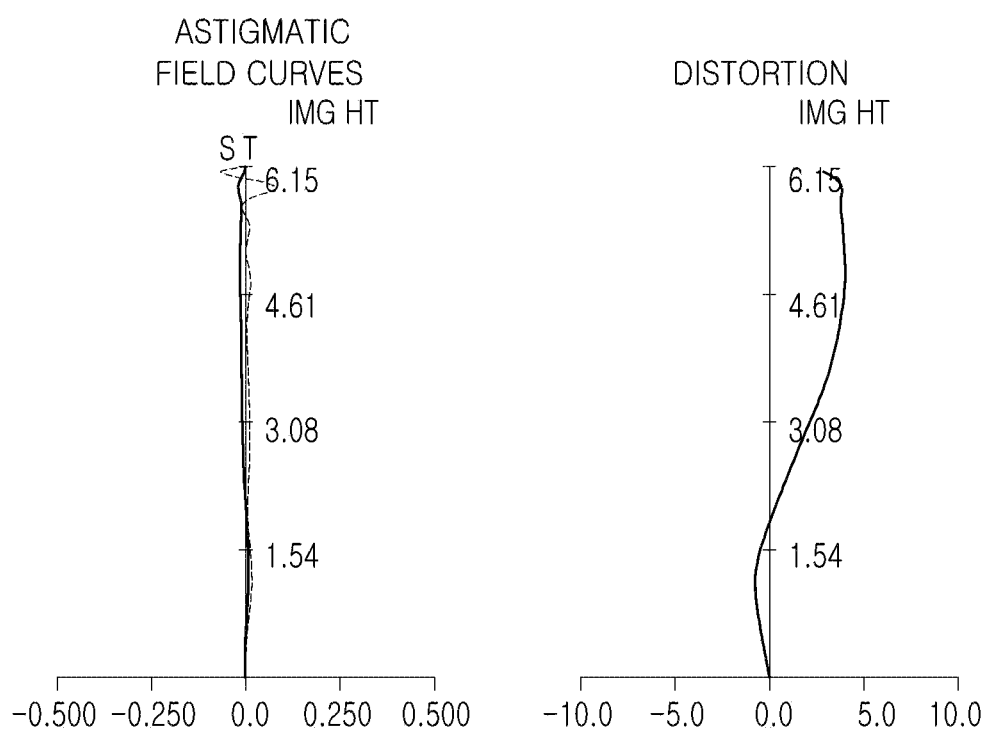
FIG. 6 is a view illustrating aberration characteristics of the example optical imaging system illustrated in FIG. 5.

Additionally, the example imaging optical system configured described above may have the aberration characteristics illustrated in FIG. 6.

Figure 7:
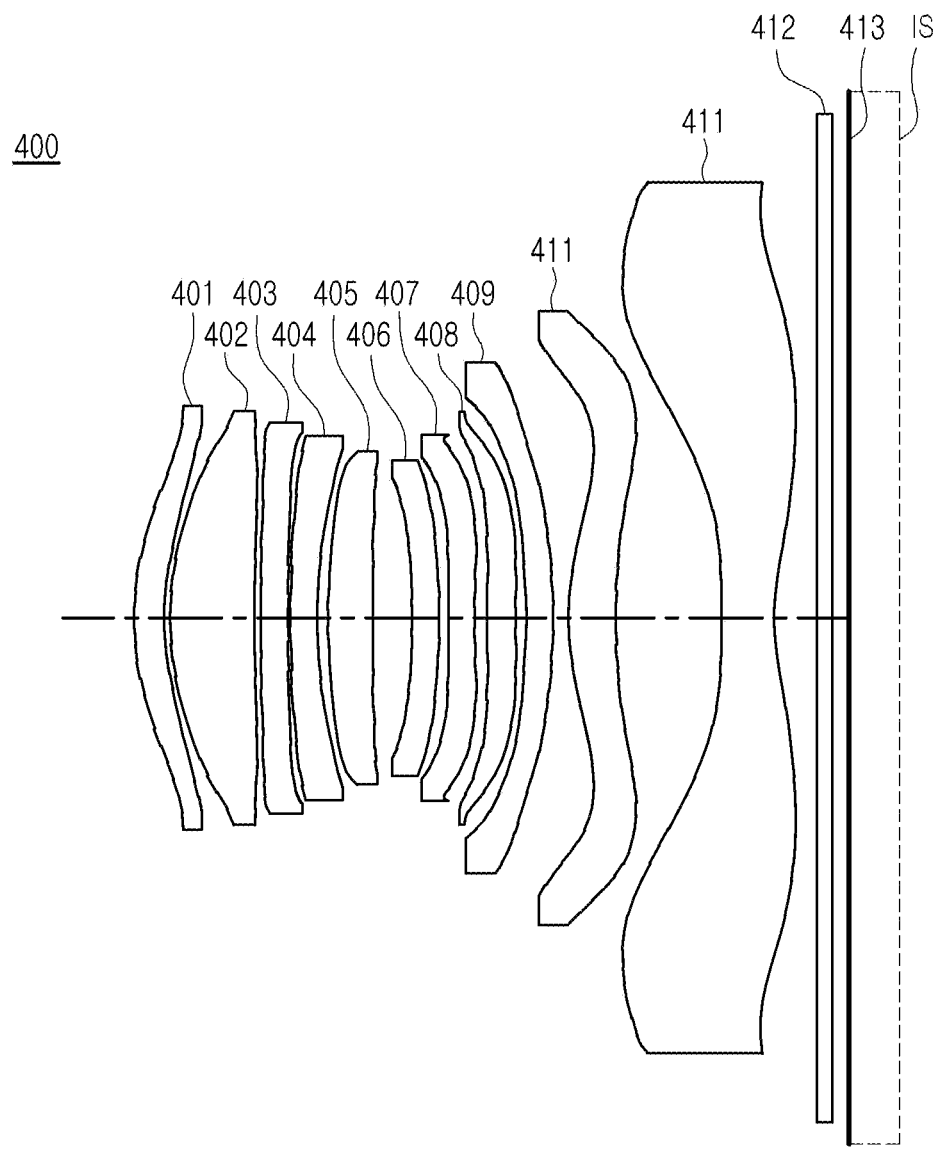
FIG. 7 illustrates a structural view of an example optical imaging system according to a fourth embodiment of the present disclosure.

An imaging optical system 400 according to a fourth embodiment of the present disclosure will be described with reference to FIGS. 7 and 8.

The imaging optical system 400 according to the fourth embodiment of the present disclosure may include a first lens 401, a second lens 402, a third lens 403, a fourth lens 404, a fifth lens 405, a sixth lens 406, a seventh lens 407, an eighth lens 408, a ninth lens 409, a tenth lens 410, and an eleventh lens 411, and may further include a filter 412 and an image sensor IS.

The imaging optical system 400 according to the fourth embodiment of the present disclosure may form a focus on an imaging surface 413. The imaging surface 413 may refer to a surface on which a focus is formed by the imaging optical system. For example, the imaging surface 413 may refer to one surface of the image sensor IS on which light is received.

The lens characteristics of each lens (a radius of curvature, a thickness of the lens or a distance between the lenses, an index of refraction, an Abbe number, and a focal length) are illustrated in Table 7.

TABLE 7

| Surface Number | Division | Radius | Thickness or Distance | Index | Abbe Number | Focal Length |
|---|---|---|---|---|---|---|
| S1 | First lens | 3.290 | 0.361 | 1.5349 | 55.74 | 553.7520 |
| S2 | | 3.200 | 0.064 | | | |
| S3 | Second lens | 3.144 | 1.012 | 1.5440 | 55.99 | 6.5137 |
| S4 | | 24.715 | 0.076 | | | |
| S5 | Third lens | 35.611 | 0.325 | 1.6144 | 25.94 | 7963.3700 |
| S6 | | 35.748 | 0.030 | | | |
| S7 | Fourth lens | 14.033 | 0.320 | 1.6707 | 19.24 | −14.8575 |
| S8 | | 5.774 | 0.135 | | | |
| S9 | Fifth lens | 9.000 | 0.528 | 1.5440 | 55.99 | 21.0965 |
| S10 | | 40.843 | 0.473 | | | |
| S11 | Sixth lens | −9.761 | 0.320 | 1.6707 | 19.24 | −2815.7600 |
| S12 | | −9.940 | 0.110 | | | |
| S13 | Seventh lens | 46.865 | 0.320 | 1.6608 | 20.38 | −49.0610 |
| S14 | | 19.110 | 0.146 | | | |
| S15 | Eighth lens | 21.934 | 0.344 | 1.5349 | 55.74 | −75.9495 |
| S16 | | 14.165 | 0.121 | | | |
| S17 | Ninth lens | −7.284 | 0.320 | 1.6144 | 25.94 | −211.4860 |
| S18 | | −7.845 | 0.184 | | | |
| S19 | Tenth lens | 3.023 | 0.561 | 1.5440 | 55.99 | 8.6209 |
| S20 | | 7.948 | 1.266 | | | |
| S21 | Eleventh lens | 30.603 | 0.629 | 1.5349 | 55.74 | −5.0067 |
| S22 | | 2.445 | 0.499 | | | |
| S23 | Filter | infinity | 0.210 | 1.5168 | 64.20 | |
| S24 | | infinity | 0.211 | | | |
| S25 | Imaging Surface | infinity | | | | |

In an example, a total focal length f of the imaging optical system 400 according to the fourth embodiment of the present disclosure is 6.8246 mm, Fno is 1.497, and IMG HT is 6.15 mm.

In the fourth embodiment of the present disclosure, the first lens 401 has positive refractive power, a first surface of the first lens 401 has a shape convex in the paraxial region, and the second surface of the first lens 401 has a shape concave in the paraxial region.

The second lens 402 has positive refractive power, a first surface of the second lens 402 has a shape convex in the paraxial region, and a second surface of the second lens 402 has a shape concave in the paraxial region.

The third lens 403 has positive refractive power, a first surface of the third lens 403 has a shape convex in the paraxial region, and a second surface of the third lens 403 has a shape concave in the paraxial region.

The fourth lens 404 has negative refractive power, a first surface of the fourth lens 404 has a shape convex in the paraxial region, and a second surface of the fourth lens 404 has a shape concave in the paraxial region.

The fifth lens 405 has positive refractive power, a first surface of the fifth lens 405 has a shape convex in the paraxial region, and a second surface of the fifth lens 405 has a shape concave in the paraxial region.

The sixth lens 406 has negative refractive power, a first surface of the sixth lens 406 has a shape concave in the paraxial region, and a second surface of the sixth lens 406 has a shape convex in the paraxial region.

The seventh lens 407 has negative refractive power, a first surface of the seventh lens 407 has a shape convex in the paraxial region, and a second surface of the seventh lens 407 has a shape concave in the paraxial region.

The eighth lens 408 has negative refractive power, a first surface of the eighth lens 408 has a shape convex in the paraxial region, and a second surface of the eighth lens 408 has a shape concave in the paraxial region.

The ninth lens 409 has negative refractive power, a first surface of the ninth lens 409 has a shape concave in the paraxial region, and a second surface of the ninth lens 409 has a shape convex in the paraxial region.

The tenth lens 410 has positive refractive power, a first surface of the tenth lens 410 has a shape convex in the paraxial region, and a second surface of the tenth lens 410 has a shape concave in the paraxial region.

The eleventh lens 411 has negative refractive power, a first surface of the eleventh lens 411 has a shape convex in the paraxial region, and a second surface of the eleventh lens 411 has a shape concave in the paraxial region.

Additionally, at least one of the tenth lens 410 and the eleventh lens 411 has at least one inflection point formed on at least one of the first and second surfaces.

In an example, each surface of the first lens 401 to the eleventh lens 411 has an aspherical coefficient as illustrated in Table 8. For example, both the object-side surface and the image-side surface of the first lens 401 to the eleventh lens 411 are aspherical surfaces.

TABLE 8

| | S1 | S2 | S3 | S4 | S5 | S6 | S7 | S8 |
|---|---|---|---|---|---|---|---|---|
| Conic Constant(K) | −4.86406 | −10.2675 | −5.71504 | 74.6997 | −78.9267 | 98.2776 | 10.8035 | 4.5156 |
| Fourth Coefficient(A) | 4.038E−02 | −1.500E−02 | 1.119E−01 | −8.417E−02 | −1.179E−02 | 1.283E−03 | −1.496E−02 | −8.475E−02 |
| Sixth Coefficient(B) | −4.056E−02 | −7.651E−03 | 3.024E−02 | −3.390E−03 | −2.462E−03 | 2.930E−03 | 1.958E−02 | 1.032E−03 |
| Eighth Coefficient(C) | 1.608E−03 | 7.308E−04 | −6.201E−03 | 3.290E−03 | 4.092E−03 | 4.475E−03 | 3.944E−03 | 8.096E−04 |
| Tenth Coefficient(D) | 2.593E−04 | −3.855E−03 | −3.107E−03 | −1.194E−03 | −1.516E−03 | −1.118E−03 | −1.213E−03 | −1.863E−04 |
| Twelfth Coefficient(E) | −3.381E−04 | 4.984E−04 | −4.300E−05 | 5.500E−05 | 4.442E−04 | 5.303E−04 | 5.800E−05 | −1.541E−04 |
| Fourteenth Coefficient(F) | −2.800E−05 | −6.100E−05 | −8.200E−05 | 3.800E−05 | 9.600E−05 | −2.465E−04 | −2.613E−04 | −8.900E−05 |
| Sixteenth Coefficient(G) | 4.000E−05 | 1.531E−04 | −2.600E−05 | 5.300E−05 | 6.100E−05 | 1.821E−04 | 2.171E−04 | 1.014E−04 |
| Eighteenth Coefficient(H) | 1.500E−05 | −5.300E−05 | −2.700E−05 | −3.300E−05 | −3.200E−05 | −3.300E−05 | −2.341E−04 | 1.300E−05 |
| Twentieth Coefficient(J) | −1.100E−05 | 1.500E−05 | −2.000E−06 | 5.000E−06 | 4.000E−06 | −2.000E−06 | −3.100E−05 | −1.300E−05 |
| Twenty-second Coefficient(L) | 4.129E−07 | −1.300E−05 | 0.000E+00 | 0.000E+00 | −2.000E−06 | 1.000E−06 | 0.000E+00 | 0.000E+00 |
| Twenty-fourth Coefficient(M) | −6.000E−06 | 1.100E−05 | 0.000E+00 | 0.000E+00 | 2.000E−06 | −3.005E−07 | 0.000E+00 | 0.000E+00 |
| Twenty-sixth Coefficient(N) | 1.100E−05 | −2.000E−06 | 0.000E+00 | 0.000E+00 | −2.000E−06 | 1.000E−06 | 0.000E+00 | 0.000E+00 |
| Twenty-eighth Coefficient(O) | −5.000E−06 | −2.000E−06 | 0.000E+00 | 0.000E+00 | 1.000E−06 | −1.000E−06 | 0.000E+00 | 0.000E+00 |
| Thirtieth Coefficient(P) | 1.000E−06 | 1.000E−06 | 0.000E+00 | 0.000E+00 | −8.965E−08 | 2.311E−07 | 0.000E+00 | 0.000E+00 |

| | S9 | S10 | S11 | S12 | S13 | S14 | S15 | S16 |
|---|---|---|---|---|---|---|---|---|
| Conic Constant(K) | −5.01417 | −92.9653 | 25.4891 | 20.0928 | 56.1078 | −22.1266 | 93.4646 | 22.5715 |
| Fourth Coefficient(A) | 1.142E−02 | 6.246E−03 | −3.972E−02 | −3.212E−02 | −3.282E−01 | −4.765E−01 | −6.415E−01 | −1.061E+00 |
| Sixth Coefficient(B) | 1.198E−02 | 1.336E−02 | −1.485E−02 | −1.610E−02 | −1.256E−02 | −1.392E−02 | 8.441E−03 | 1.207E−01 |
| Eighth Coefficient(C) | 5.377E−03 | 8.850E−03 | 3.167E−03 | 7.599E−03 | −2.060E−04 | 2.575E−03 | −9.239E−03 | 1.163E−02 |
| Tenth Coefficient(D) | 7.655E−04 | 2.996E−03 | 5.010E−04 | −4.414E−03 | −3.804E−03 | −2.508E−03 | 1.936E−02 | 4.438E−02 |
| Twelfth Coefficient(E) | 2.646E−04 | 9.392E−04 | 5.600E−05 | −2.094E−03 | 3.301E−04 | 5.138E−03 | 6.365E−03 | 4.749E−03 |

TABLE 8-continued

| | | | | | | | | |
|---|---|---|---|---|---|---|---|---|
| Fourteenth Coefficient(F) | 4.800E−05 | 1.130E−04 | −2.000E−05 | −4.180E−04 | 1.487E−04 | 3.379E−03 | 2.800E−05 | −3.150E−03 |
| Sixteenth Coefficient(G) | 8.300E−05 | −5.000E−05 | −2.000E−06 | 5.510E−04 | 9.682E−04 | 2.855E−03 | −1.837E−03 | −8.802E−03 |
| Eighteenth Coefficient(H) | 2.000E−05 | −2.400E−05 | −2.200E−05 | 3.427E−04 | 1.147E−04 | 8.241E−04 | 7.343E−04 | −1.958E−03 |
| Twentieth Coefficient(J) | −5.000E−06 | −6.000E−06 | 4.000E−06 | 4.636E−04 | 1.786E−04 | 4.864E−04 | 3.025E−03 | −4.051E−04 |
| Twenty-second Coefficient(L) | 0.000E+00 | 0.000E+00 | −7.000E−06 | 1.684E−04 | 1.118E−04 | 4.753E−04 | 4.060E−03 | 9.270E−04 |
| Twenty-fourth Coefficient(M) | 0.000E+00 | 0.000E+00 | 4.000E−06 | 8.900E−05 | 4.800E−05 | 1.049E−04 | 2.422E−03 | 9.420E−04 |
| Twenty-sixth Coefficient(N) | 0.000E+00 | 0.000E+00 | −2.000E−06 | 1.100E−05 | 2.000E−05 | 8.400E−05 | 1.594E−03 | 5.074E−04 |
| Twenty-eighth Coefficient(O) | 0.000E+00 | 0.000E+00 | 1.000E−06 | 7.000E−06 | −1.000E−06 | 1.800E−05 | 6.297E−04 | 1.010E−04 |
| Thirtieth Coefficient(P) | 0.000E+00 | 0.000E+00 | 1.586E−07 | −2.000E−06 | 3.000E−06 | 2.600E−05 | 1.832E−04 | 7.900E−05 |

| | S17 | S18 | S19 | S20 | S21 | S22 |
|---|---|---|---|---|---|---|
| Conic Constant(K) | 4.35313 | 1.69064 | −5.95716 | −8.98607 | 33.5587 | −11.2105 |
| Fourth Coefficient(A) | −7.600E−02 | −4.047E−02 | −1.671E+00 | −1.499E+00 | −2.470E+00 | −2.244E+00 |
| Sixth Coefficient(B) | −9.586E−02 | 1.748E−02 | 8.772E−02 | −1.461E−01 | 1.279E+00 | 8.448E−01 |
| Eighth Coefficient(C) | 1.034E−02 | −2.313E−02 | 1.243E−01 | 2.126E−01 | −5.403E−01 | −1.412E−01 |
| Tenth Coefficient(D) | −1.752E−02 | −2.077E−02 | 1.673E−02 | 3.378E−02 | 1.694E−01 | 5.826E−02 |
| Twelfth Coefficient(E) | 1.077E−02 | 1.052E−02 | −1.938E−02 | 4.671E−03 | −6.575E−02 | −5.135E−02 |
| Fourteenth Coefficient(F) | 1.138E−02 | 1.314E−03 | −7.624E−03 | −1.568E−02 | 4.346E−02 | 3.801E−02 |
| Sixteenth Coefficient(G) | 3.342E−03 | −5.217E−03 | −6.030E−04 | −3.324E−03 | −2.758E−02 | −1.416E−02 |
| Eighteenth Coefficient(H) | 1.660E−03 | −1.950E−03 | 5.068E−03 | 6.837E−03 | 9.729E−03 | 7.198E−03 |
| Twentieth Coefficient(J) | −2.129E−03 | −1.004E−03 | 2.861E−04 | 4.604E−03 | −8.331E−04 | −3.701E−03 |
| Twenty-second Coefficient(L) | −1.953E−03 | 1.402E−04 | −5.668E−04 | 3.731E−03 | 2.502E−03 | 6.759E−03 |
| Twenty-fourth Coefficient(M) | 1.550E−04 | 4.864E−04 | −7.434E−04 | 9.758E−04 | −5.196E−03 | −4.298E−04 |
| Twenty-sixth Coefficient(N) | −3.373E−04 | −4.662E−04 | 8.000E−06 | 6.887E−04 | 2.296E−03 | 4.008E−03 |
| Twenty-eighth Coefficient(O) | −1.261E−04 | 2.848E−04 | 3.089E−04 | 3.142E−04 | −1.284E−03 | 2.640E−03 |
| Thirtieth Coefficient(P) | 4.600E−05 | 1.797E−04 | 1.334E−04 | 5.300E−05 | −4.427E−04 | 1.395E−03 |

Figure 8:
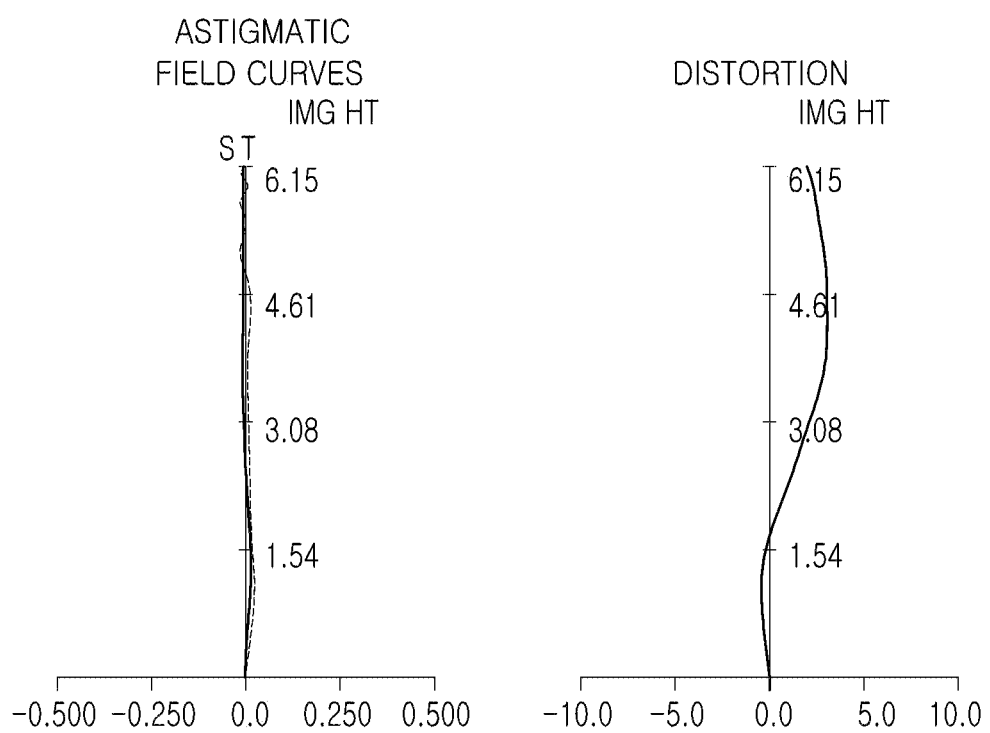
FIG. 8 is a view illustrating aberration characteristics of the example optical imaging system illustrated in FIG. 7.

Additionally, the example imaging optical system configured described above may have the aberration characteristics illustrated in FIG. 8.

Figure 9:
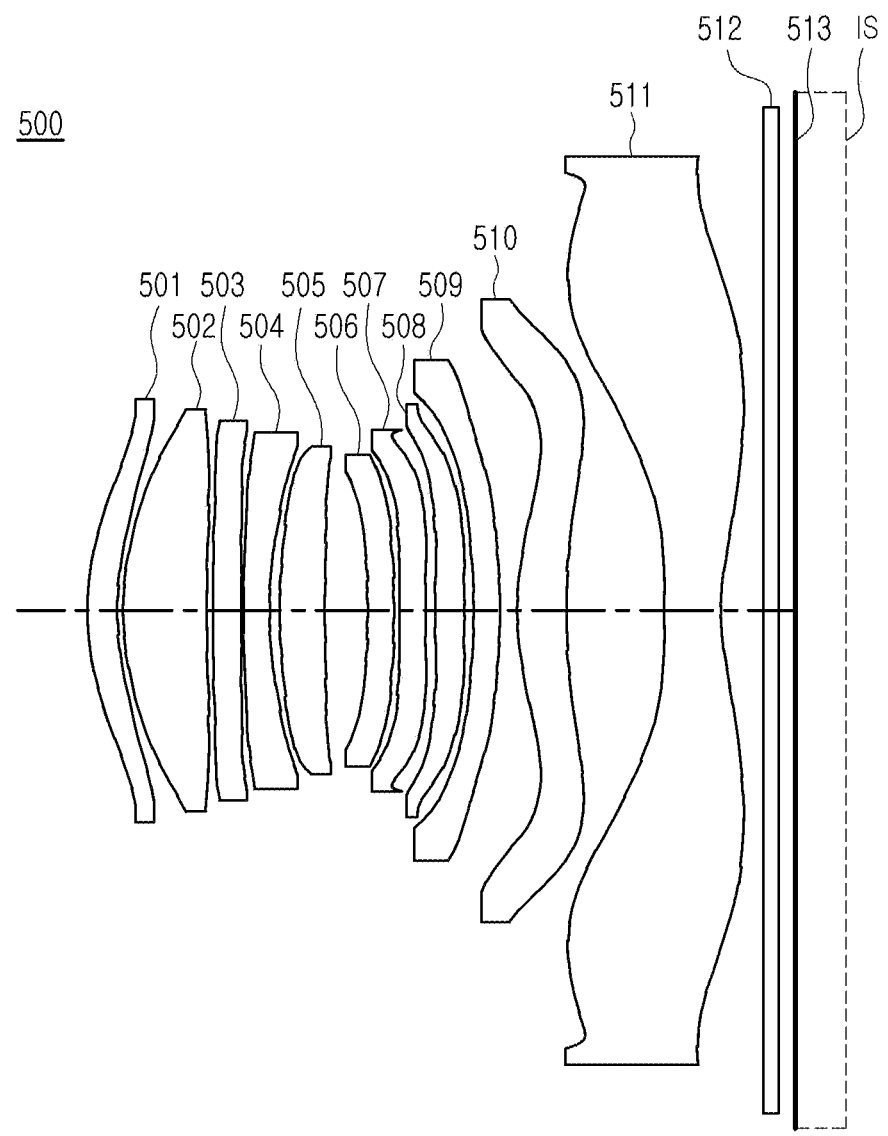
FIG. 9 illustrates a structural view of an example optical imaging system according to a fifth embodiment of the present disclosure.

An imaging optical system 500 according to a fifth embodiment of the present disclosure will be described with reference to FIGS. 9 and 10.

The imaging optical system 500 according to the fifth embodiment of the present disclosure may include a first lens 501, a second lens 502, a third lens 503, a fourth lens 504, a fifth lens 505, a sixth lens 506, a seventh lens 507, an eighth lens 508, a ninth lens 509, a tenth lens 510, and an eleventh lens 511, and may further include a filter 512 and an imaging sensor IS.

The imaging optical system 500 according to the fifth embodiment of the present disclosure may form a focus on an imaging surface 513. The imaging surface 513 may refer to a surface on which a focus is formed by the imaging optical system. For example, the imaging surface 513 may refer to one surface of the image sensor IS on which light is received.

The lens characteristics of each lens (a radius of curvature, a thickness of the lens or a distance between the lenses, an index of refraction, an Abbe number, and a focal length) are illustrated in Table 9.

TABLE 9

| Surface Number | Division | Radius | Thickness or Distance | Index | Abbe Number | Focal Length |
|---|---|---|---|---|---|---|
| S1 | First lens | 3.303 | 0.359 | 1.5349 | 55.74 | 914.9280 |
| S2 | | 3.200 | 0.071 | | | |
| S3 | Second lens | 3.151 | 1.023 | 1.5440 | 55.99 | 6.4781 |

TABLE 9-continued

| Surface Number | Division | Radius | Thickness or Distance | Index | Abbe Number | Focal Length |
|---|---|---|---|---|---|---|
| S4 | | 26.346 | 0.076 | | | |
| S5 | Third lens | 38.735 | 0.340 | 1.6144 | 25.94 | 112.8630 |
| S6 | | 87.452 | 0.030 | | | |
| S7 | Fourth lens | 17.464 | 0.320 | 1.6608 | 20.38 | −12.2085 |
| S8 | | 5.478 | 0.119 | | | |
| S9 | Fifth lens | 7.201 | 0.545 | 1.5440 | 55.99 | 18.6515 |
| S10 | | 24.147 | 0.529 | | | |
| S11 | Sixth lens | −9.265 | 0.320 | 1.6608 | 20.38 | −571.1110 |
| S12 | | −9.629 | 0.065 | | | |
| S13 | Seventh lens | 108.667 | 0.320 | 1.6144 | 25.94 | −51.9159 |
| S14 | | 24.633 | 0.117 | | | |
| S15 | Eighth lens | 21.797 | 0.347 | 1.5349 | 55.74 | −77.2834 |
| S16 | | 14.192 | 0.117 | | | |
| S17 | Ninth lens | −7.325 | 0.320 | 1.6144 | 25.94 | −110.4590 |
| S18 | | −8.348 | 0.201 | | | |
| S19 | Tenth lens | 3.138 | 0.607 | 1.5440 | 55.99 | 8.3213 |
| S20 | | 9.533 | 1.186 | | | |
| S21 | Eleventh lens | 30.721 | 0.685 | 1.5349 | 55.74 | −4.8985 |
| S22 | | 2.395 | 0.499 | | | |
| S23 | Filter | infinity | 0.210 | 1.5168 | 64.20 | |
| S24 | | infinity | 0.211 | | | |
| S25 | Imaging Surface | infinity | | | | |

In an example, a total focal length f of the imaging optical system 500 according to the fifth embodiment of the present disclosure is 6.85 mm, Fno is 1.497, and IMG HT is 6.15 mm.

In the fifth embodiment of the present disclosure, the first lens 501 has positive refractive power, a first surface of the first lens 501 has a shape convex in the paraxial region, and a second surface of the first lens 501 has a shape concave in the paraxial region.

The second lens 502 has positive refractive power, a first surface of the second lens 502 has a shape convex in the paraxial region, and a second surface of the second lens 502 has a shape concave in the paraxial region.

The third lens 503 has positive refractive power, a first surface of the third lens 503 has a shape convex in the paraxial region, and a second surface of the third lens 503 has a shape concave in the paraxial region.

The fourth lens 504 has negative refractive power, a first surface of the fourth lens 504 has a shape convex in the paraxial region, and a second surface of the fourth lens 504 has a shape concave in the paraxial region.

The fifth lens 505 has positive refractive power, a first surface of the fifth lens 505 has a shape convex in the paraxial region, and a second surface of the fifth lens 505 has a shape concave in the paraxial region.

The sixth lens 506 has negative refractive power, a first surface of the sixth lens 506 has a shape concave in the paraxial region, and a second surface of the sixth lens 506 has a shape convex in the paraxial region.

The seventh lens 507 has negative refractive power, a first surface of the seventh lens 507 has a shape convex in the paraxial region, and a second surface of the seventh lens 507 has a shape concave in the paraxial region.

The eighth lens 508 has negative refractive power, a first surface of the eighth lens 508 has a shape convex in the paraxial region, and a second surface of the eighth lens 508 has a shape concave in the paraxial region.

The ninth lens 509 has negative refractive power, a first surface of the ninth lens 509 has a shape concave in the paraxial region, and a second surface of the ninth lens 509 has a shape convex in the paraxial region.

The tenth lens 510 has positive refractive power, a first surface of the tenth lens 510 has a shape convex in the paraxial region, and a second surface of the tenth lens 510 has a shape concave in the paraxial region.

The eleventh lens 511 has negative refractive power, a first surface of the eleventh lens 511 has a shape convex in the paraxial region, and the second surface of the eleventh lens 511 has a shape concave in the paraxial region.

Additionally, at least one of the tenth lens 510 and the eleventh lens 511 has at least one inflection point formed on at least one of the first and second surfaces.

In an example, each side of the first lens 501 to the eleventh lens 511 has an aspherical coefficient as illustrated in Table 10. For example, both the object-side surface and the image-side surface of the first lens 501 to the eleventh lens 511 are aspherical surfaces.

TABLE 10

| | S1 | S2 | S3 | S4 | S5 | S6 | S7 | S8 |
|---|---|---|---|---|---|---|---|---|
| Conic Constant(K) | −4.88692 | −10.2185 | −5.76286 | 77.8416 | −72.1597 | −76.5328 | 10.9554 | 4.52158 |
| Fourth Coefficient(A) | 4.065E−02 | −1.486E−02 | 1.110E−01 | −8.307E−02 | −1.145E−02 | −7.774E−04 | −1.493E−02 | −8.493E−02 |
| Sixth Coefficient(B) | −4.056E−02 | −7.564E−03 | 3.036E−02 | −2.990E−03 | −1.902E−03 | 2.198E−03 | 1.904E−02 | 1.233E−03 |
| Eighth Coefficient(C) | 1.361E−03 | 8.332E−04 | −5.919E−03 | 3.031E−03 | 4.365E−03 | 4.781E−03 | 4.029E−03 | 1.060E−03 |
| Tenth Coefficient(D) | 2.353E−04 | −3.880E−03 | −3.184E−03 | −1.307E−03 | −1.612E−03 | −1.029E−03 | −1.275E−03 | −2.523E−04 |

TABLE 10-continued

| | | | | | | | | |
|---|---|---|---|---|---|---|---|---|
| Twelfth Coefficient(E) | −3.312E−04 | 4.749E−04 | −7.000E−06 | 7.000E−05 | 3.479E−04 | 5.239E−04 | −3.025E−04 | −1.380E−04 |
| Fourteenth Coefficient(F) | −3.200E−05 | −7.400E−05 | −5.400E−05 | 4.800E−05 | 9.600E−05 | −2.683E−04 | −5.735E−04 | −1.217E−04 |
| Sixteenth Coefficient(G) | 3.900E−05 | 1.467E−04 | −1.700E−05 | 6.000E−05 | 6.100E−05 | 1.677E−04 | 1.083E−04 | 9.200E−05 |
| Eighteenth Coefficient(H) | 1.500E−05 | −5.200E−05 | −1.900E−05 | −2.900E−05 | −2.500E−05 | −3.600E−05 | −2.524E−04 | 1.000E−05 |
| Twentieth Coefficient(J) | −1.100E−05 | 1.600E−05 | 2.000E−06 | 3.000E−06 | 2.000E−06 | −1.000E−06 | −2.900E−05 | −1.400E−05 |
| Twenty-second Coefficient(L) | 3.663E−07 | −1.300E−05 | 0.000E+00 | 0.000E+00 | −4.000E−06 | −4.237E−07 | 0.000E+00 | 0.000E+00 |
| Twenty-fourth Coefficient(M) | −6.000E−06 | 1.100E−05 | 0.000E+00 | 0.000E+00 | 2.000E−06 | −1.000E−06 | 0.000E+00 | 0.000E+00 |
| Twenty-sixth Coefficient(N) | 1.100E−05 | −2.000E−06 | 0.000E+00 | 0.000E+00 | −2.000E−06 | 1.000E−06 | 0.000E+00 | 0.000E+00 |
| Twenty-eighth Coefficient(O) | −5.000E−06 | −2.000E−06 | 0.000E+00 | 0.000E+00 | 1.000E−06 | −1.000E−06 | 0.000E+00 | 0.000E+00 |
| Thirtieth Coefficient(P) | 1.000E−06 | 1.000E−06 | 0.000E+00 | 0.000E+00 | −8.548E−08 | 2.427E−07 | 0.000E+00 | 0.000E+00 |

| | S9 | S10 | S11 | S12 | S13 | S14 | S15 | S16 |
|---|---|---|---|---|---|---|---|---|
| Conic Constant(K) | −4.09759 | −99 | 25.6222 | 21.3763 | 99 | −53.9214 | 93.6115 | 26.4453 |
| Fourth Coefficient(A) | 1.333E−02 | 4.215E−03 | −4.207E−02 | −3.793E−02 | −3.192E−01 | −4.865E−01 | −6.591E−01 | −1.043E+00 |
| Sixth Coefficient(B) | 1.037E−02 | 1.132E−02 | −1.446E−02 | −1.736E−02 | −9.620E−03 | −2.052E−02 | 2.502E−03 | 1.297E−01 |
| Eighth Coefficient(C) | 6.092E−03 | 1.029E−02 | 3.564E−03 | 7.821E−03 | −2.581E−04 | 5.135E−03 | −6.816E−03 | 6.890E−03 |
| Tenth Coefficient(D) | 8.416E−04 | 3.672E−03 | 8.155E−04 | −4.358E−03 | −5.397E−03 | −3.014E−03 | 2.050E−02 | 4.249E−02 |
| Twelfth Coefficient(E) | 3.031E−04 | 9.270E−04 | 2.675E−04 | −1.634E−03 | 2.817E−04 | 5.644E−03 | 7.600E−03 | 3.277E−03 |
| Fourteenth Coefficient(F) | 4.700E−05 | −4.700E−05 | 3.900E−05 | −5.775E−04 | 6.300E−05 | 3.743E−03 | −1.951E−04 | −2.589E−03 |
| Sixteenth Coefficient(G) | 7.600E−05 | −1.914E−04 | 3.300E−05 | 5.664E−04 | 1.175E−03 | 2.978E−03 | −2.582E−03 | −7.463E−03 |
| Eighteenth Coefficient(H) | 2.200E−05 | −8.100E−05 | −3.600E−05 | 1.047E−04 | −3.260E−04 | 6.551E−04 | 2.811E−04 | −9.451E−04 |
| Twentieth Coefficient(J) | −1.000E−05 | −2.300E−05 | 1.900E−05 | 6.627E−04 | 3.068E−04 | 2.779E−04 | 2.619E−03 | −8.096E−04 |
| Twenty-second Coefficient(L) | 0.000E+00 | 0.000E+00 | −1.500E−05 | 8.200E−05 | 3.700E−05 | 3.187E−04 | 4.262E−03 | 5.419E−04 |
| Twenty-fourth Coefficient(M) | 0.000E+00 | 0.000E+00 | 8.000E−06 | 1.227E−04 | 1.188E−04 | 1.200E−05 | 2.643E−03 | 5.474E−04 |
| Twenty-sixth Coefficient(N) | 0.000E+00 | 0.000E+00 | −2.000E−06 | −5.300E−05 | 2.800E−05 | 3.600E−05 | 1.820E−03 | 3.318E−04 |
| Twenty-eighth Coefficient(O) | 0.000E+00 | 0.000E+00 | 2.000E−06 | 1.000E−06 | 1.900E−05 | −1.200E−05 | 7.063E−04 | 4.100E−05 |
| Thirtieth Coefficient(P) | 0.000E+00 | 0.000E+00 | −1.000E−06 | −1.300E−05 | 1.100E−05 | 2.300E−05 | 2.185E−04 | 9.300E−05 |

| | S17 | S18 | S19 | S20 | S21 | S22 |
|---|---|---|---|---|---|---|
| Conic Constant(K) | 4.35313 | 1.69064 | −6.10438 | −8.29024 | 33.4321 | −12.1136 |
| Fourth Coefficient(A) | −7.600E−02 | −4.047E−02 | −1.681E+00 | −1.489E+00 | −2.457E+00 | −2.392E+00 |
| Sixth Coefficient(B) | −9.586E−02 | 1.748E−02 | 8.328E−02 | −1.475E−01 | 1.278E+00 | 7.570E−01 |
| Eighth Coefficient(C) | 1.034E−02 | −2.313E−02 | 1.248E−01 | 2.094E−01 | −5.396E−01 | −1.188E−01 |
| Tenth Coefficient(D) | −1.752E−02 | −2.077E−02 | 1.849E−02 | 3.299E−02 | 1.690E−01 | 4.054E−02 |
| Twelfth Coefficient(E) | 1.077E−02 | 1.052E−02 | −2.022E−02 | 2.161E−03 | −6.610E−02 | −5.951E−02 |
| Fourteenth Coefficient(F) | 1.138E−02 | 1.314E−03 | −6.976E−03 | −1.416E−02 | 4.374E−02 | 2.951E−02 |
| Sixteenth Coefficient(G) | 3.342E−03 | −5.217E−03 | −8.377E−04 | −3.646E−03 | −2.850E−02 | −1.045E−02 |
| Eighteenth Coefficient(H) | 1.660E−03 | −1.950E−03 | 4.686E−03 | 7.179E−03 | 8.850E−03 | 1.212E−02 |
| Twentieth Coefficient(J) | −2.129E−03 | −1.004E−03 | −2.273E−04 | 4.177E−03 | −2.231E−03 | −9.717E−04 |
| Twenty-second Coefficient(L) | −1.953E−03 | 1.402E−04 | 1.479E−04 | 4.657E−03 | 3.868E−03 | 7.005E−03 |
| Twenty-fourth Coefficient(M) | 1.550E−04 | 4.864E−04 | −1.806E−04 | 1.397E−03 | −5.176E−03 | 1.602E−04 |

TABLE 10-continued

| | | | | | | |
|---|---|---|---|---|---|---|
| Twenty-sixth Coefficient(N) | −3.373E−04 | −4.662E−04 | 2.494E−04 | 1.146E−03 | 3.093E−03 | 5.975E−03 |
| Twenty-eighth Coefficient(O) | −1.261E−04 | 2.848E−04 | 3.252E−04 | 5.218E−04 | −8.913E−04 | 3.938E−03 |
| Thirtieth Coefficient(P) | 4.600E−05 | 1.797E−04 | 1.497E−04 | 1.210E−04 | −8.000E−06 | 1.644E−03 |

Figure 10:
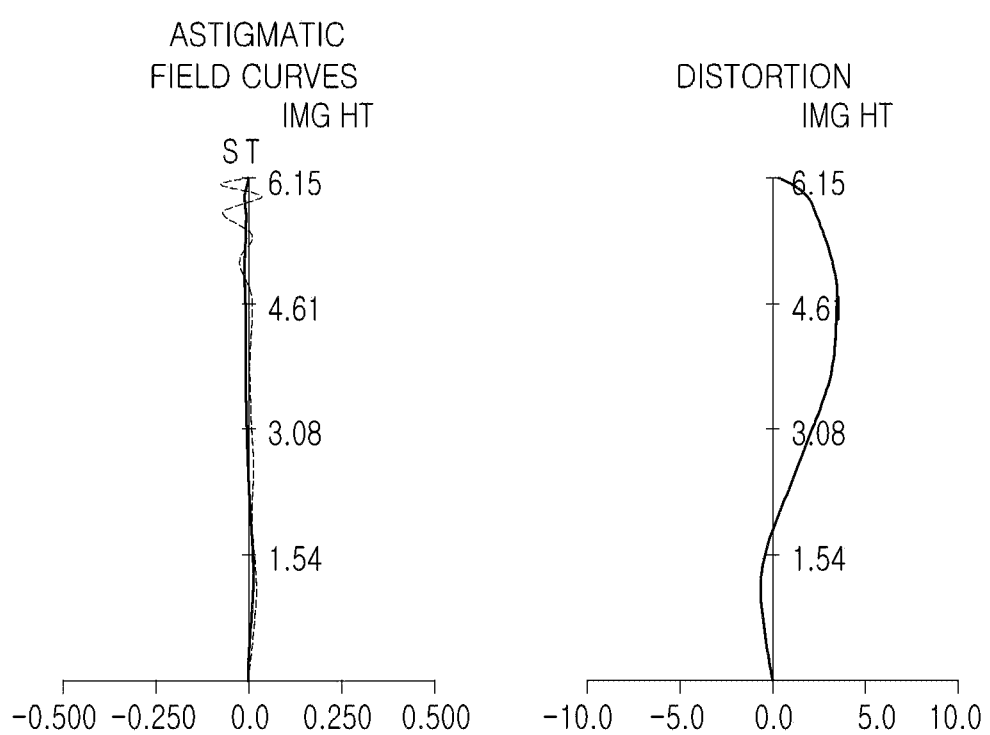
FIG. 10 is a view illustrating aberration characteristics of the example optical imaging system illustrated in FIG. 9.

Additionally, the example imaging optical system configured described above may have the aberration characteristics illustrated in FIG. 10.

Figure 11:
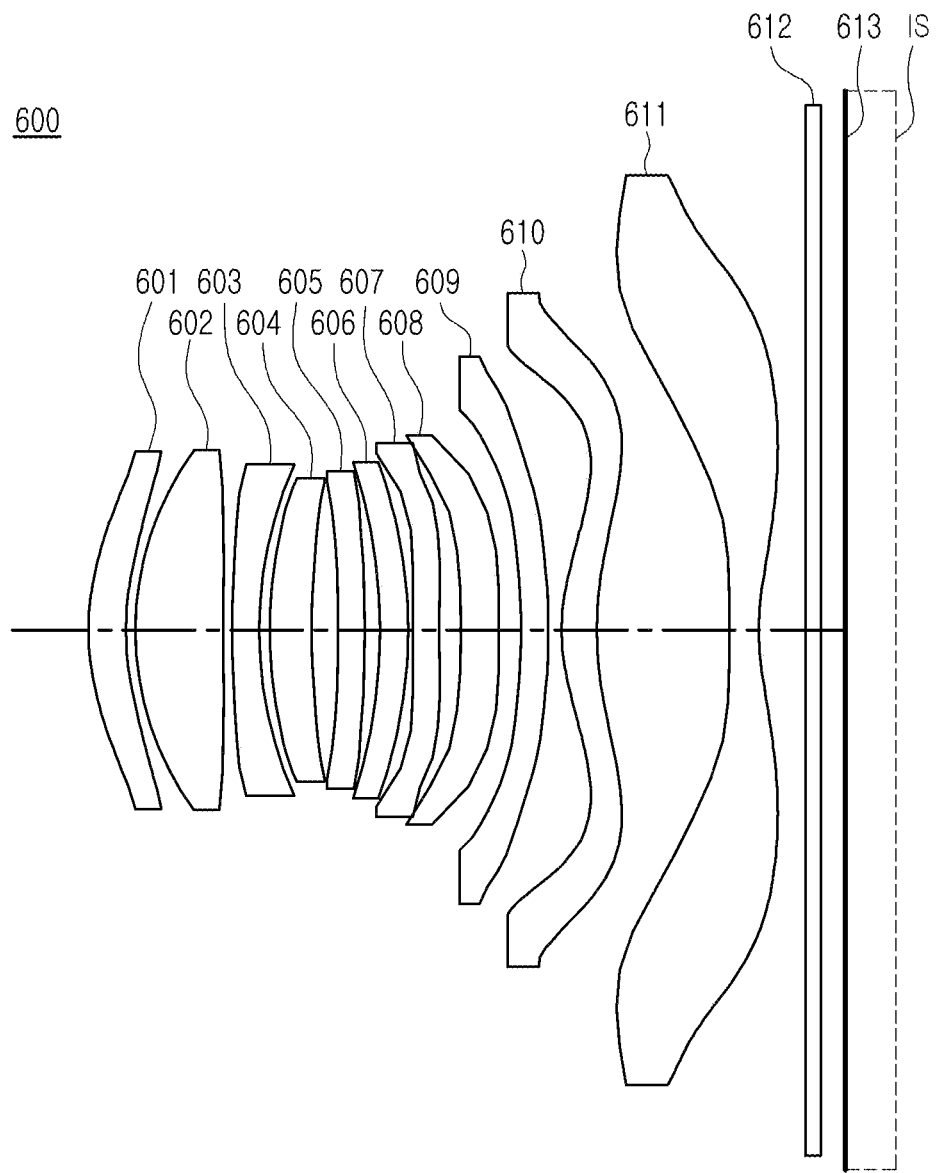
FIG. 11 illustrates a structural view of an example optical imaging system according to a sixth embodiment of the present disclosure.

An imaging optical system 600 according to a sixth embodiment of the present disclosure will be described with reference to FIGS. 11 and 12.

The imaging optical system 600 according to the sixth embodiment of the present disclosure may include a first lens 601, a second lens 602, a third lens 603, a fourth lens 604, a fifth lens 605, a sixth lens 606, a seventh lens 607, an eighth lens 608, a ninth lens 609, a tenth lens 610, and an eleventh 611, and may further include a filter 612 and an image sensor IS.

The imaging optical system 600 according to the sixth embodiment of the present disclosure may form a focus on an imaging surface 613. The imaging surface 613 may refer to a surface on which a focus is formed by the imaging optical system. For example, the imaging surface 613 may refer to one surface of the image sensor IS on which light is received.

The lens characteristics of each lens (a radius of curvature, a thickness of the lens or a distance between the lenses, an index of refraction, an Abbe number, and a focal length) are illustrated in Table 11.

TABLE 11

| Surface Number | Division | Radius | Thickness or Distance | Index | Abbe Number | Focal Length |
|---|---|---|---|---|---|---|
| S1 | First lens | 3.613 | 0.480 | 1.5440 | 55.99 | 152.5777 |
| S2 | | 3.600 | 0.116 | | | |
| S3 | Second lens | 3.427 | 1.131 | 1.5440 | 55.99 | 6.6375 |
| S4 | | 59.312 | 0.116 | | | |
| S5 | Third lens | 17.392 | 0.339 | 1.6392 | 23.48 | −11.8312 |
| S6 | | 5.230 | 0.141 | | | |
| S7 | Fourth lens | 5.795 | 0.541 | 1.5440 | 55.99 | 20.7668 |
| S8 | | 11.509 | 0.340 | | | |
| S9 | Fifth lens | −18.288 | 0.340 | 1.6707 | 19.23 | −1066.0214 |
| S10 | | −18.908 | 0.207 | | | |
| S11 | Sixth lens | −6.616 | 0.348 | 1.6144 | 25.93 | 629.9250 |
| S12 | | −6.635 | 0.058 | | | |
| S13 | Seventh lens | 31.936 | 0.339 | 1.6707 | 19.23 | −61.0628 |
| S14 | | 17.868 | 0.278 | | | |
| S15 | Eighth lens | 1406.523 | 0.491 | 1.5440 | 55.99 | −67.8461 |
| S16 | | 35.961 | 0.285 | | | |
| S17 | Ninth lens | −7.789 | 0.348 | 1.6144 | 25.93 | −64.7463 |
| S18 | | −9.850 | 0.171 | | | |
| S19 | Tenth lens | 2.788 | 0.454 | 1.5440 | 55.99 | 10.2305 |
| S20 | | 5.266 | 1.698 | | | |
| S21 | Eleventh lens | 37.895 | 0.378 | 1.5349 | 55.71 | −7.4834 |
| S22 | | 3.608 | 0.579 | | | |
| S23 | Filter | infinity | 0.210 | 1.5168 | 64.20 | |
| S24 | | infinity | 0.211 | | | |
| S25 | Imaging Surface | infinity | | | | |

In an example, a total focal length f of the imaging optical system 600 according to the sixth embodiment of the present disclosure is 7.9458 mm, Fno is 1.69, and IMG HT is 6.96 mm.

In the sixth embodiment of the present disclosure, the first lens 601 has positive refractive power, a first surface of the first lens 601 has a shape convex in the paraxial region, and a second surface of the first lens 601 has a shape concave in the paraxial region.

The second lens 602 has positive refractive power, a first surface of the second lens 602 has a shape convex in the paraxial region, and a second surface of the second lens 602 has a shape concave in the paraxial region.

The third lens 603 has negative refractive power, a first surface of the third lens 603 has a shape convex in the paraxial region, and a second surface of the third lens 603 has a shape concave in the paraxial region.

The fourth lens 604 has positive refractive power, a first surface of the fourth lens 604 has a shape convex in the paraxial region, and a second surface of the fourth lens 604 has a shape concave in the paraxial region.

The fifth lens 605 has negative refractive power, a first surface of the fifth lens 605 has a shape concave in the paraxial region, and a second surface of the fifth lens 605 has a shape convex in the paraxial region.

The sixth lens 606 has positive refractive power, a first surface of the sixth lens 606 has a shape concave in the paraxial region, and a second surface of the sixth lens 606 has a shape convex in the paraxial region.

The seventh lens 607 has negative refractive power, a first surface of the seventh lens 607 has a shape convex in the paraxial region, and a second surface of the seventh lens 607 has a shape concave in the paraxial region.

The eighth lens 608 has negative refractive power, a first surface of the eighth lens 608 has a shape convex in the paraxial region, and a second surface of the eighth lens 608 has a shape concave in the paraxial region.

The ninth lens 609 has negative refractive power, a first surface of the ninth lens 609 has a shape concave in the paraxial region, and a second surface of the ninth lens 609 has a shape convex in the paraxial region.

The tenth lens 610 has positive refractive power, a first surface of the tenth lens 610 has a shape convex in the paraxial region, and a second surface of the tenth lens 610 has a shape concave in the paraxial region.

The eleventh lens 611 has negative refractive power, a first surface of the eleventh lens 611 has a shape convex in the paraxial region, and a second surface of the eleventh lens 611 has a shape concave in the paraxial region.

Additionally, at least one of the tenth lens 610 and the eleventh lens 611 has at least one inflection point formed on at least one of the first and second surfaces.

In an example, each surface of the first lens 601 to the eleventh lens 611 has an aspherical coefficient as illustrated in Table 12. For example, both the object-side surface and the image-side surface of the first lens 601 to the eleventh lens 611 are aspherical surfaces.

TABLE 12

|  | S1 | S2 | S3 | S4 | S5 | S6 | S7 | S8 |
|---|---|---|---|---|---|---|---|---|
| Conic Constant(K) | −5.17751 | −11.01654 | −4.851381 | 99 | 26.978441 | 4.5599644 | −5.367563 | −24.11421 |
| Fourth Coefficient(A) | 7.017E−03 | 6.543E−03 | −1.595E−03 | −2.273E−03 | −4.018E−05 | −3.242E−03 | 2.060E−03 | 1.375E−04 |
| Sixth Coefficient(B) | 9.864E−04 | −8.892E−03 | 1.152E−03 | −3.060E−03 | −7.138E−03 | −7.230E−03 | −6.568E−03 | −2.706E−03 |
| Eighth Coefficient(C) | −5.858E−03 | 1.257E−02 | −4.002E−05 | 2.234E−03 | 6.563E−03 | 4.082E−03 | 6.099E−03 | 3.539E−03 |
| Tenth Coefficient(D) | 9.209E−03 | −1.694E−02 | −3.351E−04 | −6.667E−04 | −2.698E−03 | 4.091E−04 | −3.967E−03 | −3.331E−03 |
| Twelfth Coefficient(E) | −9.448E−03 | 1.591E−02 | 3.188E−04 | 5.211E−05 | 5.502E−04 | −1.411E−03 | 2.140E−03 | 2.190E−03 |
| Fourteenth Coefficient(F) | 6.590E−03 | −1.025E−02 | −1.155E−04 | 2.159E−05 | −2.822E−05 | 6.980E−04 | −8.141E−04 | −9.080E−04 |
| Sixteenth Coefficient(G) | −3.220E−03 | 4.653E−03 | 2.075E−05 | −6.616E−06 | −9.394E−06 | −1.697E−04 | 1.931E−04 | 2.288E−04 |
| Eighteenth Coefficient(H) | 1.121E−03 | −1.508E−03 | −1.875E−06 | 7.342E−07 | 1.768E−06 | 2.160E−05 | −2.521E−05 | −3.226E−05 |
| Twentieth Coefficient(J) | −2.795E−04 | 3.495E−04 | 6.820E−08 | −3.049E−08 | −9.514E−08 | −1.182E−06 | 1.383E−06 | 1.963E−06 |
| Twenty-second Coefficient(L) | 4.951E−05 | −5.738E−05 | 0.000E+00 | 0.000E+00 | 0.000E+00 | 0.000E+00 | 0.000E+00 | 0.000E+00 |
| Twenty-fourth Coefficient(M) | −6.082E−06 | 6.497E−06 | 0.000E+00 | 0.000E+00 | 0.000E+00 | 0.000E+00 | 0.000E+00 | 0.000E+00 |
| Twenty-sixth Coefficient(N) | 4.927E−07 | −4.811E−07 | 0.000E+00 | 0.000E+00 | 0.000E+00 | 0.000E+00 | 0.000E+00 | 0.000E+00 |
| Twenty-eighth Coefficient(O) | −2.369E−08 | 2.089E−08 | 0.000E+00 | 0.000E+00 | 0.000E+00 | 0.000E+00 | 0.000E+00 | 0.000E+00 |
| Thirtieth Coefficient(P) | 5.120E−10 | −4.015E−10 | 0.000E+00 | 0.000E+00 | 0.000E+00 | 0.000E+00 | 0.000E+00 | 0.000E+00 |

|  | S9 | S10 | S11 | S12 | S13 | S14 | S15 | S16 |
|---|---|---|---|---|---|---|---|---|
| Conic Constant(K) | 18.947156 | 5.1270866 | 0.223238 | −0.283537 | −2.039294 | −67.13671 | 77.012774 | −30.65511 |
| Fourth Coefficient(A) | 1.468E−03 | 6.189E−03 | −1.574E−04 | 1.818E−04 | −1.530E−02 | −2.417E−02 | −6.174E−02 | −7.665E−02 |
| Sixth Coefficient(B) | −8.332E−03 | −3.071E−02 | −1.181E−05 | 1.212E−05 | 2.549E−03 | 1.706E−02 | 5.396E−02 | 5.183E−02 |
| Eighth Coefficient(C) | 1.603E−03 | 8.125E−02 | 2.840E−06 | −2.148E−06 | −2.133E−02 | −4.287E−02 | −6.257E−02 | −3.388E−02 |
| Tenth Coefficient(D) | 2.883E−02 | −1.450E−01 | 1.684E−06 | −1.165E−06 | 4.832E−02 | 7.665E−02 | 7.657E−02 | 2.595E−02 |
| Twelfth Coefficient(E) | −6.576E−02 | 1.845E−01 | 2.286E−07 | −1.154E−07 | −6.094E−02 | −9.005E−02 | −7.543E−02 | −2.169E−02 |
| Fourteenth Coefficient(F) | 7.777E−02 | −1.696E−01 | 9.326E−16 | −1.676E−08 | 4.872E−02 | 7.096E−02 | 5.285E−02 | 1.411E−02 |
| Sixteenth Coefficient(G) | −5.917E−02 | 1.133E−01 | 1.133E−18 | −6.382E−17 | −2.580E−02 | −3.862E−02 | −2.590E−02 | −6.400E−03 |
| Eighteenth Coefficient(H) | 3.103E−02 | −5.516E−02 | −8.475E−19 | −1.054E−18 | 9.106E−03 | 1.482E−02 | 8.935E−03 | 2.016E−03 |
| Twentieth Coefficient(J) | −1.152E−02 | 1.948E−02 | −5.109E−20 | −5.403E−20 | −2.069E−03 | −4.039E−03 | −2.181E−03 | −4.453E−04 |
| Twenty-second Coefficient(L) | 3.036E−03 | −4.927E−03 | 0.000E+00 | 0.000E+00 | 2.664E−04 | 7.783E−04 | 3.741E−04 | 6.886E−05 |
| Twenty-fourth Coefficient(M) | −5.579E−04 | 8.682E−04 | 0.000E+00 | 0.000E+00 | −8.247E−06 | −1.037E−04 | −4.414E−05 | −7.308E−06 |
| Twenty-sixth Coefficient(N) | 6.819E−05 | −1.011E−04 | 0.000E+00 | 0.000E+00 | −2.790E−06 | 9.087E−06 | 3.414E−06 | 5.077E−07 |

TABLE 12-continued

| | | | | | | | |
|---|---|---|---|---|---|---|---|
| Twenty-eighth Coefficient(O) | −4.996E−06 | 6.993E−06 | 0.000E+00 | 0.000E+00 | 4.037E−07 | −4.720E−07 | −1.562E−07 | −2.080E−08 |
| Thirtieth Coefficient(P) | 1.663E−07 | −2.172E−07 | 0.000E+00 | 0.000E+00 | −1.773E−08 | 1.102E−08 | 3.216E−09 | 3.809E−10 |

| | S17 | S18 | S19 | S20 | S21 | S22 |
|---|---|---|---|---|---|---|
| Conic Constant(K) | 3.8037778 | 3.7137312 | −6.94211 | −14.22569 | 31.667903 | −6.275962 |
| Fourth Coefficient(A) | 1.168E−02 | 5.062E−03 | 9.138E−03 | 2.435E−02 | −3.441E−02 | −2.456E−02 |
| Sixth Coefficient(B) | −9.581E−03 | −1.580E−02 | −2.433E−02 | −2.412E−02 | 4.280E−03 | 5.055E−03 |
| Eighth Coefficient(C) | 1.741E−02 | 2.240E−02 | 1.958E−02 | 1.361E−02 | 4.091E−04 | −7.460E−04 |
| Tenth Coefficient(D) | −1.546E−02 | −1.588E−02 | −9.960E−03 | −5.220E−03 | −2.819E−04 | 9.253E−05 |
| Twelfth Coefficient(E) | 6.778E−03 | 6.434E−03 | 3.461E−03 | 1.379E−03 | 6.147E−05 | −1.146E−05 |
| Fourteenth Coefficient(F) | −1.500E−03 | −1.605E−03 | −8.695E−04 | −2.588E−04 | −8.180E−06 | 1.364E−06 |
| Sixteenth Coefficient(G) | 7.599E−05 | 2.474E−04 | 1.626E−04 | 3.539E−05 | 7.362E−07 | −1.326E−07 |
| Eighteenth Coefficient(H) | 4.986E−05 | −2.062E−05 | −2.279E−05 | −3.577E−06 | −4.639E−08 | 9.514E−09 |
| Twentieth Coefficient(J) | −1.582E−05 | 9.251E−08 | 2.376E−06 | 2.681E−07 | 2.070E−09 | −4.852E−10 |
| Twenty-second Coefficient(L) | 2.441E−06 | 1.882E−07 | −1.803E−07 | −1.474E−08 | −6.515E−11 | 1.727E−11 |
| Twenty-fourth Coefficient(M) | −2.284E−07 | −2.254E−08 | 9.624E−09 | 5.778E−10 | 1.416E−12 | −4.182E−13 |
| Twenty-sixth Coefficient(N) | 1.316E−08 | 1.326E−09 | −3.408E−10 | −1.527E−11 | −2.023E−14 | 6.561E−15 |
| Twenty-eighth Coefficient(O) | −4.307E−10 | −4.127E−11 | 7.163E−12 | 2.435E−13 | 1.712E−16 | −6.009E−17 |
| Thirtieth Coefficient(P) | 6.140E−12 | 5.431E−13 | −6.747E−14 | −1.765E−15 | −6.501E−19 | 2.438E−19 |

Figure 12:
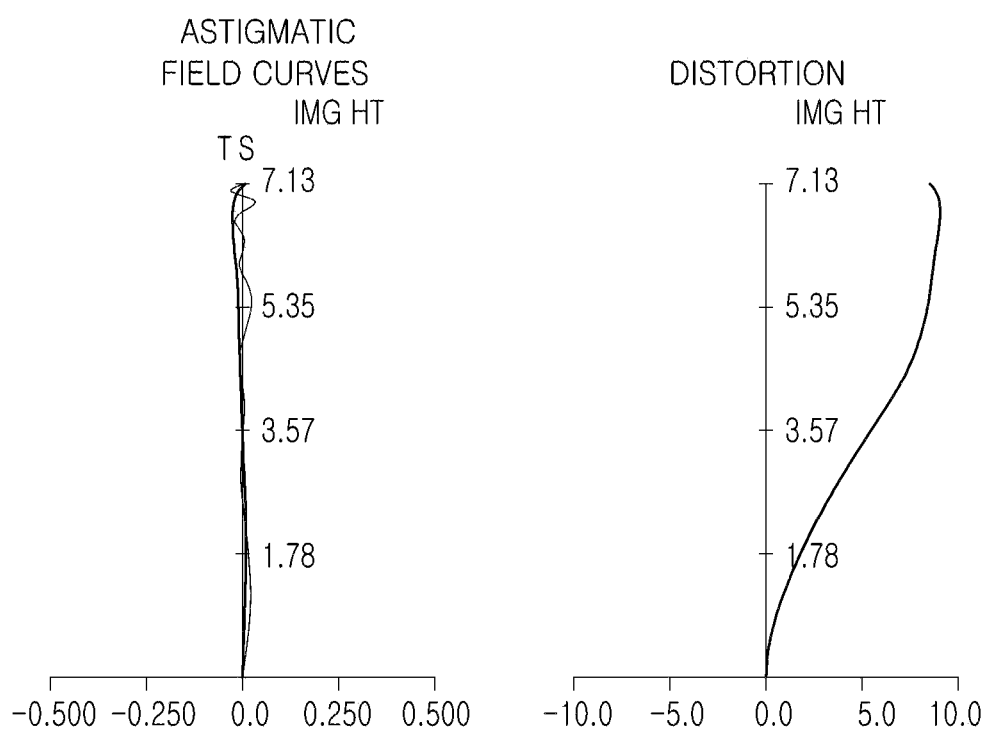
FIG. 12 is a view illustrating aberration characteristics of the example optical imaging system illustrated in FIG. 11.

Additionally, the example imaging optical system configured described above may have the aberration characteristics illustrated in FIG. 12.

Figure 13:
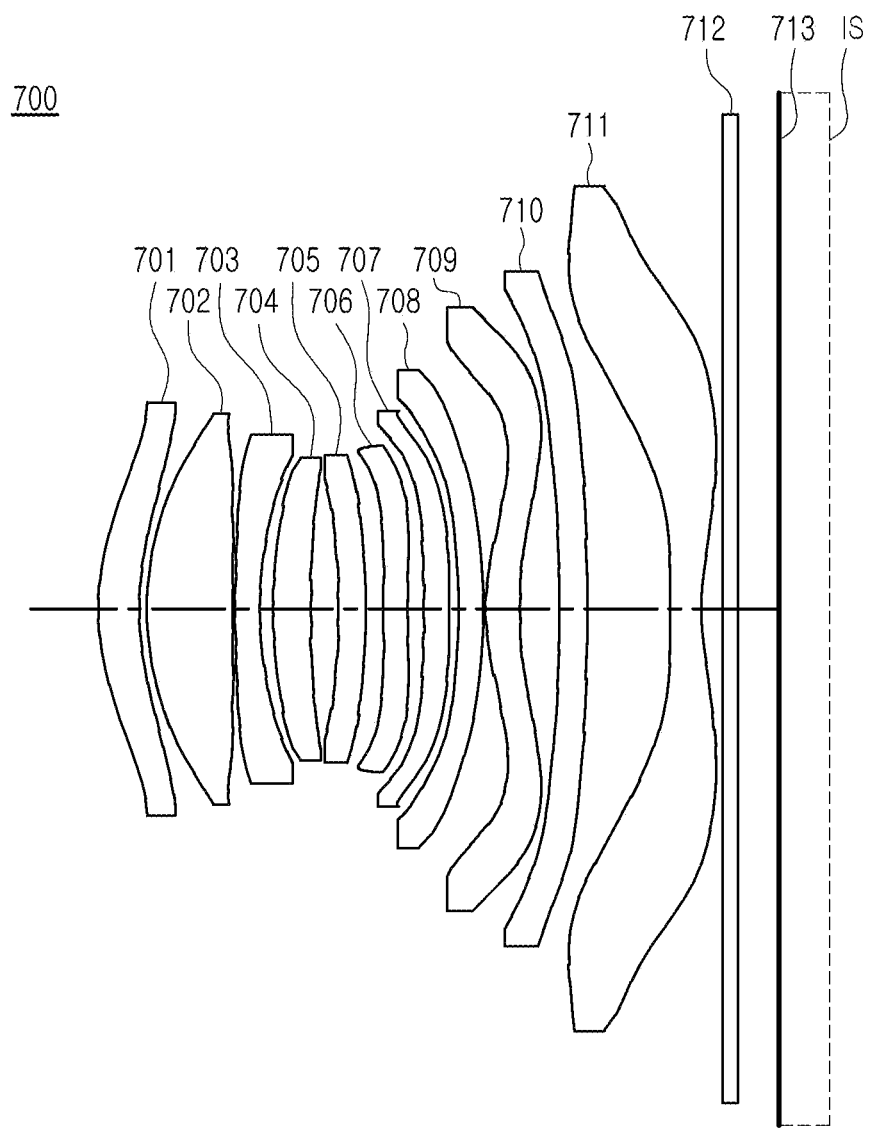
FIG. 13 illustrates a structural view of an example optical imaging system according to a seventh embodiment of the present disclosure.

An imaging optical system 700 according to a seventh embodiment of the present disclosure will be described with reference to FIGS. 13 and 14.

The imaging optical system 700 according to the seventh embodiment of the present disclosure may include a first lens 701, a second lens 702, a third lens 703, a fourth lens 704, a fifth lens 705, a sixth lens 706, a seventh lens 707, an eighth lens 708, a ninth lens 709, a tenth lens 710, and an eleventh lens 711, and may further include a filer 712 and an image sensor IS.

The imaging optical system 700 according to the seventh embodiment of the present disclosure may form a focus on an imaging surface 713. The imaging surface 713 may refer to a surface on which a focus is formed by the imaging optical system. For example, the imaging surface 713 may refer to one surface of the image sensor IS on which light is received.

The lens characteristics of each lens (a radius of curvature, a thickness of the lens or a distance between the lenses, an index of refraction, an Abbe number, and a focal length) are illustrated in Table 13.

TABLE 13

| Surface Number | Division | Radius | Thickness or Distance | Index | Abbe Number | Focal Length |
|---|---|---|---|---|---|---|
| S1 | First lens | 3.111 | 0.498 | 1.5440 | 55.99 | 67.4799 |
| S2 | | 3.207 | 0.085 | | | |
| S3 | Second lens | 3.049 | 1.046 | 1.5440 | 55.99 | 5.9180 |
| S4 | | 50.634 | 0.030 | | | |
| S5 | Third lens | 16.158 | 0.300 | 1.6392 | 23.49 | −10.2460 |
| S6 | | 4.626 | 0.162 | | | |
| S7 | Fourth lens | 5.649 | 0.462 | 1.5440 | 55.99 | 18.2122 |
| S8 | | 12.762 | 0.335 | | | |
| S9 | Fifth lens | −9.680 | 0.332 | 1.6707 | 19.24 | 372.2170 |
| S10 | | −9.447 | 0.215 | | | |
| S11 | Sixth lens | 44.719 | 0.301 | 1.6608 | 20.38 | −27.0009 |
| S12 | | 12.719 | 0.189 | | | |
| S13 | Seventh lens | 28.626 | 0.305 | 1.5440 | 55.99 | −108.5260 |
| S14 | | 19.206 | 0.117 | | | |
| S15 | Eighth lens | −6.718 | 0.300 | 1.6608 | 20.38 | −104.7470 |
| S16 | | −7.573 | 0.030 | | | |
| S17 | Ninth lens | 2.636 | 0.413 | 1.5440 | 55.99 | 9.6876 |
| S18 | | 4.984 | 0.481 | | | |

TABLE 13-continued

| Surface Number | Division | Radius | Thickness or Distance | Index | Abbe Number | Focal Length |
|---|---|---|---|---|---|---|
| S19 | Tenth lens | −23.200 | 0.346 | 1.6349 | 23.96 | 121.1770 |
| S20 | | −17.928 | 1.004 | | | |
| S21 | Eleventh lens | 31.700 | 0.377 | 1.5349 | 55.74 | −6.0327 |
| S22 | | 2.916 | 0.255 | | | |
| S23 | Filter | infinity | 0.210 | 1.5168 | 64.20 | |
| S24 | | infinity | 0.485 | | | |
| S25 | Imaging Surface | infinity | | | | |

In an example, a total focal length f of the imaging optical system 700 according to the seventh embodiment of the present disclosure is 6.85 mm, Fno is 1.609, and IMG HT is 6.15 mm.

In the seventh embodiment of the present disclosure, the first lens 701 has positive refractive power, a first surface of the first lens 701 has a shape convex in the paraxial region, and the second surface of the first lens 701 has a shape concave in the paraxial region.

The second lens 702 has positive refractive power, a first surface of the second lens 702 has a shape convex in the paraxial region, and a second surface of the second lens 702 has a shape concave in the paraxial region.

The third lens 703 has negative refractive power, a first surface of the third lens 703 has a shape convex in the paraxial region, and a second surface of the third lens 703 has a shape concave in the paraxial region.

The fourth lens 704 has positive refractive power, a first surface of the fourth lens 704 has a shape convex in the paraxial region, and a second surface of the fourth lens 704 has a shape concave in the paraxial region.

The fifth lens 705 has positive refractive power, a first surface of the fifth lens 705 has a shape concave in the paraxial region, and a second surface of the fifth lens 705 has a shape convex in the paraxial region.

The sixth lens 706 has negative refractive power, a first surface of the sixth lens 706 has a shape convex in the paraxial region, and a second surface of the sixth lens 706 has a shape concave in the paraxial region.

The seventh lens 707 has negative refractive power, a first surface of the seventh lens 707 has a shape convex in the paraxial region, and a second surface of the seventh lens 707 has a shape concave in the paraxial region.

The eighth lens 708 has negative refractive power, a first surface of the eighth lens 708 has a shape concave in the paraxial region, and a second surface of the eighth lens 708 has a shape convex in the paraxial region.

The ninth lens 709 has positive refractive power, a first surface of the ninth lens 709 has a shape convex in the paraxial region, and a second surface of the ninth lens 709 has a shape concave in the paraxial region.

The tenth lens 710 has positive refractive power, a first surface of the tenth lens 710 has a shape concave in the paraxial region, and a second surface of the tenth lens 710 has a shape convex in the paraxial region.

The eleventh lens 711 has negative refractive power, a first surface of the eleventh lens 711 has a shape convex in the paraxial region, and a second surface of the eleventh lens 711 has a shape concave in the paraxial region.

Additionally, at least one of the tenth lens 710 to the eleventh lens 711 has at least one inflection point formed on at least one of the first and second surfaces.

In an example, each surface of the first lens 701 to the eleventh lens 711 has an aspherical coefficient as illustrated in Table 14. For example, both the object-side surface and the image-side surface of the first lens 701 to the eleventh lens 711 are aspherical surfaces.

TABLE 14

| | S1 | S2 | S3 | S4 | S5 | S6 | S7 | S8 |
|---|---|---|---|---|---|---|---|---|
| Conic Constant(K) | −5.0205 | −11.2395 | −4.83323 | 99 | 29.1997 | 4.48757 | −6.08616 | −13.9924 |
| Fourth Coefficient(A) | 3.432E−02 | −1.436E−02 | 1.275E−01 | −8.030E−02 | 7.026E−03 | −8.823E−02 | 1.475E−02 | 1.795E−02 |
| Sixth Coefficient(B) | −4.140E−02 | −5.204E−03 | 2.480E−02 | 1.511E−03 | 1.963E−02 | 2.909E−03 | 1.755E−02 | 1.386E−02 |
| Eighth Coefficient(C) | 3.370E−03 | 7.294E−04 | −1.184E−02 | −1.099E−03 | −6.158E−04 | −2.797E−03 | 4.857E−03 | 6.801E−03 |
| Tenth Coefficient(D) | 3.500E−05 | −3.446E−03 | −3.436E−03 | −1.321E−03 | −9.518E−04 | −1.735E−03 | 6.049E−04 | 3.603E−03 |
| Twelfth Coefficient(E) | −2.914E−04 | 5.964E−04 | −2.471E−04 | 3.746E−04 | 3.329E−04 | −2.603E−04 | 6.946E−04 | 2.260E−03 |
| Fourteenth Coefficient(F) | 1.400E−05 | −2.700E−05 | 9.700E−05 | −1.170E−04 | −1.769E−04 | −3.500E−05 | 4.085E−04 | 8.807E−04 |
| Sixteenth Coefficient(G) | 4.800E−05 | 8.200E−05 | −3.000E−06 | 1.092E−04 | 2.500E−05 | −6.000E−06 | 1.183E−04 | 1.146E−04 |
| Eighteenth Coefficient(H) | −1.900E−05 | −9.400E−05 | 7.000E−06 | 2.000E−06 | −2.399E−07 | 2.000E−06 | 2.900E−05 | −4.700E−05 |
| Twentieth Coefficient(J) | −6.000E−06 | 8.000E−05 | 6.600E−05 | 7.000E−06 | −2.000E−06 | −1.000E−06 | 7.000E−06 | −3.100E−05 |
| Twenty-second Coefficient(L) | −2.025E−07 | −3.000E−05 | 0.000E+00 | 0.000E+00 | 0.000E+00 | 0.000E+00 | 0.000E+00 | 0.000E+00 |
| Twenty-fourth Coefficient(M) | 5.000E−06 | 1.300E−05 | 0.000E+00 | 0.000E+00 | 0.000E+00 | 0.000E+00 | 0.000E+00 | 0.000E+00 |
| Twenty-sixth Coefficient(N) | −2.766E−07 | −1.200E−05 | 0.000E+00 | 0.000E+00 | 0.000E+00 | 0.000E+00 | 0.000E+00 | 0.000E+00 |

TABLE 14-continued

| | | | | | | | | |
|---|---|---|---|---|---|---|---|---|
| Twenty-eighth Coefficient(O) | −1.000E−06 | 5.000E−06 | 0.000E+00 | 0.000E+00 | 0.000E+00 | 0.000E+00 | 0.000E+00 | 0.000E+00 |
| Thirtieth Coefficient(P) | 2.208E−07 | −1.000E−06 | 0.000E+00 | 0.000E+00 | 0.000E+00 | 0.000E+00 | 0.000E+00 | 0.000E+00 |

| | S9 | S10 | S11 | S12 | S13 | S14 | S15 | S16 |
|---|---|---|---|---|---|---|---|---|
| Conic Constant(K) | 17.0224 | 9.59771 | 99 | −79.3235 | 95.5479 | 64.8302 | 4.40819 | 4.45209 |
| Fourth Coefficient(A) | −2.486E−02 | −1.366E−02 | −3.260E−01 | −5.094E−01 | −6.906E−01 | −1.105E+00 | −1.179E−01 | −3.973E−02 |
| Sixth Coefficient(B) | −7.625E−03 | −7.744E−03 | −1.200E−02 | 3.007E−04 | 1.183E−02 | 1.287E−01 | −7.229E−02 | −3.444E−02 |
| Eighth Coefficient(C) | −1.938E−03 | −2.749E−03 | −3.297E−03 | 4.214E−03 | −1.896E−02 | 8.383E−03 | 2.177E−02 | −2.636E−02 |
| Tenth Coefficient(D) | −1.175E−03 | −1.356E−03 | 6.881E−04 | 6.003E−03 | 2.191E−02 | 4.455E−02 | −2.650E−02 | −1.307E−02 |
| Twelfth Coefficient(E) | 2.165E−04 | −5.519E−04 | −5.440E−04 | −4.631E−04 | 2.769E−03 | −2.438E−03 | 1.053E−02 | 1.169E−02 |
| Fourteenth Coefficient(F) | 5.200E−05 | −3.056E−04 | −1.900E−04 | 8.734E−04 | 4.933E−03 | 5.490E−04 | 1.192E−02 | −1.518E−03 |
| Sixteenth Coefficient(G) | 1.302E−04 | 4.800E−05 | −1.946E−04 | 3.411E−04 | 6.985E−04 | −5.008E−03 | 4.303E−03 | −4.264E−03 |
| Eighteenth Coefficient(H) | 3.200E−05 | 3.075E−04 | 3.333E−04 | 1.136E−03 | 1.300E−03 | −1.398E−03 | 1.103E−03 | −1.164E−03 |
| Twentieth Coefficient(J) | 7.700E−05 | 3.156E−04 | 4.193E−04 | 8.432E−04 | 6.295E−04 | −2.072E−03 | −1.186E−03 | −3.515E−04 |
| Twenty-second Coefficient(L) | 2.000E−05 | 2.350E−04 | 4.299E−04 | 7.478E−04 | 1.215E−03 | −1.821E−04 | −6.505E−04 | 2.953E−04 |
| Twenty-fourth Coefficient(M) | 3.200E−05 | 1.363E−04 | 3.013E−04 | 4.840E−04 | 1.183E−03 | 4.570E−04 | −4.735E−04 | 6.592E−04 |
| Twenty-sixth Coefficient(N) | −2.000E−06 | 7.500E−05 | 1.842E−04 | 3.051E−04 | 7.597E−04 | 3.072E−04 | −1.246E−03 | −4.753E−04 |
| Twenty-eighth Coefficient(O) | 4.000E−06 | 3.100E−05 | 8.700E−05 | 1.260E−04 | 2.518E−04 | −2.526E−04 | −1.210E−03 | −1.527E−04 |
| Thirtieth Coefficient(P) | −9.000E−06 | 1.700E−05 | 2.900E−05 | 4.100E−05 | 3.000E−05 | −7.000E−05 | −1.408E−04 | 2.807E−04 |

| | S17 | S18 | S19 | S20 | S21 | S22 |
|---|---|---|---|---|---|---|
| Conic Constant(K) | −7.03483 | −16.7158 | 25.9883 | 6.09937 | 35.4157 | −8.50473 |
| Fourth Coefficient(A) | 1.754E+00 | 1.583E+00 | 1.850E+00 | −4.197E−01 | −2.625E+00 | −3.484E+00 |
| Sixth Coefficient(B) | 1.340E−01 | −8.624E−02 | 1.783E−01 | −2.139E−02 | 1.268E+00 | 8.769E−01 |
| Eighth Coefficient(C) | 1.278E−01 | 1.703E−01 | −5.456E−02 | −1.994E−02 | −5.591E−01 | −1.650E−01 |
| Tenth Coefficient(D) | 3.163E−02 | 8.785E−03 | −5.401E−02 | 1.956E−02 | 1.563E−01 | 1.949E−02 |
| Twelfth Coefficient(E) | −1.555E−02 | 1.701E−02 | 4.008E−02 | 7.061E−02 | −5.444E−02 | −9.101E−02 |
| Fourteenth Coefficient(F) | −1.273E−02 | −8.045E−03 | −6.600E−03 | −5.153E−02 | 4.415E−02 | 4.984E−02 |
| Sixteenth Coefficient(G) | −2.301E−03 | 1.033E−02 | −5.264E−03 | 3.486E−02 | −2.262E−02 | 2.391E−03 |
| Eighteenth Coefficient(H) | 3.832E−03 | 1.971E−03 | 6.765E−03 | 7.345E−03 | 2.940E−03 | 8.905E−03 |
| Twentieth Coefficient(J) | 2.827E−03 | 2.301E−03 | 2.780E−03 | −1.904E−02 | −5.581E−04 | −6.547E−03 |
| Twenty-second Coefficient(L) | −2.038E−04 | −1.041E−03 | 1.544E−02 | 1.798E−02 | 2.503E−03 | 9.106E−03 |
| Twenty-fourth Coefficient(M) | −2.951E−04 | 1.452E−03 | −8.412E−04 | 1.185E−02 | −5.980E−03 | −1.334E−03 |
| Twenty-sixth Coefficient(N) | −8.886E−04 | 4.609E−04 | −2.046E−03 | −8.976E−03 | 3.335E−03 | −9.687E−04 |
| Twenty-eighth Coefficient(O) | −4.561E−04 | 8.160E−04 | 8.703E−03 | 1.292E−02 | −7.866E−04 | −4.097E−04 |
| Thirtieth Coefficient(P) | −1.560E−04 | 1.240E−04 | −8.816E−03 | 4.305E−03 | −7.269E−04 | 1.349E−03 |

Figure 14:
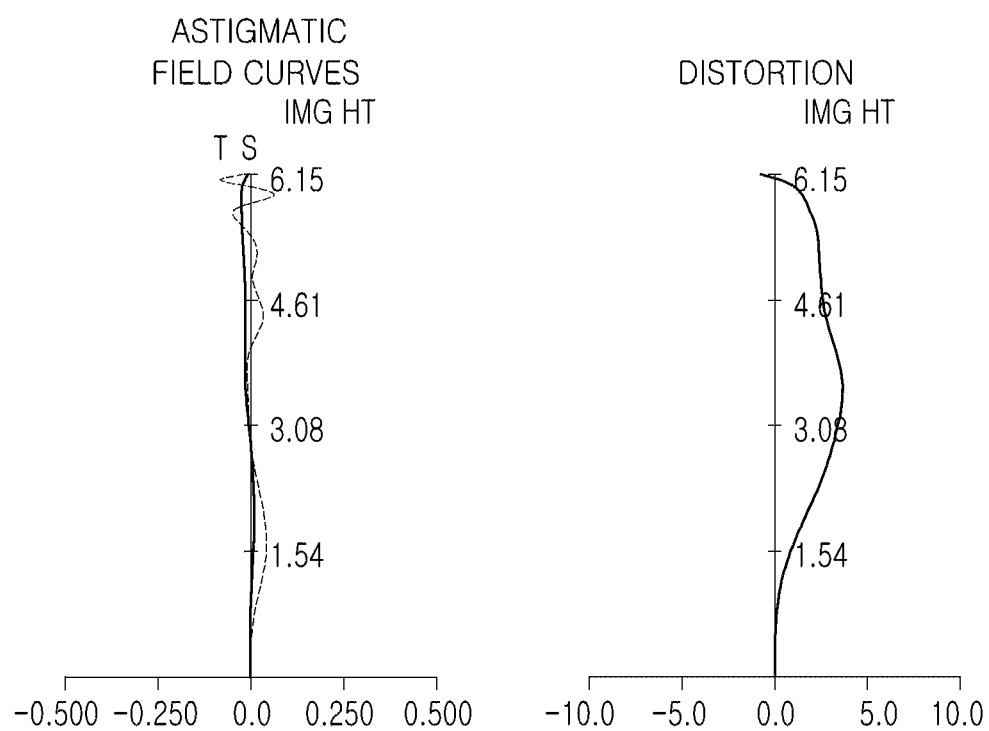
FIG. 14 is a view illustrating aberration characteristics of the example optical imaging system illustrated in FIG. 13.

Additionally, the example imaging optical system configured described above may have the aberration characteristics illustrated in FIG. 14.

Figure 15:
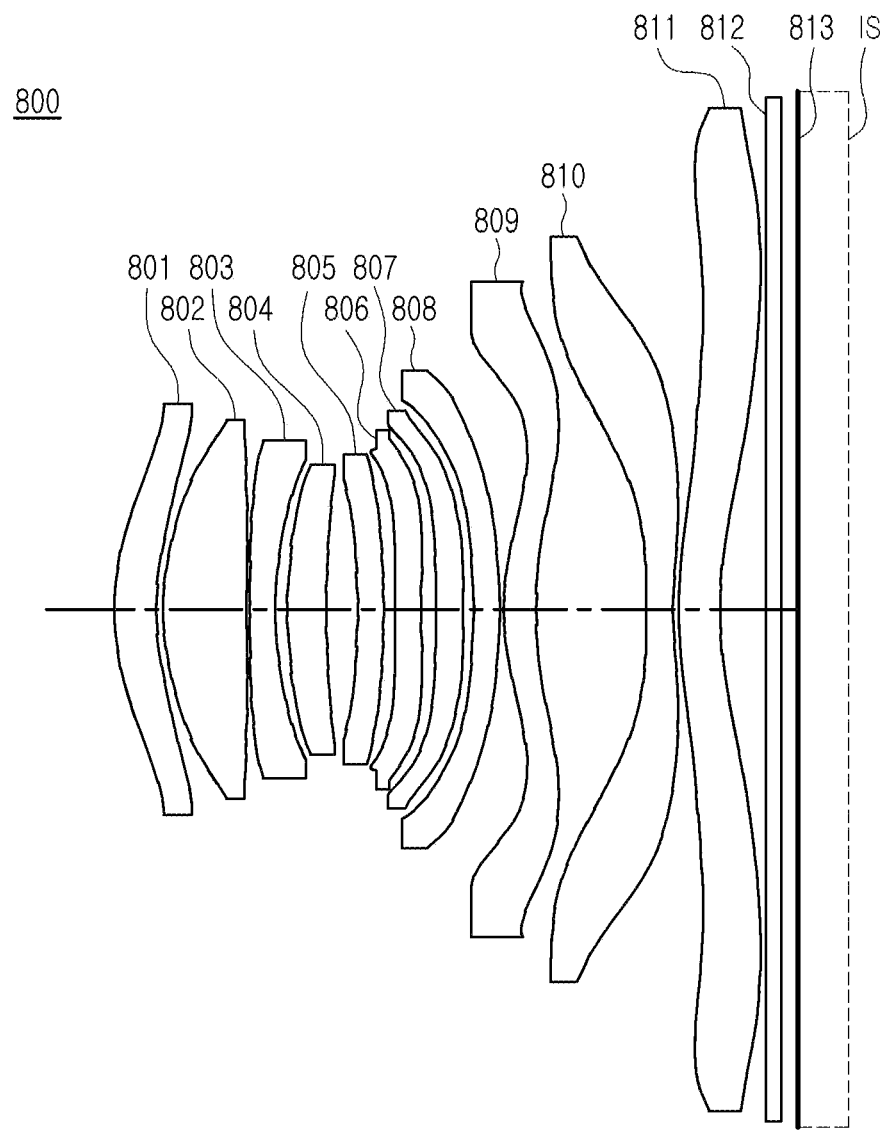
FIG. 15 illustrates a structural view of an example optical imaging system according to an eighth embodiment of the present disclosure.

An imaging optical system 800 according to an eighth embodiment of the present disclosure will be described with reference to FIGS. 15 and 16.

The imaging optical system 800 according to the eighth embodiment of the present disclosure may include a first lens 801, a second lens 802, a third lens 803, a fourth lens 804, a fifth lens 805, a sixth lens 806, a seventh lens 807, an eighth lens 808, a ninth lens 809, a tenth lens 810, and an eleventh 811, and may further include a filter 812 and an image sensor IS.

The imaging optical system 800 according to the eighth embodiment of the present disclosure may form a focus on an imaging surface 813. The imaging surface 813 may refer to a surface on which a focus is formed by the imaging optical system. For example, the imaging surface 813 may refer to one surface of the image sensor IS on which light is received.

The lens characteristics of each lens (a radius of curvature, a thickness of the lens or a distance between the lenses, an index of refraction, an Abbe number, and a focal length) are illustrated in Table 15.

TABLE 15

| Surface Number | Division | Radius | Thickness or Distance | Index | Abbe Number | Focal Length |
|---|---|---|---|---|---|---|
| S1 | First lens | 3.111 | 0.504 | 1.5440 | 55.99 | 66.9299 |
| S2 | | 3.207 | 0.083 | | | |
| S3 | Second lens | 3.049 | 1.023 | 1.5440 | 55.99 | 5.9190 |
| S4 | | 50.634 | 0.030 | | | |
| S5 | Third lens | 16.847 | 0.320 | 1.6392 | 23.49 | −10.2466 |
| S6 | | 4.681 | 0.145 | | | |
| S7 | Fourth lens | 5.649 | 0.468 | 1.5440 | 55.99 | 18.3943 |
| S8 | | 12.594 | 0.382 | | | |
| S9 | Fifth lens | −9.810 | 0.320 | 1.6707 | 19.24 | −842.6100 |
| S10 | | −10.114 | 0.134 | | | |
| S11 | Sixth lens | 33.930 | 0.320 | 1.6608 | 20.38 | −33.2446 |
| S12 | | 13.284 | 0.178 | | | |
| S13 | Seventh lens | 31.269 | 0.328 | 1.5440 | 55.99 | −125.4080 |
| S14 | | 21.362 | 0.131 | | | |
| S15 | Eighth lens | −6.201 | 0.320 | 1.6608 | 20.38 | −85.8012 |
| S16 | | −7.106 | 0.044 | | | |
| S17 | Ninth lens | 2.695 | 0.396 | 1.5440 | 55.99 | 9.1872 |
| S18 | | 5.547 | 1.338 | | | |
| S19 | Tenth lens | 30.321 | 0.320 | 1.5349 | 55.74 | −7.6978 |
| S20 | | 3.612 | 0.078 | | | |
| S21 | Eleventh lens | 5.871 | 0.500 | 1.5440 | 55.99 | −66.0883 |
| S22 | | 4.895 | 0.562 | | | |
| S23 | Filter | infinity | 0.210 | 1.5168 | 64.20 | |
| S24 | | infinity | 0.178 | | | |
| S25 | Imaging Surface | infinity | | | | |

In an example, a total focal length f of the imaging optical system 800 according to the eighth embodiment of the present disclosure is 6.8498 mm, Fno is 1.609, and IMG HT is 6.15 mm.

In the eighth embodiment of the present disclosure, the first lens 801 has positive refractive power, a first surface of the first lens 801 has a shape convex in the paraxial region, and a second surface of the first lens 801 has a shape concave in the paraxial region.

The second lens 802 has positive refractive power, a first surface of the second lens 802 has a shape convex in the paraxial region, and a second surface of the second lens 802 has a shape concave in the paraxial region.

The third lens 803 has negative refractive power, a first surface of the third lens 803 has a shape convex in the paraxial region, and a second surface of the third lens 803 has a shape concave in the paraxial region.

The fourth lens 804 has positive refractive power, a first surface of the fourth lens 804 has a shape convex in the paraxial region, and a second surface of the fourth lens 804 has a shape concave in the paraxial region.

The fifth lens 805 has negative refractive power, a first surface of the fifth lens 805 has a shape concave in the paraxial region, and a second surface of the eighth lens 805 has a shape convex in the paraxial region.

The sixth lens 806 has negative refractive power, a first surface of the sixth lens 806 has a shape convex in the paraxial region, and a second surface of the sixth lens 806 has a shape concave in the paraxial region.

The seventh lens 807 has negative refractive power, a first surface of the seventh lens 807 has a shape convex in the paraxial region, and a second surface of the seventh lens 807 has a shape concave in the paraxial region.

The eighth lens 808 has negative refractive power, a first surface of the eighth lens 808 has a shape concave in the paraxial region, and a second surface of the eighth lens 808 has a shape convex in the paraxial region.

The ninth lens 809 has positive refractive power, a first surface of the ninth lens 809 has a shape convex in the paraxial region, and a second surface of the ninth lens 809 has a shape concave in the paraxial region.

The tenth lens 810 has negative refractive power, a first surface of the tenth lens 810 has a shape convex in the paraxial region, and a second surface of the tenth lens 810 has a shape concave in the paraxial region.

The eleventh lens 811 has negative refractive power, a first surface of the eleventh lens 811 has a shape convex in the paraxial region, and a second surface of the eleventh lens 811 has a shape concave in the paraxial region.

Additionally, at least one of the tenth lens 810 to the eleventh lens 811 has at least one inflection point formed on at least one of the first and second surfaces.

In an example, each surface of the first lens 801 to the eleventh lens 811 has an aspherical coefficient as illustrated in Table 16. For example, both the object-side surface and the image-side surface of the first lens 801 to the eleventh lens 811 are aspherical surfaces.

TABLE 16

| | S1 | S2 | S3 | S4 | S5 | S6 | S7 | S8 |
|---|---|---|---|---|---|---|---|---|
| Conic Constant(K) | −5.01139 | −11.219 | −4.78437 | 99 | 27.5671 | 4.4761 | −5.73879 | −12.6495 |
| Fourth Coefficient(A) | 3.436E−02 | −1.417E−02 | 1.285E−01 | −7.888E−02 | 6.293E−03 | −8.890E−02 | 1.645E−02 | 1.868E−02 |
| Sixth Coefficient(B) | −4.142E−02 | −5.096E−03 | 2.476E−02 | 1.365E−03 | 1.852E−02 | 2.795E−03 | 1.859E−02 | 1.511E−02 |
| Eighth Coefficient(C) | 3.441E−03 | 8.503E−04 | −1.195E−02 | −1.048E−03 | 3.876E−04 | −2.402E−03 | 4.034E−03 | 6.349E−03 |
| Tenth Coefficient(D) | 1.073E−04 | −3.356E−03 | −3.724E−03 | −1.365E−03 | −7.042E−04 | −1.288E−03 | 4.072E−04 | 3.229E−03 |
| Twelfth Coefficient(E) | −2.614E−04 | 7.151E−04 | −1.100E−04 | 7.256E−04 | 5.330E−04 | −1.020E−04 | 6.622E−04 | 2.230E−03 |
| Fourteenth Coefficient(F) | 1.800E−05 | 5.800E−05 | 2.595E−04 | −3.400E−05 | −1.838E−04 | 4.100E−05 | 4.593E−04 | 1.146E−03 |
| Sixteenth Coefficient(G) | 5.300E−05 | 8.200E−05 | 9.100E−05 | 1.998E−04 | 7.900E−05 | 6.100E−05 | 2.234E−04 | 3.892E−04 |
| Eighteenth Coefficient(H) | −1.700E−05 | −9.700E−05 | 4.600E−05 | 2.000E−06 | −2.000E−05 | 3.500E−05 | 8.400E−05 | 9.500E−05 |
| Twentieth Coefficient(J) | −6.000E−06 | 7.800E−05 | 9.600E−05 | 4.000E−06 | −1.500E−05 | 1.000E−06 | 2.000E−05 | 6.000E−06 |
| Twenty-second Coefficient(L) | −3.111E−07 | −2.900E−05 | 0.000E+00 | 0.000E+00 | 0.000E+00 | 0.000E+00 | 0.000E+00 | 0.000E+00 |
| Twenty-fourth Coefficient(M) | 5.000E−06 | 1.200E−05 | 0.000E+00 | 0.000E+00 | 0.000E+00 | 0.000E+00 | 0.000E+00 | 0.000E+00 |
| Twenty-sixth Coefficient(N) | −3.092E−07 | −1.100E−05 | 0.000E+00 | 0.000E+00 | 0.000E+00 | 0.000E+00 | 0.000E+00 | 0.000E+00 |
| Twenty-eighth Coefficient(O) | −1.000E−06 | 6.000E−06 | 0.000E+00 | 0.000E+00 | 0.000E+00 | 0.000E+00 | 0.000E+00 | 0.000E+00 |
| Thirtieth Coefficient(P) | 2.280E−07 | −1.000E−06 | 0.000E+00 | 0.000E+00 | 0.000E+00 | 0.000E+00 | 0.000E+00 | 0.000E+00 |

| | S9 | S10 | S11 | S12 | S13 | S14 | S15 | S16 |
|---|---|---|---|---|---|---|---|---|
| Conic Constant(K) | 17.8177 | 9.13323 | 42.1944 | −88.9566 | 63.7007 | 65.5296 | 4.50225 | 4.35743 |
| Fourth Coefficient(A) | −2.671E−02 | −1.212E−02 | −3.262E−01 | −5.153E−01 | −6.937E−01 | −1.106E+00 | −1.138E−01 | −4.545E−02 |
| Sixth Coefficient(B) | −8.250E−03 | −9.234E−03 | −1.227E−02 | −3.821E−04 | 1.284E−02 | 1.314E−01 | −7.397E−02 | −3.014E−02 |
| Eighth Coefficient(C) | −1.172E−03 | −1.604E−03 | −3.368E−03 | 5.825E−03 | −1.883E−02 | 3.700E−03 | 1.957E−02 | −2.478E−02 |
| Tenth Coefficient(D) | −9.395E−04 | −1.280E−03 | 4.621E−04 | 5.758E−03 | 2.188E−02 | 4.564E−02 | −2.511E−02 | −1.411E−02 |
| Twelfth Coefficient(E) | −9.100E−05 | −9.546E−04 | −7.285E−04 | −5.387E−04 | 3.093E−03 | −1.204E−03 | 1.122E−02 | 1.152E−02 |
| Fourteenth Coefficient(F) | 1.300E−05 | −3.507E−04 | −8.400E−05 | 9.299E−04 | 4.790E−03 | −7.842E−04 | 1.118E−02 | −1.247E−03 |
| Sixteenth Coefficient(G) | 6.300E−05 | −1.100E−05 | −1.317E−04 | 1.950E−04 | 4.121E−04 | −4.604E−03 | 4.412E−03 | −5.013E−03 |
| Eighteenth Coefficient(H) | 5.100E−05 | 3.846E−04 | 5.059E−04 | 9.678E−04 | 1.298E−03 | −1.110E−03 | 1.070E−03 | −2.984E−04 |
| Twentieth Coefficient(J) | 5.200E−05 | 3.396E−04 | 4.957E−04 | 6.351E−04 | 7.419E−04 | −2.154E−03 | −7.455E−04 | 1.930E−04 |
| Twenty-second Coefficient(L) | 2.600E−05 | 2.943E−04 | 4.902E−04 | 6.564E−04 | 1.372E−03 | −3.700E−04 | −8.090E−04 | −4.762E−04 |
| Twenty-fourth Coefficient(M) | 2.200E−05 | 1.808E−04 | 3.135E−04 | 4.518E−04 | 1.164E−03 | 1.600E−04 | −9.964E−04 | −4.000E−06 |
| Twenty-sixth Coefficient(N) | 7.000E−06 | 1.146E−04 | 1.884E−04 | 3.083E−04 | 7.463E−04 | 5.357E−04 | −8.968E−04 | 1.490E−04 |
| Twenty-eighth Coefficient(O) | 5.000E−06 | 5.000E−05 | 7.200E−05 | 1.178E−04 | 2.157E−04 | 4.500E−05 | −9.251E−04 | −3.300E−05 |
| Thirtieth Coefficient(P) | −1.000E−06 | 2.300E−05 | 2.400E−05 | 3.700E−05 | 3.400E−05 | −5.000E−06 | −2.498E−04 | 5.300E−05 |

| | S17 | S18 | S19 | S20 | S21 | S22 |
|---|---|---|---|---|---|---|
| Conic Constant(K) | −6.62345 | −14.9005 | 33.4084 | −13.4443 | −53.5151 | −37.9659 |
| Fourth Coefficient(A) | −1.679E+00 | −1.052E+00 | −2.517E+00 | −3.382E+00 | 3.161E−01 | −2.170E+00 |
| Sixth Coefficient(B) | 1.304E−01 | 2.540E−02 | 1.208E+00 | 9.113E−01 | 4.236E−01 | 2.231E−01 |
| Eighth Coefficient(C) | 1.283E−01 | 1.525E−01 | −5.891E−01 | −2.358E−01 | −5.503E−01 | 8.983E−02 |
| Tenth Coefficient(D) | 2.819E−02 | −1.611E−02 | 2.409E−01 | 4.055E−02 | 2.084E−02 | −7.946E−02 |
| Twelfth Coefficient(E) | −1.826E−02 | 2.402E−02 | −6.131E−02 | −1.062E−01 | 1.628E−01 | 8.670E−02 |

TABLE 16-continued

| | | | | | |
|---|---|---|---|---|---|
| Fourteenth Coefficient(F) | −9.994E−03 | 8.200E−05 | 4.307E−02 | 8.086E−02 | −9.204E−02 | −5.180E−02 |
| Sixteenth Coefficient(G) | −2.045E−03 | 7.507E−03 | −2.156E−02 | −7.171E−03 | −5.080E−02 | 2.662E−02 |
| Eighteenth Coefficient(H) | 4.435E−03 | 5.406E−04 | 1.123E−02 | 9.733E−03 | 3.934E−02 | −1.903E−02 |
| Twentieth Coefficient(J) | 1.474E−03 | 3.093E−04 | −8.008E−03 | −5.579E−03 | 2.430E−02 | 1.620E−02 |
| Twenty-second Coefficient(L) | 4.515E−04 | 1.449E−03 | 5.262E−03 | 1.013E−02 | −2.930E−02 | −2.730E−02 |
| Twenty-fourth Coefficient(M) | −6.757E−04 | 1.461E−03 | −3.581E−03 | 1.295E−03 | −6.535E−03 | 2.621E−02 |
| Twenty-sixth Coefficient(N) | −5.101E−04 | 1.167E−03 | 7.453E−04 | 1.770E−03 | 7.328E−03 | 1.606E−03 |
| Twenty-eighth Coefficient(O) | 5.400E−05 | 5.886E−04 | −3.704E−04 | −1.795E−04 | 1.860E−02 | −5.319E−03 |
| Thirtieth Coefficient(P) | 1.182E−04 | −1.693E−04 | −1.284E−03 | −7.715E−04 | −8.242E−03 | −2.192E−02 |

Figure 16:
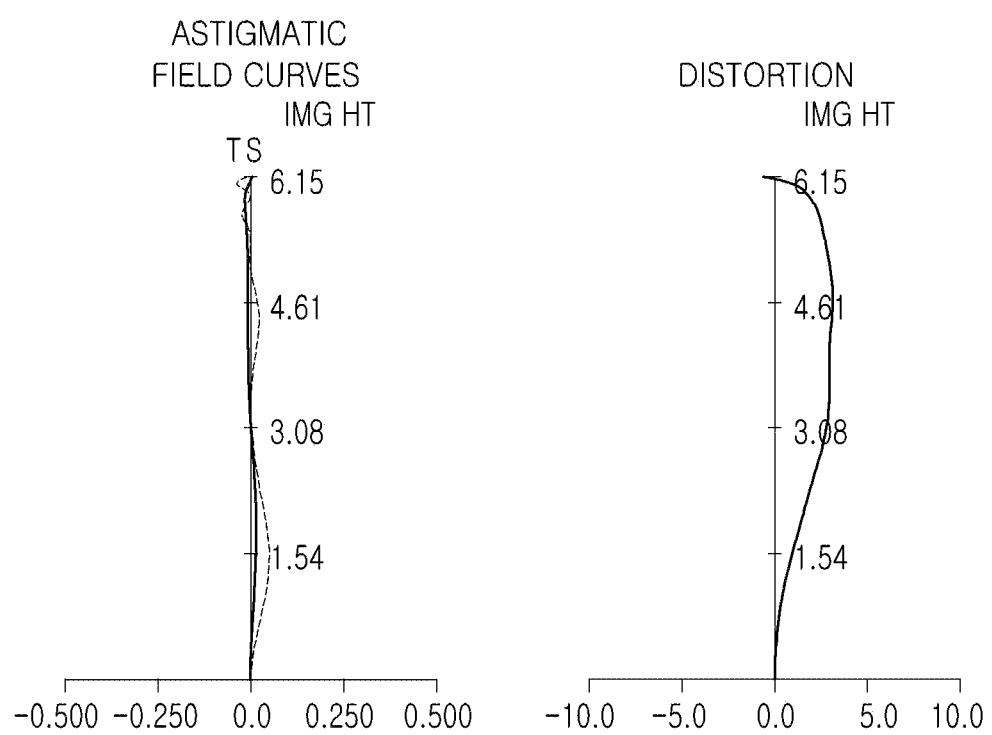
FIG. 16 is a view illustrating aberration characteristics of the example optical imaging system illustrated in FIG. 15.

Additionally, the example imaging optical system configured described above may have the aberration characteristics illustrated in FIG. 16.

Figure 17:
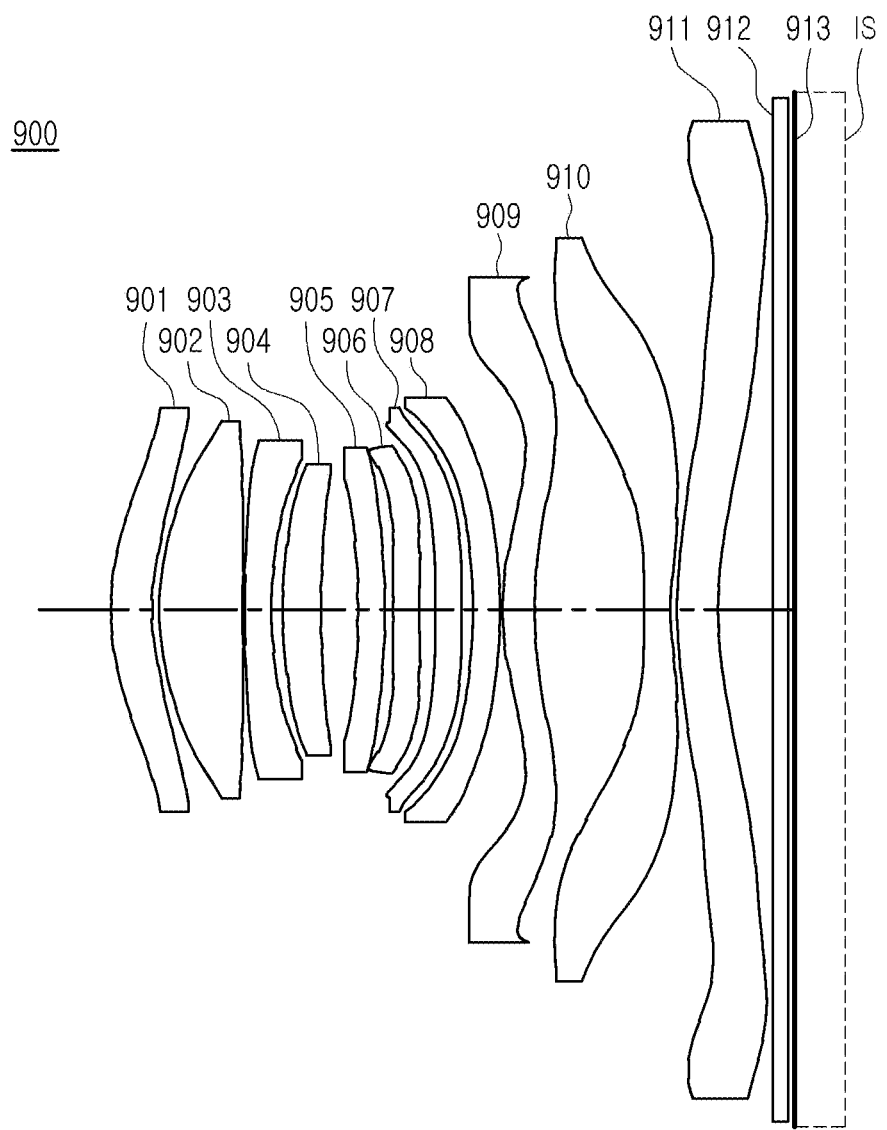
FIG. 17 illustrates a structural view of an example optical imaging system according to a nineth embodiment of the present disclosure.

An imaging optical system 900 according to a ninth embodiment of the present disclosure will be described with reference to FIGS. 17 and 18.

The imaging optical system 900 according to the ninth embodiment of the present disclosure may include a first lens 901, a second lens 902, a third lens 903, a fourth lens 904, a fifth lens 905, a sixth lens 906, a seven lens 907, an eighth lens 908, a ninth lens 909, a tenth lens 910, and an eleventh lens 911, and may further include a filter 912 and an image sensor IS.

The imaging optical system 900 according to the ninth embodiment of the present disclosure may form a focus on an imaging surface 913. The imaging surface 913 may refer to a surface on which a focus is formed by the imaging optical system. For example, the imaging surface 913 may refer to one surface of the image sensor IS on which light is received.

The lens characteristics of each lens (a radius of curvature, a thickness of the lens or a distance between the lenses, an index of refraction, an Abbe number, and a focal length) are illustrated in Table 17.

TABLE 17

| Surface Number | Division | Radius | Thickness or Distance | Index | Abbe Number | Focal Length |
|---|---|---|---|---|---|---|
| S1 | First lens | 3.111 | 0.511 | 1.5440 | 55.99 | 66.3439 |
| S2 | | 3.207 | 0.081 | | | |
| S3 | Second lens | 3.049 | 1.012 | 1.5440 | 55.99 | 5.9194 |
| S4 | | 50.634 | 0.030 | | | |
| S5 | Third lens | 17.123 | 0.320 | 1.6392 | 23.49 | −10.2451 |
| S6 | | 4.702 | 0.137 | | | |
| S7 | Fourth lens | 5.557 | 0.466 | 1.5440 | 55.99 | 18.3870 |
| S8 | | 12.132 | 0.452 | | | |
| S9 | Fifth lens | −9.945 | 0.320 | 1.6707 | 19.24 | −171.4450 |
| S10 | | −11.027 | 0.101 | | | |
| S11 | Sixth lens | 30.079 | 0.321 | 1.6608 | 20.38 | −39.8873 |
| S12 | | 13.988 | 0.197 | | | |
| S13 | Seventh lens | 34.187 | 0.320 | 1.5440 | 55.99 | −158.6310 |
| S14 | | 24.406 | 0.136 | | | |
| S15 | Eighth lens | −5.920 | 0.327 | 1.6608 | 20.38 | −81.5627 |
| S16 | | −6.797 | 0.031 | | | |
| S17 | Ninth lens | 2.793 | 0.396 | 1.5440 | 55.99 | 9.4311 |
| S18 | | 5.825 | 1.323 | | | |
| S19 | Tenth lens | 28.899 | 0.321 | 1.5349 | 55.74 | −6.1437 |
| S20 | | 2.939 | 0.078 | | | |
| S21 | Eleventh lens | 3.734 | 0.500 | 1.5440 | 55.99 | 37.9396 |
| S22 | | 4.343 | 0.670 | | | |
| S23 | Filter | infinity | 0.210 | 1.5168 | 64.20 | |
| S24 | | infinity | 0.070 | | | |
| S25 | Imaging Surface | infinity | | | | |

In an example, a total focal length f of the imaging optical system 900 according to the ninth embodiment of the present disclosure is 6.8379 mm, Fno is 1.609, and IMG HT is 6.15 mm.

In the ninth embodiment of the present disclosure, the first lens 901 has positive refractive power, a first surface of the first lens 901 has a shape convex in the paraxial region, and the second surface of the first lens 901 has a shape concave in the paraxial region.

The second lens 902 has positive refractive power, a first surface of the second lens 902 has a shape convex in the paraxial region, and a second surface of the second lens 902 has a shape concave in the paraxial region.

The third lens 903 has negative refractive power, a first surface of the third lens 903 has a shape convex in the paraxial region, and a second surface of the third lens 903 has a shape concave in the paraxial region.

The fourth lens 904 has positive refractive power, a first surface of the fourth lens 904 has a shape convex in the paraxial region, and a second surface of the fourth lens 904 has a shape concave in the paraxial region.

The fifth lens 905 has negative refractive power, a first surface of the fifth lens 905 has a shape concave in the paraxial region, and a second surface of the fifth lens 905 has a shape convex in the paraxial region.

The sixth lens 906 has negative refractive power, a first surface of the sixth lens 906 has a shape convex in the paraxial region, and a second surface of the sixth lens 906 has a shape concave in the paraxial region.

The seventh lens 907 has negative refractive power, a first surface of the seventh lens 907 has a shape convex in the paraxial region, and a second surface of the seventh lens 907 has a shape concave in the paraxial region.

The eighth lens 908 has negative refractive power, a first surface of the eighth lens 908 has a shape concave in the paraxial region, and a second surface of the eighth lens 908 has a shape convex in the paraxial region.

The ninth lens 909 has positive refractive power, a first surface of the ninth lens 909 has a shape convex in the paraxial region, and a second surface of the ninth lens 909 has a shape concave in the paraxial region.

The tenth lens 910 has negative refractive power, a first surface of the tenth lens 910 has a shape convex in the paraxial region, and a second surface of the tenth lens 910 has a shape concave in the paraxial region.

The eleventh lens 911 has positive refractive power, a first surface of the eleventh lens 911 has a shape convex in the paraxial region, and a second surface of the eleventh lens 911 has a shape concave in the paraxial region.

Additionally, at least one of the tenth lens 910 and the eleventh lens 911 has at least one inflection point formed on at least one of the first and second surfaces.

In an example, each surface of the first lens 901 to the eleventh lens 911 has an aspherical coefficient as illustrated in Table 18. For example, both the object-side surface and the image-side surface of the first lens 901 to the eleventh lens 911 are aspherical surfaces.

TABLE 18

|  | S1 | S2 | S3 | S4 | S5 | S6 | S7 | S8 |
|---|---|---|---|---|---|---|---|---|
| Conic Constant(K) | −4.94892 | −11.2004 | −4.78022 | 99 | 26.3406 | 4.44689 | −5.56915 | −8.93748 |
| Fourth Coefficient(A) | 3.534E−02 | −1.469E−02 | 1.286E−01 | −7.675E−02 | 5.669E−03 | −8.988E−02 | 1.731E−02 | 2.075E−02 |
| Sixth Coefficient(B) | −4.137E−02 | −5.467E−03 | 2.500E−02 | 1.153E−03 | 1.717E−02 | 2.610E−03 | 1.924E−02 | 1.579E−02 |
| Eighth Coefficient(C) | 3.462E−03 | 8.179E−04 | −1.234E−02 | −1.317E−03 | 1.470E−03 | −1.990E−03 | 3.223E−03 | 5.533E−03 |
| Tenth Coefficient(D) | 1.288E−04 | −3.371E−03 | −4.201E−03 | −1.591E−03 | −7.637E−04 | −1.347E−03 | 1.889E−04 | 3.317E−03 |
| Twelfth Coefficient(E) | −2.575E−04 | 7.770E−04 | −7.600E−05 | 9.994E−04 | 8.457E−04 | 6.600E−05 | 8.278E−04 | 2.165E−03 |
| Fourteenth Coefficient(F) | 2.300E−05 | 1.309E−04 | 3.027E−04 | −9.500E−05 | −2.278E−04 | 2.000E−05 | 4.803E−04 | 1.184E−03 |
| Sixteenth Coefficient(G) | 5.600E−05 | 6.100E−05 | 8.500E−05 | 2.205E−04 | 1.274E−04 | 1.022E−04 | 3.177E−04 | 4.573E−04 |
| Eighteenth Coefficient(H) | −1.400E−05 | −1.039E−04 | 1.500E−05 | 5.000E−06 | 1.849E−07 | 6.600E−05 | 1.438E−04 | 1.846E−04 |
| Twentieth Coefficient(J) | −6.000E−06 | 7.000E−05 | 8.600E−05 | −1.100E−05 | −4.100E−05 | 1.100E−05 | 5.400E−05 | 2.300E−05 |
| Twenty-second Coefficient(L) | −1.000E−06 | −2.300E−05 | 0.000E+00 | 0.000E+00 | 0.000E+00 | 0.000E+00 | 0.000E+00 | 0.000E+00 |
| Twenty-fourth Coefficient(M) | 4.000E−06 | 8.000E−06 | 0.000E+00 | 0.000E+00 | 0.000E+00 | 0.000E+00 | 0.000E+00 | 0.000E+00 |
| Twenty-sixth Coefficient(N) | −3.917E−07 | −1.100E−05 | 0.000E+00 | 0.000E+00 | 0.000E+00 | 0.000E+00 | 0.000E+00 | 0.000E+00 |
| Twenty-eighth Coefficient(O) | −1.000E−06 | 6.000E−06 | 0.000E+00 | 0.000E+00 | 0.000E+00 | 0.000E+00 | 0.000E+00 | 0.000E+00 |
| Thirtieth Coefficient(P) | 2.452E−07 | −1.000E−06 | 0.000E+00 | 0.000E+00 | 0.000E+00 | 0.000E+00 | 0.000E+00 | 0.000E+00 |

TABLE 18-continued

| | S9 | S10 | S11 | S12 | S13 | S14 | S15 | S16 |
|---|---|---|---|---|---|---|---|---|
| Conic Constant(K) | 18.1798 | 9.45961 | 22.6515 | −98.2856 | 26.7314 | 67.1031 | 4.45425 | 4.45746 |
| Fourth Coefficient(A) | −2.762E−02 | −1.243E−02 | −3.272E−01 | −5.183E−01 | −6.977E−01 | −1.103E+00 | −1.126E−01 | −6.738E−02 |
| Sixth Coefficient(B) | −7.822E−03 | −1.114E−02 | −1.288E−02 | −2.668E−04 | 1.191E−02 | 1.344E−01 | −7.111E−02 | −2.980E−02 |
| Eighth Coefficient(C) | −1.298E−03 | 7.900E−05 | −3.094E−03 | 5.254E−03 | −1.982E−02 | 1.575E−03 | 1.721E−02 | −2.384E−02 |
| Tenth Coefficient(D) | −5.606E−04 | −1.373E−03 | 1.242E−04 | 6.863E−03 | 2.264E−02 | 4.489E−02 | −2.432E−02 | −1.289E−02 |
| Twelfth Coefficient(E) | −1.579E−04 | −1.092E−03 | −1.461E−03 | 2.497E−04 | 3.837E−03 | −6.022E−04 | 1.147E−02 | 1.049E−02 |
| Fourteenth Coefficient(F) | −6.200E−05 | −3.981E−04 | −3.309E−04 | 1.019E−03 | 3.662E−03 | −6.343E−04 | 1.043E−02 | −1.706E−03 |
| Sixteenth Coefficient(G) | −6.000E−05 | 8.700E−05 | −3.716E−04 | −4.200E−05 | 2.866E−04 | −4.183E−03 | 4.891E−03 | −4.780E−03 |
| Eighteenth Coefficient(H) | −8.000E−06 | 3.979E−04 | 6.152E−04 | 9.330E−04 | 1.556E−03 | −1.872E−03 | 1.029E−03 | −5.100E−05 |
| Twentieth Coefficient(J) | 1.000E−05 | 2.006E−04 | 5.261E−04 | 5.699E−04 | 1.082E−03 | −2.191E−03 | −2.911E−04 | 3.852E−04 |
| Twenty-second Coefficient(L) | 1.000E−05 | 1.331E−04 | 4.738E−04 | 3.670E−04 | 1.214E−03 | −2.605E−04 | −1.483E−03 | −7.400E−04 |
| Twenty-fourth Coefficient(M) | 1.600E−05 | 8.900E−05 | 1.598E−04 | 6.900E−05 | 1.232E−03 | 5.453E−04 | −1.177E−03 | 1.185E−04 |
| Twenty-sixth Coefficient(N) | 2.000E−05 | 7.900E−05 | 1.563E−04 | 1.553E−04 | 1.005E−03 | 3.630E−04 | −6.954E−04 | 3.103E−04 |
| Twenty-eighth Coefficient(O) | 1.200E−05 | 1.000E−06 | 6.100E−05 | 6.700E−05 | 3.599E−04 | −1.014E−04 | −3.207E−04 | −2.190E−04 |
| Thirtieth Coefficient(P) | −1.000E−06 | −6.000E−06 | 3.800E−05 | 2.200E−05 | −3.300E−05 | −2.441E−04 | −4.074E−04 | −5.095E−04 |

| | S17 | S18 | S19 | S20 | S21 | S22 |
|---|---|---|---|---|---|---|
| Conic Constant(K) | −6.60733 | −15.9769 | 34.4089 | −14.2936 | −54.338 | −27.282 |
| Fourth Coefficient(A) | −1.674E+00 | −1.051E+00 | −2.449E+00 | −3.302E+00 | 1.456E−01 | −2.662E+00 |
| Sixth Coefficient(B) | 1.322E−01 | 3.433E−02 | 1.188E+00 | 9.778E−01 | 4.832E−01 | 1.002E−01 |
| Eighth Coefficient(C) | 1.302E−01 | 1.464E−01 | −6.121E−01 | −2.134E−01 | −4.432E−01 | 8.711E−02 |
| Tenth Coefficient(D) | 2.750E−02 | −2.060E−02 | 2.499E−01 | 4.084E−02 | −4.468E−02 | −8.543E−02 |
| Twelfth Coefficient(E) | −1.975E−02 | 2.473E−02 | −5.874E−02 | −1.137E−01 | 3.313E−01 | 5.140E−03 |
| Fourteenth Coefficient(F) | −8.185E−03 | 2.249E−03 | 4.047E−02 | 7.940E−02 | −8.420E−02 | −3.413E−02 |
| Sixteenth Coefficient(G) | −1.870E−03 | 6.118E−03 | −1.557E−02 | −1.669E−02 | −1.255E−01 | −1.404E−02 |
| Eighteenth Coefficient(H) | 4.464E−03 | 6.672E−04 | 1.055E−02 | 8.631E−03 | 1.164E−01 | −7.000E−06 |
| Twentieth Coefficient(J) | 1.258E−03 | 2.578E−04 | −1.160E−02 | −9.419E−03 | 5.401E−02 | 7.018E−02 |
| Twenty-second Coefficient(L) | 9.241E−04 | 2.451E−03 | 2.663E−03 | 2.072E−02 | −8.981E−02 | −4.005E−02 |
| Twenty-fourth Coefficient(M) | −3.243E−04 | 2.233E−03 | −2.773E−03 | 3.025E−03 | 1.739E−02 | −1.701E−02 |
| Twenty-sixth Coefficient(N) | −7.264E−04 | 9.624E−04 | 1.527E−04 | 2.901E−03 | 1.796E−02 | 3.238E−02 |
| Twenty-eighth Coefficient(O) | −5.896E−04 | 4.411E−04 | 6.730E−04 | 3.425E−03 | −1.119E−02 | 7.878E−03 |
| Thirtieth Coefficient(P) | −2.309E−04 | −6.500E−05 | −5.623E−04 | 1.188E−03 | 2.226E−02 | −8.868E−03 |

Figure 18:
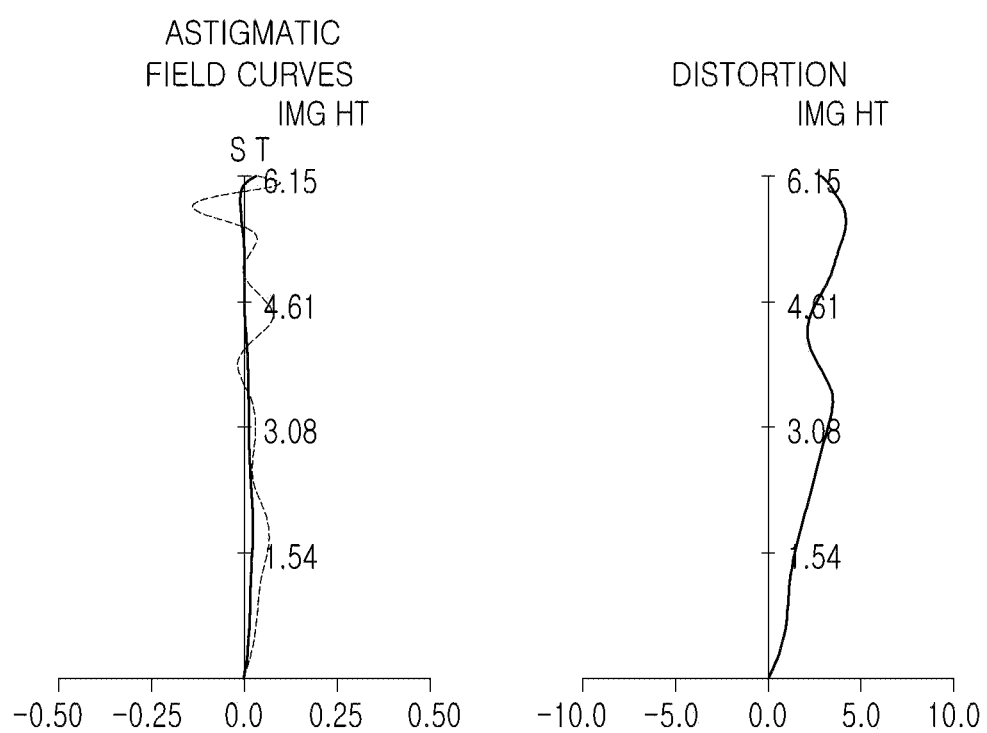
FIG. 18 is a view illustrating aberration characteristics of the example optical imaging system illustrated in FIG. 17.

Additionally, the example imaging optical system configured described above may have the aberration characteristics illustrated in FIG. 18.

Figure 19:
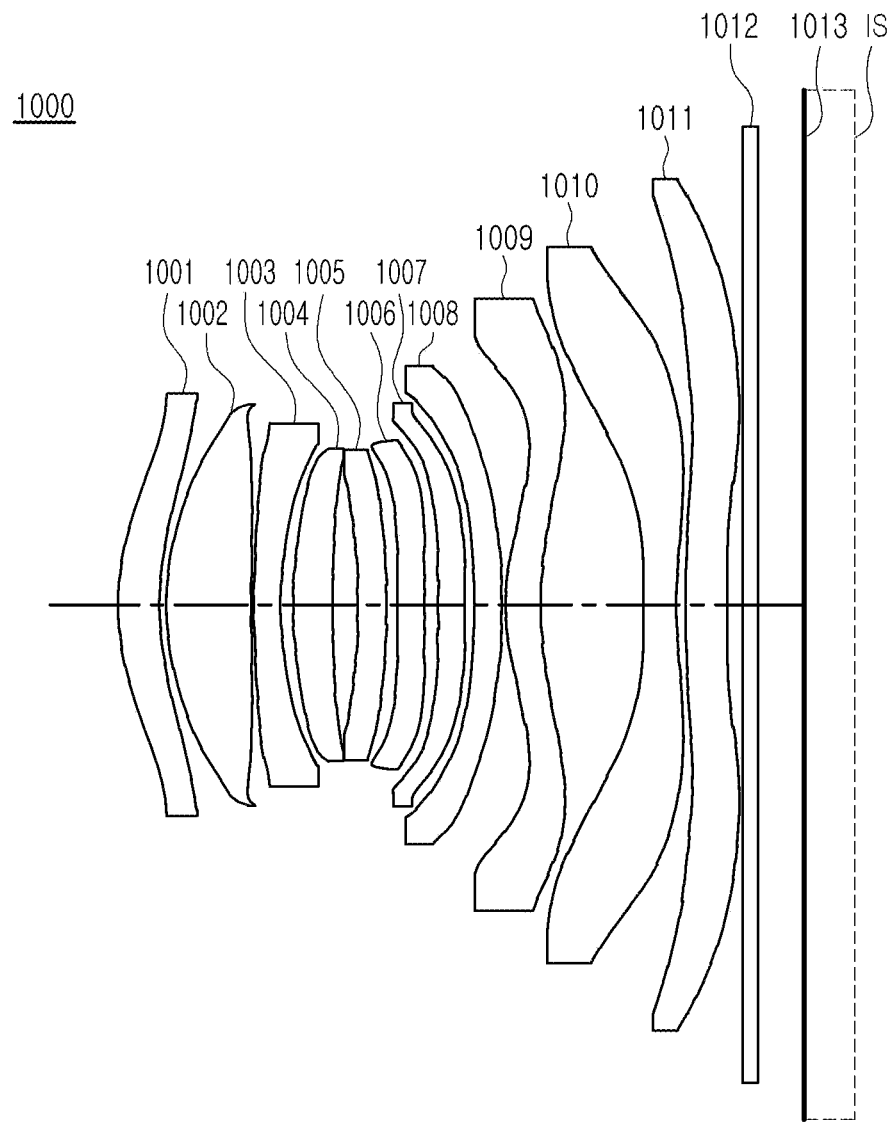
FIG. 19 illustrates a structural view of an example optical imaging system according to a tenth embodiment of the present disclosure.

An imaging optical system 1000 according to a tenth embodiment of the present disclosure will be described with reference to FIGS. 19 and 20.

The imaging optical system 1000 according to the tenth embodiment of the present disclosure may include a first lens 1001, a second lens 1002, a third lens 1003, a fourth lens 1004, a fifth lens 1005, a sixth lens 1006, a seventh lens 1007, an eighth lens 1008, a ninth lens 1009, a tenth lens 1010, and an eleventh lens 1011, and may further include a filter 1012 and an image sensor IS.

The imaging optical system 1000 according to the tenth embodiment of the present disclosure may form a focus on an imaging surface 1013. The imaging surface 1013 may refer to a surface on which a focus is formed by the imaging optical system. For example, the imaging surface 1013 may refer to one surface of the image sensor IS on which light is received.

The lens characteristics of each lens (a radius of curvature, a thickness of the lens or a distance between the lenses, an index of refraction, an Abbe number, and a focal length) are illustrated in Table 19.

TABLE 19

| Surface Number | Division | Radius | Thickness or Distance | Index | Abbe Number | Focal Length |
|---|---|---|---|---|---|---|
| S1 | First lens | 3.111 | 0.502 | 1.5440 | 55.99 | 67.1110 |
| S2 |  | 3.207 | 0.083 |  |  |  |
| S3 | Second lens | 3.049 | 1.042 | 1.5440 | 55.99 | 5.9181 |
| S4 |  | 50.634 | 0.030 |  |  |  |
| S5 | Third lens | 16.319 | 0.320 | 1.6392 | 23.49 | −10.2415 |
| S6 |  | 4.636 | 0.156 |  |  |  |
| S7 | Fourth lens | 5.653 | 0.472 | 1.5440 | 55.99 | 18.1475 |
| S8 |  | 12.836 | 0.310 |  |  |  |
| S9 | Fifth lens | −9.626 | 0.350 | 1.6707 | 19.24 | 541.6810 |
| S10 |  | −9.514 | 0.129 |  |  |  |
| S11 | Sixth lens | 43.062 | 0.327 | 1.6608 | 20.38 | −27.1465 |
| S12 |  | 12.624 | 0.169 |  |  |  |
| S13 | Seventh lens | 28.052 | 0.325 | 1.5440 | 55.99 | −114.9440 |
| S14 |  | 19.286 | 0.119 |  |  |  |
| S15 | Eighth lens | −6.506 | 0.334 | 1.6608 | 20.38 | −120.7100 |
| S16 |  | −7.228 | 0.043 |  |  |  |
| S17 | Ninth lens | 2.593 | 0.427 | 1.5440 | 55.99 | 8.5187 |
| S18 |  | 5.547 | 1.248 |  |  |  |
| S19 | Tenth lens | 30.542 | 0.392 | 1.5349 | 55.74 | −6.9358 |
| S20 |  | 3.293 | 0.122 |  |  |  |
| S21 | Eleventh lens | −1883.970 | 0.500 | 1.5440 | 55.99 | 234.2340 |
| S22 |  | −119.364 | 0.200 |  |  |  |
| S23 | Filter | infinity | 0.210 | 1.5168 | 64.20 |  |
| S24 |  | infinity | 0.540 |  |  |  |
| S25 | Imaging surface | infinity |  |  |  |  |

In an example, a total focal length f of the imaging optical system 1000 according to the tenth embodiment of the present disclosure is 6.85 mm, Fno is 1.609, and IMG HT is 6.15 mm.

In the tenth embodiment of the present disclosure, the first lens 1001 has positive refractive power, a first surface of the first lens 1001 has a shape convex in the paraxial region, and a second surface of the first lens 1001 has a shape concave in the paraxial region.

The second lens 1002 has positive refractive power, a first surface of the second lens 1002 has a shape convex in the paraxial region, and a second surface of the second lens 1002 has a shape concave in the paraxial region.

The third lens 1003 has negative refractive power, a first surface of the third lens 1003 has a shape convex in the paraxial region, and a second surface of the third lens 1003 has a shape concave in the paraxial region.

The fourth lens 1004 has positive refractive power, a first surface of the fourth lens 1004 has a shape convex in the paraxial region, and a second surface of the fourth lens 1004 has a shape concave in the paraxial region.

The fifth lens 1005 has positive refractive power, a first surface of the fifth lens 1005 has a shape concave in the paraxial region, and a second surface of the fifth lens 1005 has a shape convex in the paraxial region.

The sixth lens 1006 has negative refractive power, a first surface of the sixth lens 1006 has a shape convex in the paraxial region, and a second surface of the sixth lens 1006 has a shape concave in the paraxial region.

The seventh lens 1007 has negative refractive power, a first surface of the seventh lens 1007 has a shape convex in the paraxial region, and a second surface of the seventh lens 1007 has a shape concave in the paraxial region.

The eighth lens 1008 has negative refractive power, a first surface of the eighth lens 1008 has a shape concave in the paraxial region, and a second surface of the eighth lens 1008 has a shape convex in the paraxial region.

The ninth lens 1009 has positive refractive power, a first surface of the ninth lens 1009 has a shape convex in the paraxial region, and a second surface of the ninth lens 1009 has a shape concave in the paraxial region.

The tenth lens 1010 has negative refractive power, a first surface of the tenth lens 1010 has a shape convex in the paraxial region, and the second surface of the tenth lens 1010 has a shape concave in the paraxial region.

The eleventh lens 1011 has positive refractive power, a first surface of the eleventh lens 1011 has a shape concave in the paraxial region, and a second surface of the eleventh lens 1011 has a shape convex in the paraxial region.

Additionally, at least one of the tenth lens 1010 and the eleventh lens 1011 has at least one inflection point formed on at least one of the first and second surfaces.

In an example, each surface of the first lens 1001 to the eleventh lens 1011 has an aspherical coefficient as illustrated in Table 20. For example, both the object-side surface and the image-side surface of the first lens 1001 to the eleventh lens 1011 are aspherical surfaces.

TABLE 20

| | S1 | S2 | S3 | S4 | S5 | S6 | S7 | S8 |
|---|---|---|---|---|---|---|---|---|
| Conic Constant(K) | −5.04178 | −11.1702 | −4.8413 | 99 | 28.9386 | 4.48517 | −5.88117 | −14.7034 |
| Fourth Coefficient(A) | 3.415E−02 | −1.433E−02 | 1.275E−01 | −8.020E−02 | 6.920E−03 | −8.834E−02 | 1.570E−02 | 1.758E−02 |
| Sixth Coefficient(B) | −4.129E−02 | −5.259E−03 | 2.480E−02 | 1.485E−03 | 1.938E−02 | 2.760E−03 | 1.798E−02 | 1.388E−02 |
| Eighth Coefficient(C) | 3.437E−03 | 7.685E−04 | −1.191E−02 | −1.258E−03 | −8.943E−04 | −2.692E−03 | 4.998E−03 | 6.501E−03 |
| Tenth Coefficient(D) | 3.400E−05 | −3.429E−03 | −3.210E−03 | −1.470E−03 | −1.154E−03 | −1.605E−03 | 6.699E−04 | 3.422E−03 |
| Twelfth Coefficient(E) | −2.888E−04 | 6.157E−04 | −2.803E−04 | 4.014E−04 | 1.989E−04 | −2.473E−04 | 7.672E−04 | 2.493E−03 |
| Fourteenth Coefficient(F) | 1.400E−05 | −1.900E−05 | 1.652E−04 | −1.235E−04 | −2.439E−04 | −6.300E−05 | 4.156E−04 | 1.065E−03 |
| Sixteenth Coefficient(G) | 4.800E−05 | 8.600E−05 | −7.000E−06 | 1.354E−04 | −3.000E−06 | −5.100E−05 | 1.083E−04 | 1.845E−04 |
| Eighteenth Coefficient(H) | −1.900E−05 | −9.200E−05 | 2.600E−05 | 2.900E−05 | 3.200E−05 | 2.000E−05 | 5.200E−05 | −1.400E−05 |
| Twentieth Coefficient(J) | −6.000E−06 | 8.100E−05 | 8.000E−05 | −4.000E−06 | −2.100E−05 | 4.000E−06 | 2.000E−05 | −1.300E−05 |
| Twenty-second Coefficient(L) | −1.840E−07 | −3.000E−05 | 0.000E+00 | 0.000E+00 | 0.000E+00 | 0.000E+00 | 0.000E+00 | 0.000E+00 |
| Twenty-fourth Coefficient(M) | 5.000E−06 | 1.300E−05 | 0.000E+00 | 0.000E+00 | 0.000E+00 | 0.000E+00 | 0.000E+00 | 0.000E+00 |
| Twenty-sixth Coefficient(N) | −2.726E−07 | −1.200E−05 | 0.000E+00 | 0.000E+00 | 0.000E+00 | 0.000E+00 | 0.000E+00 | 0.000E+00 |
| Twenty-eighth Coefficient(O) | −1.000E−06 | 5.000E−06 | 0.000E+00 | 0.000E+00 | 0.000E+00 | 0.000E+00 | 0.000E+00 | 0.000E+00 |
| Thirtieth Coefficient(P) | 2.216E−07 | −1.000E−06 | 0.000E+00 | 0.000E+00 | 0.000E+00 | 0.000E+00 | 0.000E+00 | 0.000E+00 |

| | S9 | S10 | S11 | S12 | S13 | S14 | S15 | S16 |
|---|---|---|---|---|---|---|---|---|
| Conic Constant(K) | 17.2812 | 9.42744 | 88.8315 | −80.2087 | 98.7375 | 65.4394 | 4.45174 | 4.32717 |
| Fourth Coefficient(A) | −2.542E−02 | −1.322E−02 | −3.256E−01 | −5.103E−01 | −6.856E−01 | −1.116E+00 | −1.208E−01 | −2.661E−02 |
| Sixth Coefficient(B) | −7.999E−03 | −7.967E−03 | −1.178E−02 | 5.433E−04 | 1.031E−02 | 1.333E−01 | −7.399E−02 | −3.365E−02 |
| Eighth Coefficient(C) | −1.518E−03 | −2.412E−03 | −4.427E−03 | 5.236E−03 | −1.793E−02 | 4.872E−03 | 2.439E−02 | −2.879E−02 |
| Tenth Coefficient(D) | −1.088E−03 | −6.928E−04 | 5.887E−04 | 5.430E−03 | 2.185E−02 | 4.544E−02 | −2.777E−02 | −1.222E−02 |
| Twelfth Coefficient(E) | 6.800E−05 | −9.323E−04 | −5.900E−05 | −4.976E−04 | 2.358E−03 | −1.676E−03 | 1.080E−02 | 1.155E−02 |
| Fourteenth Coefficient(F) | 6.600E−05 | −5.860E−04 | −1.876E−04 | 1.172E−03 | 5.133E−03 | −2.119E−04 | 1.199E−02 | −1.225E−03 |
| Sixteenth Coefficient(G) | 9.600E−05 | −1.006E−04 | −2.261E−04 | 2.920E−04 | 6.967E−04 | −4.862E−03 | 4.267E−03 | −4.747E−03 |
| Eighteenth Coefficient(H) | 3.300E−05 | 4.144E−04 | 2.293E−04 | 1.113E−03 | 1.226E−03 | −1.379E−03 | 1.210E−03 | −8.758E−04 |
| Twentieth Coefficient(J) | 7.000E−05 | 5.057E−04 | 5.129E−04 | 9.196E−04 | 7.504E−04 | −2.096E−03 | −1.416E−03 | −3.021E−04 |
| Twenty-second Coefficient(L) | 3.800E−05 | 3.250E−04 | 3.968E−04 | 8.096E−04 | 1.288E−03 | −5.800E−05 | −4.893E−04 | 8.700E−05 |
| Twenty-fourth Coefficient(M) | 2.600E−05 | 1.562E−04 | 2.593E−04 | 4.312E−04 | 1.034E−03 | 4.128E−04 | −4.555E−04 | 8.183E−04 |
| Twenty-sixth Coefficient(N) | 3.000E−06 | 4.500E−05 | 7.700E−05 | 2.742E−04 | 7.505E−04 | 3.147E−04 | −1.292E−03 | −4.656E−04 |
| Twenty-eighth Coefficient(O) | 2.000E−06 | 1.000E−05 | 3.000E−05 | 1.136E−04 | 2.668E−04 | −2.584E−04 | −1.261E−03 | −1.783E−04 |
| Thirtieth Coefficient(P) | −3.000E−06 | 1.000E−06 | −1.300E−05 | 5.100E−05 | 6.200E−05 | −9.500E−05 | −1.753E−04 | 1.193E−04 |

| | S17 | S18 | S19 | S20 | S21 | S22 |
|---|---|---|---|---|---|---|
| Conic Constant(K) | −6.86639 | −14.1567 | 39.5174 | −11.4013 | −3.11E−10 | 99 |
| Fourth Coefficient(A) | −1.678E+00 | −9.832E−01 | −2.574E+00 | −3.500E+00 | −1.855E+00 | −3.377E+00 |
| Sixth Coefficient(B) | 1.351E−01 | −6.945E−03 | 1.201E+00 | 8.803E−01 | 6.105E−01 | 5.730E−01 |

TABLE 20-continued

| | | | | | | |
|---|---|---|---|---|---|---|
| Eighth Coefficient(C) | 1.250E−01 | 1.618E−01 | −5.719E−01 | −2.383E−01 | −4.327E−02 | 2.458E−01 |
| Tenth Coefficient(D) | 3.243E−02 | −1.266E−02 | 2.226E−01 | 3.138E−02 | −9.459E−02 | −2.263E−01 |
| Twelfth Coefficient(E) | −1.567E−02 | 2.215E−02 | −7.000E−02 | −1.057E−01 | 9.781E−02 | 2.057E−01 |
| Fourteenth Coefficient(F) | −1.279E−02 | −3.873E−03 | 4.622E−02 | 6.620E−02 | −7.365E−02 | −1.065E−01 |
| Sixteenth Coefficient(G) | −2.124E−03 | 9.966E−03 | −2.178E−02 | −2.454E−03 | 2.959E−02 | 5.110E−02 |
| Eighteenth Coefficient(H) | 3.504E−03 | 5.788E−04 | 1.277E−02 | 2.143E−02 | −2.807E−02 | −6.883E−02 |
| Twentieth Coefficient(J) | 2.746E−03 | 9.975E−04 | −8.018E−03 | −1.009E−02 | 3.677E−02 | 6.895E−02 |
| Twenty-second Coefficient(L) | 4.188E−04 | 1.233E−04 | 6.348E−03 | 8.887E−03 | −3.850E−02 | −3.803E−02 |
| Twenty-fourth Coefficient(M) | −4.834E−04 | 1.403E−03 | −5.326E−03 | −4.781E−04 | 2.718E−02 | 1.899E−02 |
| Twenty-sixth Coefficient(N) | −1.286E−03 | 1.027E−03 | 2.548E−03 | −2.267E−03 | −1.477E−02 | −1.857E−02 |
| Twenty-eighth Coefficient(O) | −4.373E−04 | 8.794E−04 | 1.380E−04 | −1.227E−03 | 1.154E−02 | 2.212E−02 |
| Thirtieth Coefficient(P) | −2.026E−04 | 1.100E−05 | −4.337E−03 | −5.482E−04 | −2.067E−02 | −7.342E−03 |

Figure 20:
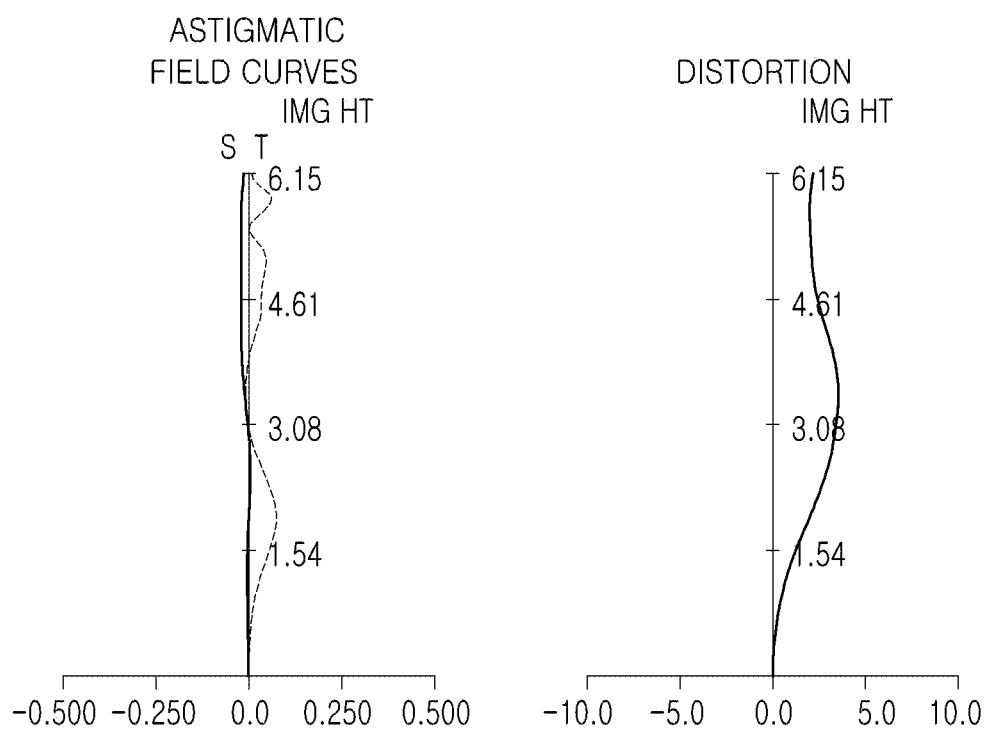
FIG. 20 is a view illustrating aberration characteristics of the example optical imaging system illustrated in FIG. 19.

Additionally, the example imaging optical system configured described above may have the aberration characteristics illustrated in FIG. 20.

Figure 21:
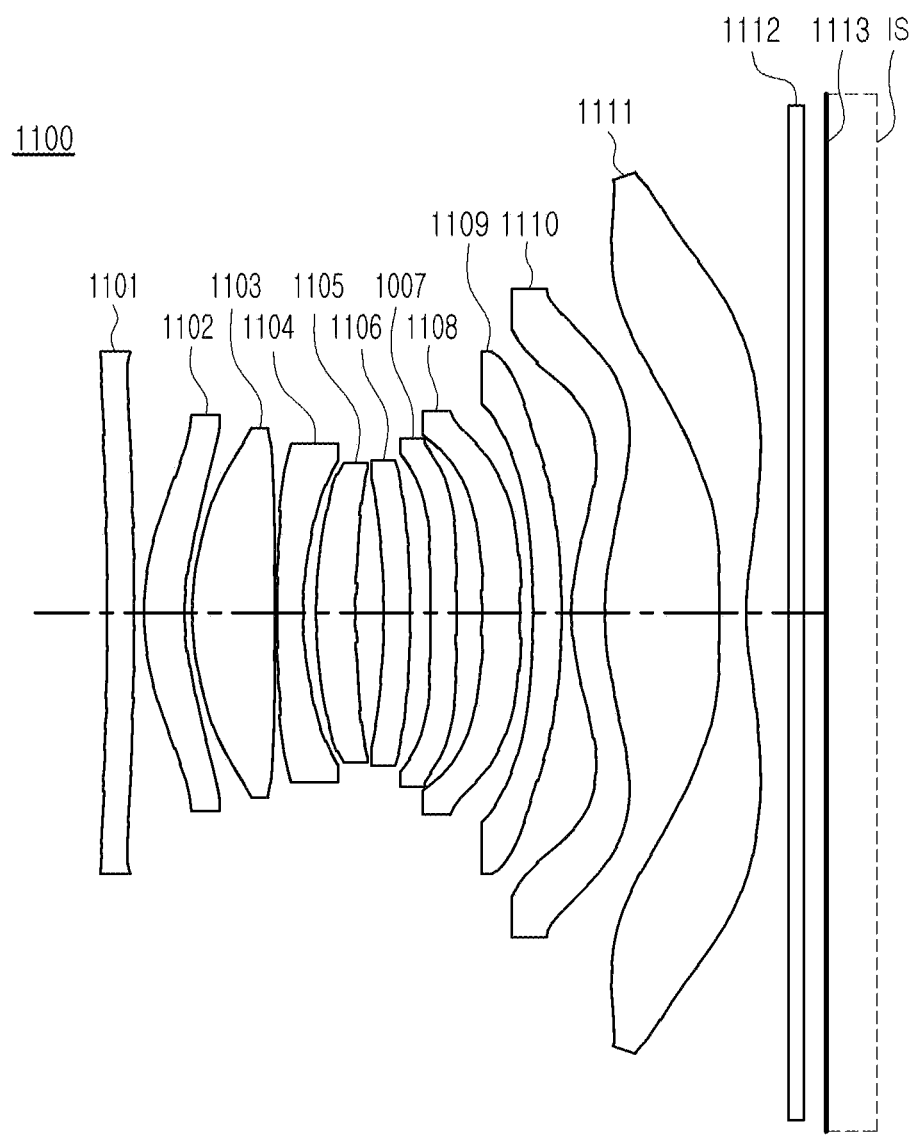
FIG. 21 illustrates a structural view of an example optical imaging system according to an eleventh embodiment of the present disclosure.

An imaging optical system 1100 according to an eleventh embodiment of the present disclosure will be described with reference to FIGS. 21 and 22.

The imaging optical system 1100 according to the eleventh embodiment of the present disclosure may include a first lens 1101, a second lens 1102, a third lens 1103, a fourth lens 1104, a fifth lens 1105, a sixth lens 1106, a seventh lens 1107, an eighth lens 1108, a ninth lens 1109, a tenth lens 1110, and an eleventh lens 1111, and may further include a filter 1112 and an image sensor IS.

The imaging optical system 1100 according to the eleventh embodiment of the present disclosure may form a focus on the imaging surface 1113. The imaging surface 1113 may refer to a surface on which a focus is formed by the imaging optical system. For example, the imaging surface 1113 may refer to one surface of the image sensor IS on which light is received.

The lens characteristics of each lens (a radius of curvature, a thickness of the lens or a distance between the lenses, an index of refraction, an Abbe number, and a focal length) are illustrated in Table 21.

TABLE 21

| Surface Number | Division | Radius | Thickness or Distance | Index | Abbe Number | Focal Length |
|---|---|---|---|---|---|---|
| S1 | First lens | −50.717 | 0.326 | 1.6608 | 20.38 | 4531.9400 |
| S2 | | −50.000 | 0.122 | | | |
| S3 | Second lens | 3.111 | 0.493 | 1.5440 | 55.99 | 67.8849 |
| S4 | | 3.207 | 0.088 | | | |
| S5 | Third lens | 3.059 | 1.006 | 1.5440 | 55.99 | 5.8524 |
| S6 | | 69.110 | 0.030 | | | |
| S7 | Fourth lens | 16.639 | 0.320 | 1.6392 | 23.49 | −9.9423 |
| S8 | | 4.564 | 0.150 | | | |
| S9 | Fifth lens | 5.235 | 0.487 | 1.5440 | 55.99 | 17.6329 |
| S10 | | 11.147 | 0.342 | | | |
| S11 | Sixth lens | −10.255 | 0.320 | 1.6707 | 19.24 | −166.1540 |
| S12 | | −11.436 | 0.241 | | | |
| S13 | Seventh lens | 57.699 | 0.320 | 1.6707 | 19.24 | −65.1968 |
| S14 | | 24.821 | 0.314 | | | |
| S15 | Eighth lens | −57.981 | 0.461 | 1.5440 | 55.99 | −43.0196 |
| S16 | | 39.353 | 0.163 | | | |
| S17 | Ninth lens | −7.052 | 0.344 | 1.6144 | 25.94 | −107.5450 |
| S18 | | −8.041 | 0.106 | | | |
| S19 | Tenth lens | 2.315 | 0.418 | 1.5440 | 55.99 | 9.0099 |
| S20 | | 4.107 | 1.389 | | | |
| S21 | Eleventh lens | 34.560 | 0.324 | 1.5349 | 55.74 | −6.8156 |
| S22 | | 3.287 | 0.499 | | | |
| S23 | Filter | infinity | 0.210 | 1.5168 | 64.20 | |
| S24 | | infinity | 0.248 | | | |
| S25 | Imaging Surface | infinity | | | | |

In an example, a total focal length f of the imaging optical system 1100 according to the eleventh embodiment of the present disclosure is 6.8 mm, Fno is 1.479, and IMG HT is 6.15 mm.

In the eleventh embodiment of the present disclosure, the first lens 1101 has positive refractive power, a first surface of the first lens 1101 has a shape concave in the paraxial region, and the second surface of the first lens 1101 has a shape convex in the paraxial region.

The second lens 1102 has positive refractive power, a first surface of the second lens 1102 has a shape convex in the paraxial region, and a second surface of the second lens 1102 has a shape concave in the paraxial region.

The third lens 1103 has positive refractive power, a first surface of the third lens 1103 has a shape convex in the paraxial region, and a second surface of the third lens 1103 has a shape concave in the paraxial region.

The fourth lens 1104 has negative refractive power, a first surface of the fourth lens 1104 has a shape convex in the paraxial region, and a second surface of the fourth lens 1104 has a shape concave in the paraxial region.

The fifth lens 1105 has positive refractive power, a first surface of the fifth lens 1105 has a shape convex in the paraxial region, and a second surface of the fifth lens 1105 has a shape concave in the paraxial region.

The sixth lens 1106 has negative refractive power, a first surface of the sixth lens 1106 has a shape concave in the paraxial region, and a second surface of the sixth lens 1106 has a shape convex in the paraxial region.

The seventh lens 1107 has a negative refractive power, a first surface of the seventh lens 1107 has a shape convex in the paraxial region, and a second surface of the seventh lens 1107 has a shape concave in the paraxial region.

The eighth lens 1108 has negative refractive power, and a first surface and a second surface of the eighth lens 1108 have a concave shape in the paraxial region.

The ninth lens 1109 has negative refractive power, a first surface of the ninth lens 1109 has a shape concave in the paraxial region, and a second surface of the ninth lens 1109 has a shape convex in the paraxial region.

The tenth lens 1110 has positive refractive power, a first surface of the tenth lens 1110 has a shape convex in the paraxial region, and a second surface of the tenth lens 1110 has a shape concave in the paraxial region.

The eleventh lens 1111 has negative refractive power, a first surface of the eleventh lens 1111 has a shape convex in the paraxial region, and a second surface of the eleventh lens 1111 has a shape concave in the paraxial region.

Additionally, at least one of the tenth lens 1110 and the eleventh lens 1111 has at least one inflection point formed on at least one of the first and second surfaces.

In an example, each surface of the first lens 1101 to the eleventh lens 1111 has an aspherical coefficient as illustrated in Table 22. For example, both the object-side surface and the image-side surface of the first lens 1101 to the eleventh lens 1111 are aspherical surfaces.

TABLE 22

| | S1 | S2 | S3 | S4 | S5 | S6 | S7 | S8 |
|---|---|---|---|---|---|---|---|---|
| Conic Constant(K) | −99 | 48.2428 | −5.17872 | −10.8486 | −4.71515 | 99 | 24.5774 | 4.53978 |
| Fourth Coefficient(A) | 1.514E−03 | −4.711E−04 | 3.264E−02 | −1.325E−02 | 1.290E−01 | −8.301E−02 | 4.486E−03 | −8.326E−02 |
| Sixth Coefficient(B) | −9.475E−04 | 1.771E−03 | −4.077E−02 | −5.536E−03 | 2.360E−02 | 4.514E−03 | 2.097E−02 | 4.045E−03 |
| Eighth Coefficient(C) | 2.582E−04 | 3.041E−04 | 4.535E−03 | 9.200E−05 | −1.344E−02 | −2.492E−03 | −2.066E−04 | −3.051E−03 |
| Tenth Coefficient(D) | 5.500E−05 | 7.300E−05 | −2.000E−06 | −3.151E−03 | −3.778E−03 | −1.517E−03 | −1.415E−03 | −2.147E−03 |
| Twelfth Coefficient(E) | 2.100E−05 | 3.600E−05 | −3.545E−04 | 6.104E−04 | 6.100E−05 | 6.609E−04 | 5.653E−04 | −3.044E−04 |
| Fourteenth Coefficient(F) | 6.000E−06 | 5.000E−06 | 2.400E−05 | 1.494E−04 | 1.992E−04 | −4.004E−04 | −4.025E−04 | −1.053E−04 |
| Sixteenth Coefficient(G) | −3.824E−08 | 7.000E−06 | 3.300E−05 | −5.600E−05 | −6.600E−05 | 2.215E−04 | 1.506E−04 | 2.700E−05 |
| Eighteenth Coefficient(H) | 4.394E−07 | −5.000E−06 | −5.000E−06 | −3.000E−06 | 4.300E−05 | −5.700E−05 | −3.800E−05 | 1.700E−05 |
| Twentieth Coefficient(J) | −1.256E−07 | 2.000E−06 | −6.000E−06 | 1.900E−05 | 3.900E−05 | 9.000E−06 | −6.000E−06 | 3.000E−06 |
| Twenty-second Coefficient(L) | 9.198E−08 | −2.000E−06 | 4.000E−06 | −5.000E−06 | 0.000E+00 | 0.000E+00 | 0.000E+00 | 0.000E+00 |
| Twenty-fourth Coefficient(M) | 3.528E−08 | 1.000E−06 | 3.000E−06 | −2.000E−06 | 0.000E+00 | 0.000E+00 | 0.000E+00 | 0.000E+00 |
| Twenty-sixth Coefficient(N) | −3.727E−08 | 1.000E−06 | 1.000E−06 | −1.000E−06 | 0.000E+00 | 0.000E+00 | 0.000E+00 | 0.000E+00 |
| Twenty-eighth Coefficient(O) | 8.538E−09 | −1.000E−06 | −5.000E−06 | 1.000E−06 | 0.000E+00 | 0.000E+00 | 0.000E+00 | 0.000E+00 |
| Thirtieth Coefficient(P) | −2.144E−09 | 1.983E−07 | 2.000E−06 | 1.000E−06 | 0.000E+00 | 0.000E+00 | 0.000E+00 | 0.000E+00 |

| | S9 | S10 | S11 | S12 | S13 | S14 | S15 | S16 |
|---|---|---|---|---|---|---|---|---|
| Conic Constant(K) | −5.27804 | −19.2448 | 11.7542 | 9.82757 | 25.9889 | −39.4261 | −99 | 30.2707 |
| Fourth Coefficient(A) | 1.933E−02 | 1.495E−02 | −1.915E−02 | −1.539E−02 | −3.359E−01 | −4.920E−01 | −7.380E−01 | −1.109E+00 |
| Sixth Coefficient(B) | 1.791E−02 | 1.459E−02 | −2.252E−03 | −7.530E−03 | −1.345E−02 | 8.317E−03 | 3.613E−03 | 1.299E−01 |

TABLE 22-continued

| | | | | | | | | |
|---|---|---|---|---|---|---|---|---|
| Eighth Coefficient(C) | 3.582E−03 | 5.968E−03 | −1.956E−03 | −4.241E−03 | −3.626E−03 | 6.651E−04 | −1.683E−02 | 1.026E−02 |
| Tenth Coefficient(D) | 5.563E−04 | 2.981E−03 | −5.314E−04 | −1.442E−03 | 7.986E−04 | 6.296E−03 | 1.984E−02 | 4.579E−02 |
| Twelfth Coefficient(E) | 6.847E−04 | 1.436E−03 | 3.748E−04 | 7.500E−05 | 4.880E−04 | 2.480E−03 | 3.374E−03 | −6.400E−05 |
| Fourteenth Coefficient(F) | 3.127E−04 | 3.281E−04 | 2.394E−04 | 1.835E−04 | 4.703E−04 | 2.343E−03 | 3.720E−03 | −2.110E−03 |
| Sixteenth Coefficient(G) | 1.047E−04 | −9.500E−05 | 5.600E−05 | 2.343E−04 | −6.300E−05 | 9.775E−04 | 1.687E−03 | −7.049E−03 |
| Eighteenth Coefficient(H) | 3.300E−05 | −7.500E−05 | −2.500E−05 | 1.815E−04 | 1.600E−05 | 9.517E−04 | 2.483E−03 | −1.754E−03 |
| Twentieth Coefficient(J) | 9.000E−06 | −2.800E−05 | −7.700E−05 | 4.600E−05 | −1.300E−05 | 5.404E−04 | 1.614E−03 | −6.878E−04 |
| Twenty-second Coefficient(L) | 0.000E+00 | 0.000E+00 | −9.100E−05 | −7.500E−05 | 3.000E−05 | 3.409E−04 | 7.387E−04 | 5.081E−04 |
| Twenty-fourth Coefficient(M) | 0.000E+00 | 0.000E+00 | −7.900E−05 | −1.062E−04 | 1.300E−05 | 1.317E−04 | 8.000E−05 | 8.640E−04 |
| Twenty-sixth Coefficient(N) | 0.000E+00 | 0.000E+00 | −5.000E−05 | −9.100E−05 | 1.000E−05 | 3.900E−05 | −1.854E−04 | 4.444E−04 |
| Twenty-eighth Coefficient(O) | 0.000E+00 | 0.000E+00 | −2.400E−05 | −4.700E−05 | −1.000E−06 | 1.000E−06 | −1.638E−04 | 1.820E−04 |
| Thirtieth Coefficient(P) | 0.000E+00 | 0.000E+00 | −7.000E−06 | −1.900E−05 | 1.000E−06 | 2.000E−06 | −6.100E−05 | 4.400E−05 |

| | S17 | S18 | S19 | S20 | S21 | S22 |
|---|---|---|---|---|---|---|
| Conic Constant(K) | 4.13523 | 2.50867 | −7.18603 | −14.5391 | 35.004 | −7.25628 |
| Fourth Coefficient(A) | −7.207E−02 | −5.453E−02 | −1.926E+00 | −1.616E+00 | −2.658E+00 | −3.663E+00 |
| Sixth Coefficient(B) | −9.318E−02 | 1.658E−02 | 6.333E−02 | −7.549E−02 | 1.290E+00 | 7.920E−01 |
| Eighth Coefficient(C) | 9.650E−03 | −2.332E−02 | 1.347E−01 | 1.698E−01 | −5.354E−01 | −1.772E−01 |
| Tenth Coefficient(D) | −1.913E−02 | −2.066E−02 | 2.645E−02 | 1.955E−03 | 1.578E−01 | 8.768E−02 |
| Twelfth Coefficient(E) | 1.196E−02 | 1.136E−02 | −9.990E−03 | 1.719E−02 | −6.421E−02 | −8.787E−02 |
| Fourteenth Coefficient(F) | 1.116E−02 | 1.790E−03 | −1.590E−02 | −1.197E−02 | 4.216E−02 | 2.352E−02 |
| Sixteenth Coefficient(G) | 3.050E−03 | −5.424E−03 | −3.307E−03 | 7.123E−03 | −2.355E−02 | −4.509E−03 |
| Eighteenth Coefficient(H) | 1.089E−03 | −1.374E−03 | 2.067E−03 | 2.753E−03 | 4.955E−03 | 1.576E−02 |
| Twentieth Coefficient(J) | −1.507E−03 | −7.419E−04 | 2.469E−03 | 4.437E−03 | 2.196E−03 | 2.207E−03 |
| Twenty-second Coefficient(L) | −9.945E−04 | 2.369E−04 | 8.733E−04 | 4.597E−04 | 4.000E−06 | 3.034E−03 |
| Twenty-fourth Coefficient(M) | −2.434E−04 | 2.600E−05 | −1.750E−04 | −4.754E−04 | −2.072E−03 | 9.505E−04 |
| Twenty-sixth Coefficient(N) | −4.286E−04 | −2.564E−04 | −6.081E−04 | −1.174E−03 | 1.103E−03 | 3.731E−03 |
| Twenty-eighth Coefficient(O) | −7.100E−05 | 1.405E−04 | −2.224E−04 | −4.376E−04 | −3.749E−04 | 2.334E−03 |
| Thirtieth Coefficient(P) | −2.200E−05 | 8.000E−06 | −5.200E−05 | −2.498E−04 | −2.795E−04 | 8.320E−04 |

Figure 22:
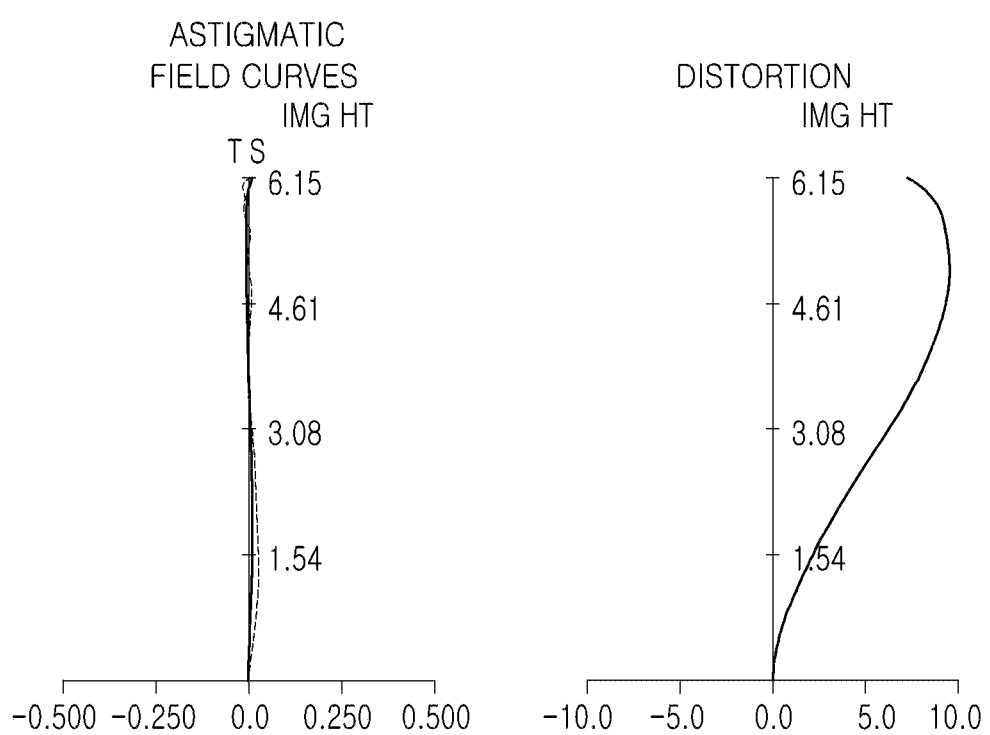
FIG. 22 is a view illustrating aberration characteristics of the example optical imaging system illustrated in FIG. 21.

Additionally, the imaging optical system configured described above may have the aberration characteristics illustrated in FIG. 22.

Table 23 shows conditional equation values of the imaging optical system according to each embodiment.

TABLE 23

| Conditional Equation | Embodiment 1 | Embodiment 2 | Embodiment 3 | Embodiment 4 | Embodiment 5 | Embodiment 6 |
|---|---|---|---|---|---|---|
| $10 < f1/f2 < 150$ | 68.088 | 76.795 | 82.937 | 85.014 | 141.233 | 22.987 |
| $1.15 < TTL/f < 1.3$ | 1.244 | 1.261 | 1.262 | 1.255 | 1.258 | 1.225 |
| $30 < v2 - v3 < 40$ | 36.75 | 36.75 | 35.61 | 30.05 | 30.05 | 32.51 |
| $0.6 < TTL/(2*IMG\ HT) < 0.8$ | 0.693 | 0.702 | 0.703 | 0.696 | 0.700 | 0.690 |
| $Nv50 \geq 4$ | 5 | 5 | 5 | 5 | 5 | 5 |
| $Nv26 \geq 4$ | 5 | 5 | 5 | 5 | 5 | 5 |
| $29 < |v1 - v3| < 40$ | 36.50 | 36.50 | 35.36 | 29.80 | 29.80 | 32.51 |

TABLE 23-continued

| Conditional Equation | | | | | | |
|---|---|---|---|---|---|---|
| 30< v2 − v6 < 40 | 36.75 | 36.75 | 36.75 | 36.75 | 35.61 | 30.06 |
| \|f345\| + \|f678\| < 0.3 | 0.055 | 0.054 | 0.054 | 0.055 | 0.054 | 0.068 |
| 0.5 < \|f345/f678\| < 3 | 0.694 | 0.707 | 0.699 | 0.580 | 0.570 | 1.266 |
| 1.5 < T2/T1 < 3 | 2.935 | 2.645 | 2.648 | 2.802 | 2.850 | 2.358 |
| 1.3 < Fno < 1.7 | 1.497 | 1.497 | 1.497 | 1.497 | 1.497 | 1.690 |

| Conditional Equation | Embodiment 7 | Embodiment 8 | Embodiment 9 | Embodiment 10 | Embodiment 11 |
|---|---|---|---|---|---|
| 10 < f1/f2 < 150 | 11.403 | 11.308 | 11.208 | 11.340 | 66.759 |
| 1.15 < TTL/f < 1.3 | 1.208 | 1.213 | 1.218 | 1.219 | 1.282353 |
| 30 < v2 − v3 < 40 | 32.50 | 32.50 | 32.50 | 32.50 | 0.00 |
| 0.6 < TTL/(2*IMG HT) < 0.8 | 0.673 | 0.676 | 0.677 | 0.679 | 0.709 |
| Nv50 ≥ 4 | 5 | 4 | 4 | 4 | 5 |
| Nv26 ≥ 4 | 5 | 4 | 4 | 4 | 5 |
| 29 < \|v1 − v3\| < 40 | 32.50 | 32.50 | 32.50 | 32.50 | 35.61 |
| 30 < v2 − v6 < 40 | 35.61 | 35.61 | 35.61 | 35.61 | 36.75 |
| \|f345\| + \|f678\| < 0.3 | 0.096 | 0.094 | 0.093 | 0.094 | 0.181 |
| 0.5 < \|f345/f678\| < 3 | 0.723 | 0.908 | 1.149 | 0.766 | 2.981 |
| 1.5 < T2/T1 < 3 | 2.100 | 2.029 | 1.981 | 2.076 | 1.513 |
| 1.3 < Fno < 1.7 | 1.609 | 1.609 | 1.609 | 1.609 | 1.479 |

An optical imaging system according to one or more example embodiments of the present disclosure as described herein, a size thereof may decrease while implementing high resolution.

While specific examples have been shown and described above, it will be apparent after an understanding of this disclosure that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An optical imaging system comprising:
a first lens, a second lens, a third lens, a fourth lens, a fifth lens, a sixth lens, a seventh lens, an eighth lens, a ninth lens, a tenth lens, and an eleventh lens arranged in order from an object side,
wherein the first lens has positive refractive power, and the second lens has positive refractive power,
wherein the eleventh lens has at least one inflection point on at least one of an object-side surface and an image-side surface, and
wherein 0.6<TTL/(2×IMG HT)<0.8, and Nv26≥4 are satisfied, where TTL is a distance from an object-side surface of the first lens to an imaging surface on an optical axis, IMG HT is half a diagonal length of the imaging surface, and Nv26 is the number of lenses with an Abbe number of less than 26.

2. The optical imaging system of claim 1, wherein 10<f1/f2<150 is satisfied, where f1 is a focal length of the first lens, and f2 is a focal length of the second lens.

3. The optical imaging system of claim 1, wherein 1.15<TTL/f<1.3 is satisfied, where f is a total focal length of the optical imaging system.

4. The optical imaging system of claim 1, wherein 30<v2−v3<40 is satisfied, where v2 is an Abbe number of the second lens, and v3 is an Abbe number of the third lens.

5. The optical imaging system of claim 1, wherein at least two lenses continuously arranged among the first to seventh lenses have an Abbe number of less than 26.

6. The optical imaging system of claim 5, wherein at least one of the third to fifth lenses has a refractive index of greater than 1.63 and an Abbe number of less than 24.

7. The optical imaging system of claim 6 wherein at least two of the sixth to eighth lenses have a refractive index of greater than 1.61 and an Abbe number of less than 26.

8. The optical imaging system of claim 1, wherein 29<|v1−v3|<40 is satisfied, where v1 is an Abbe number of the first lens, and v3 is an Abbe number of the third lens.

9. The optical imaging system of claim 1, wherein 30<v2−v6<40 is satisfied, where v2 is an Abbe number of the second lens, and v6 is an Abbe number of the sixth lens.

10. The optical imaging system of claim 1, wherein an optical axis thickness of the second lens is thicker than an optical axis thickness of the first lens.

11. The optical imaging system of claim 10, wherein 1.5<T2/T1<3 is satisfied, where T1 is the optical axis thickness of the first lens, and T2 is the optical axis thickness of the second lens.

12. The optical imaging system of claim 1, wherein 0.25<D15/TTL<0.45 is satisfied, where D15 is a distance on an optical axis from the object-side surface of the first lens to an image-side surface of the fifth lens.

13. The optical imaging system of claim 1, wherein 1.4<Fno<1.7 is satisfied, where Fno is an F number of the optical imaging system.

14. The optical imaging system of claim 1, wherein |f345|+|f678|<0.3 mm is satisfied, where f345 is a composite focal length of the third lens, the fourth lens, and the fifth lens, and f678 is a composite focal length of the sixth lens, the seventh lens, and the eighth lens.

15. The optical imaging system of claim 1, wherein 0.5<|f345/f678|<3 is satisfied, where f345 is a composite focal length of the third lens, the fourth lens, and the fifth lens, and f678 is a composite focal length of the sixth lens, the seventh lens, and the eighth lens.

16. The optical imaging system of claim 1, wherein each of the second lens to the fourth lens has a convex object-side surface and a concave image-side surface.

17. An optical imaging system comprising:
a first lens, a second lens, a third lens, a fourth lens, a fifth lens, a sixth lens, a seventh lens, an eighth lens, a ninth lens, a tenth lens, and an eleventh lens arranged in order from an object side,
wherein the first lens and the second lens each have positive refractive power,
wherein the seventh lens and the eighth lens each have negative refractive power,
wherein $0.6<TTL/(2\times IMG\ HT)<0.8$, and $1.4<Fno<1.7$ are satisfied, where TTL is a distance from an object-side surface of the first lens to an imaging surface on an optical axis, IMG HT is half a diagonal length of the imaging surface, and Fno is an F number of the optical imaging system.

18. The optical imaging system of claim 17, wherein adjacent lenses of the first to eleventh lenses are spaced apart from each other.

19. The optical imaging system of claim 17, wherein $Nv26 \geq 4$ is satisfied, where Nv26 is the number of lenses with an Abbe number of less than 26.

20. The optical imaging system of claim 17, wherein the seventh lens has a concave image-side surface.

* * * * *